US007610782B2

(12) United States Patent
Lax et al.

(10) Patent No.: US 7,610,782 B2
(45) Date of Patent: Nov. 3, 2009

(54) LOCKABLE CONTAINER HAVING AN INTEGRAL AND INTERNAL LOCKING MECHANISM AND METHODS OF USE

(75) Inventors: Michael R. Lax, Syosset, NY (US); Agjah I. Libohova, Bayside, NY (US); Timothy J. Keuning, Northport, NY (US); Kwong Kwok Keung, Hong Kong (CN)

(73) Assignee: Viva Onetime Limited (BS)

( * ) Notice: Subject to any disclaimer, the term of this patent is extended or adjusted under 35 U.S.C. 154(b) by 0 days.

(21) Appl. No.: 10/723,911

(22) Filed: Nov. 24, 2003

(65) Prior Publication Data

US 2004/0129587 A1   Jul. 8, 2004

Related U.S. Application Data

(60) Provisional application No. 60/446,177, filed on Feb. 7, 2003, provisional application No. 60/460,302, filed on Apr. 2, 2003, provisional application No. 60/469,992, filed on May 12, 2003.

(51) Int. Cl.
*E05B 65/00* (2006.01)
*B65D 85/57* (2006.01)

(52) U.S. Cl. .............................. 70/57.1; 70/63; 206/1.5; 206/308.2; 206/387.11

(58) Field of Classification Search ................... 70/57.1, 70/58, 63, 87; 292/137, 148, 156, 302, 251.5, 292/DIG. 11; 206/1.5, 308.2
See application file for complete search history.

(56) References Cited

U.S. PATENT DOCUMENTS 3,876,071 A    4/1975   Neal et al.

| 4,011,940 A | 3/1977 | Neal et al. |
| 4,401,216 A | 8/1983 | Koch |
| 4,466,540 A | 8/1984 | Lotrous et al. |
| 4,469,225 A * | 9/1984 | Takahashi ..................... 70/63 |
| D288,145 S | 2/1987 | Northrup et al. |
| 4,640,416 A | 2/1987 | Northrup et al. |
| 4,709,812 A | 12/1987 | Kosterka |
| 4,762,228 A | 8/1988 | McConnell, III et al. |
| D303,041 S | 8/1989 | Thompson |

(Continued)

FOREIGN PATENT DOCUMENTS

AU            68056/87          7/1987

(Continued)

OTHER PUBLICATIONS

"Engineers Use I-DEAS to Help Prevent Thefts," Design News, Nov. 6, 1995.

(Continued)

*Primary Examiner*—Peter M Cuomo
*Assistant Examiner*—Christopher Boswell
(74) *Attorney, Agent, or Firm*—Ostrolenk Faber LLP

(57) ABSTRACT

A lockable container for securing assets that has an integral and internal locking mechanism and methods of use are provided. An illustrative lockable container may include first and second covers configured to move between an open position, which allows access to the asset, and a closed position, which encloses the asset. The locking mechanism of the lockable container may include a locking mate arrangement operatively coupled to at least one of the first and second covers, and a locking member that is configured to move between an unlocked position and a locked position. The entirety of the locking member may be internal to the container when the locking member is in the unlocked position. A magnetic key arrangement may interact with the locking member to move the locking member between the unlocked and locked positions.

120 Claims, 32 Drawing Sheets

U.S. PATENT DOCUMENTS

| | | | |
|---|---|---|---|
| 4,867,302 | A | 9/1989 | Takahashi |
| 5,088,165 | A | 2/1992 | Minasy et al. |
| 5,147,034 | A * | 9/1992 | Broadhead et al. ........... 206/1.5 |
| 5,238,107 | A | 8/1993 | Kownacki |
| 5,297,672 | A | 3/1994 | MacTavish |
| 5,307,927 | A | 5/1994 | Curtis et al. |
| 5,369,938 | A | 12/1994 | Panveno et al. |
| 5,475,674 | A | 12/1995 | Yamashita et al. |
| 5,501,062 | A | 3/1996 | Ambergen et al. |
| 5,586,718 | A | 12/1996 | Speece |
| 5,760,689 | A * | 6/1998 | Holmgren ....................... 70/63 |
| 5,769,218 | A * | 6/1998 | Yabe .......................... 206/1.5 |
| 5,799,782 | A | 9/1998 | Gelardi |
| 5,850,752 | A * | 12/1998 | Lax ............................... 70/63 |
| 5,884,761 | A | 3/1999 | Gelardi et al. |
| 5,933,568 | A | 8/1999 | Higurashi et al. |
| 5,956,981 | A * | 9/1999 | Weisburn et al. ............. 70/57.1 |
| 5,988,376 | A * | 11/1999 | Lax ............................... 70/63 |
| D422,428 | S | 4/2000 | Pijanowski et al. |
| 6,093,140 | A | 7/2000 | Gelardi |
| 6,125,668 | A * | 10/2000 | Belden, Jr. ..................... 70/63 |
| D441,212 | S | 5/2001 | Pijanowski et al. |
| 6,325,207 | B2 | 12/2001 | Drew |
| 6,336,554 | B1 * | 1/2002 | Bruhwiler ................... 206/1.5 |
| 6,418,766 | B1 | 7/2002 | Luebeck |
| D468,621 | S | 1/2003 | Farrar et al. |
| 6,516,639 | B1 * | 2/2003 | Margetts et al. .............. 70/57.1 |
| 6,863,176 | B2 | 3/2005 | Farrar et al. |
| 6,880,372 | B2 * | 4/2005 | Kim ........................... 70/57.1 |
| 6,935,494 | B2 | 8/2005 | Fraser et al. |
| 7,100,402 | B2 * | 9/2006 | Holmgren ................... 70/57.1 |
| 7,320,235 | B2 | 1/2008 | Belden, Jr. et al. |
| 2001/0037953 | A1 | 11/2001 | Gelardi |
| 2002/0003095 | A1 * | 1/2002 | Jaeb et al. ................. 206/308.2 |
| 2002/0020643 | A1 | 2/2002 | Kleine-Moellhoff |
| 2002/0023853 | A1 * | 2/2002 | Lax et al. .................... 206/310 |
| 2003/0075461 | A1 | 4/2003 | Farrar et al. |
| 2004/0045845 | A1 | 3/2004 | Fraser et al. |
| 2004/0182729 | A1 | 9/2004 | Farrar et al. |
| 2004/0262189 | A1 | 12/2004 | Fraser et al. |

FOREIGN PATENT DOCUMENTS

| | | |
|---|---|---|
| AU | 1991658615 | 8/1991 |
| AU | 672676 | 10/1996 |
| AU | 722737 | 8/2000 |
| AU | 723326 | 8/2000 |
| AU | 149180 S | 9/2002 |
| AU | 150891 S | 3/2003 |
| CN | 2298586 | 11/1998 |
| DE | 19511394 | 10/1996 |
| DE | 297 22 209 | 2/1998 |
| DE | 297 22 209 | 4/1998 |
| EP | 0142748 | 5/1985 |
| EP | 0 545 494 | 6/1993 |
| EP | 0 566 403 | 10/1993 |
| EP | 0616103 | 9/1994 |
| EP | 1 264 953 | 12/2002 |
| FR | 2608564 | 6/1988 |
| FR | 2628717 | 9/1989 |
| FR | 2715817 | 8/1995 |
| NL | 1 003 965 | 3/1998 |
| WO | 97/41563 | 11/1997 |
| WO | 97/47008 | 12/1997 |
| WO | 02/31831 | 4/2002 |
| WO | 02/39451 | 5/2002 |
| WO | 03/022706 | 3/2003 |
| WO | 03/048486 | 6/2003 |
| WO | 2004/005654 | 1/2004 |
| WO | 2004/018811 | 4/2004 |
| WO | 2004/021089 | 11/2004 |

OTHER PUBLICATIONS

"Security Products for Entertainment Media: Program 2000," Clear-Vu Products, Westbury, New York, Mar. 2000.

"Security Products for Entertainment Media: Program 2001," Clear-Vu Products, Westbury, New York, Mar. 2001.

"Zenith Pac Technology: The Intelligent Standard," presented in Melbourne, Australia by Clear-Vu Products, Westbury, New York, Nov. 13, 2001.

"Zenith Pac," presented at ERSC Conference in New York by Clear-Vu Products, Westbury, New York, Apr. 4, 2002.

Clear-Vu Products, Press Release, Zenith Software Pac; Jun. 28, 2002.

Clear-Vu Products, Press Release, The Zenith Onetime Internal Security Locking System, Aug. 2003.

Alpha Security Products, Press Release, Benefit Denial—The Ultimate In Retail Merchandising Security, 2002.

Alpha Security Products, Media Lok Presentation Prepared for Blockbuster Video, 2002.

http://www.nexpak.com, Nexpak's New Lockable Rental Case Provides greater security for Live DVD's and Games (visited and printed on Oct. 22, 2003).

* cited by examiner

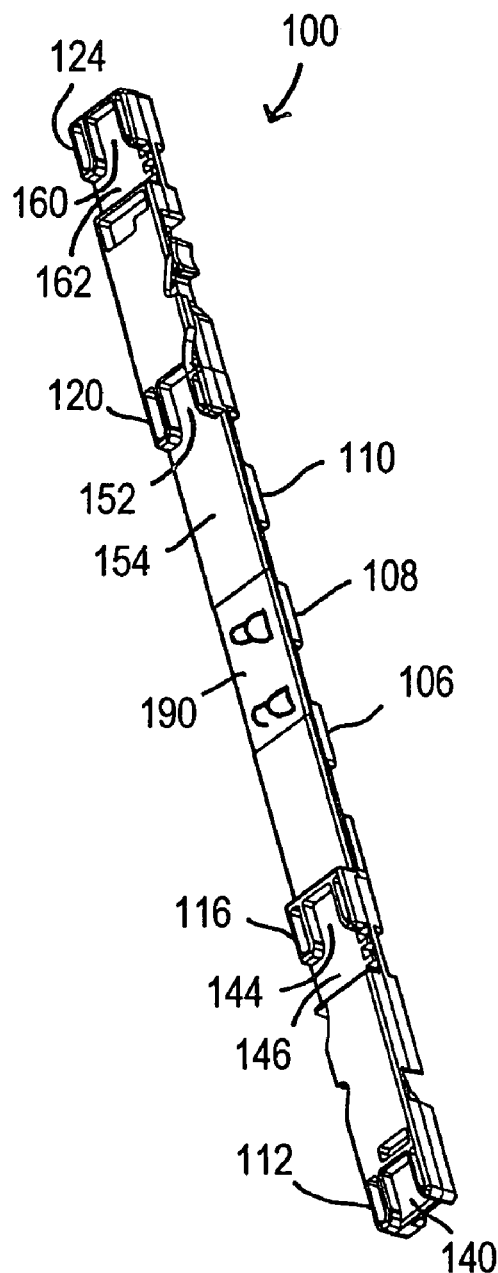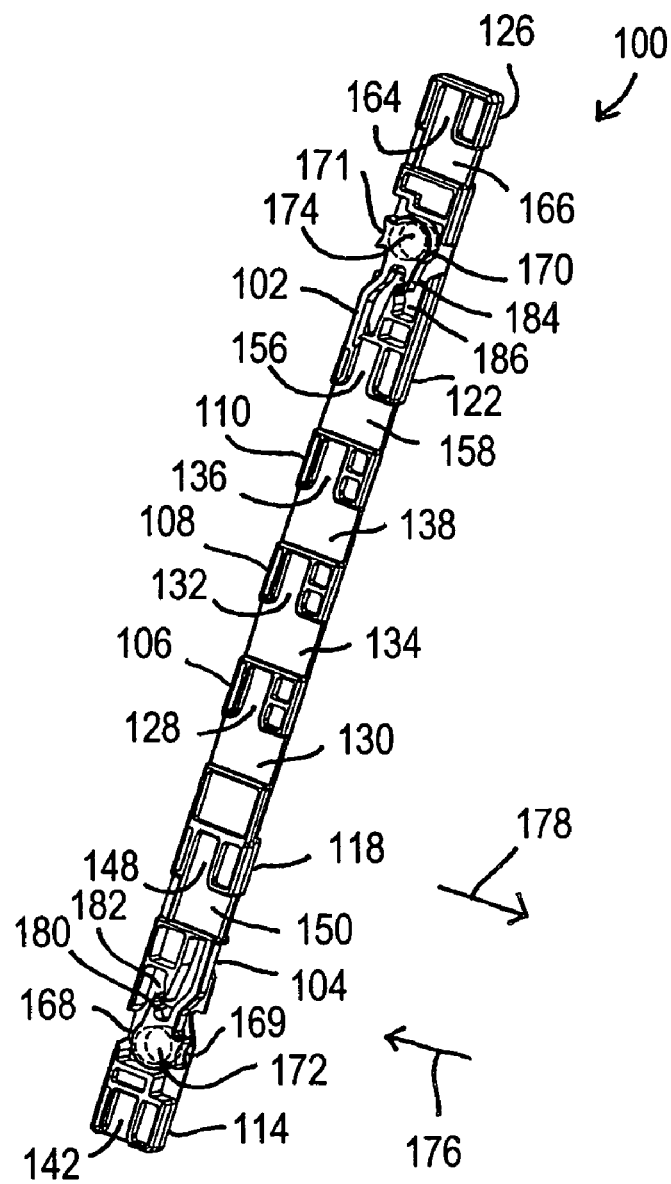
FIG. 5
FIG. 6

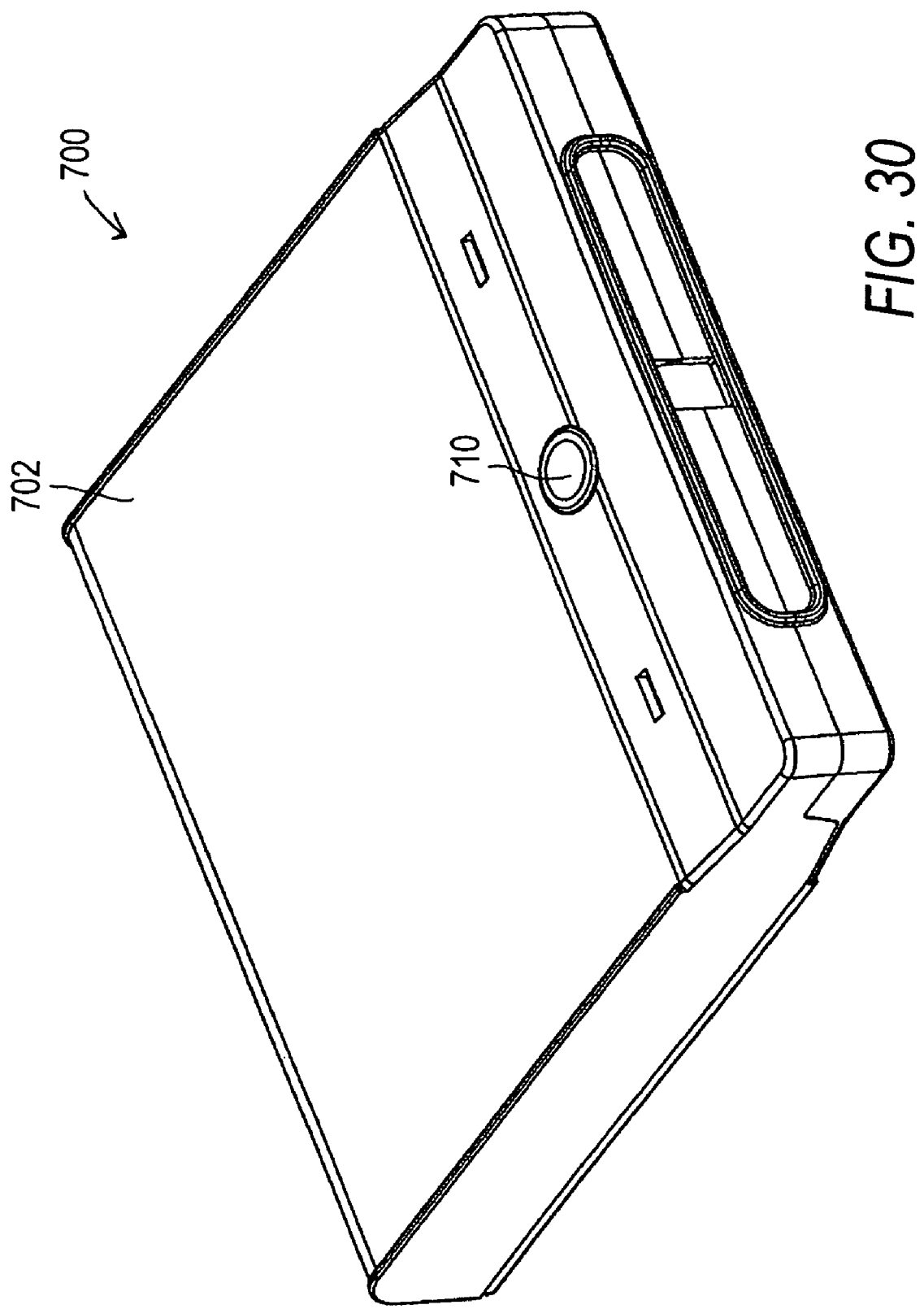

LOCKABLE CONTAINER HAVING AN INTEGRAL AND INTERNAL LOCKING MECHANISM AND METHODS OF USE

This application claims the benefit of U.S. provisional patent application No. 60/446,177, filed Feb. 7, 2003, U.S. provisional patent application No. 60/460,302, filed Apr. 2, 2003, and U.S. provisional patent application No. 60/469,992, filed May 12, 2003. All of these prior applications are hereby incorporated by reference herein in their entireties.

BACKGROUND OF THE INVENTION

This invention relates to a lockable container for securing assets and, more particularly, to a lockable container for securing assets that has an integral and internal locking mechanism and methods of use.

Currently, there are many containers that can be used to secure storage media such as, for example, digital versatile discs ("DVDs"), compact discs ("CDs"), and video games. A typical storage container includes a cover portion and a base portion that is hingedly coupled to the cover portion. An asset to be secured is placed in the container, and the cover portion is mated with the base portion to secure the asset within the container. These storage containers may, for example, be displayed in a live retail or rental environment, where potential customers can handle and examine the storage container to determine, for example, whether to buy or rent the asset stored therein. Thus, since many potential customers may handle these storage containers, it is necessary to provide a locking means for the storage container to deter potential thieves from stealing the asset stored therein.

Currently, various locking approaches exist for use in both the live retail and rental environments. One approach for locking a storage container involves placing an active electronic security tag (e.g., electronic article surveillance ("EAS") tag or radio frequency identification ("RFID") tag) within the container. The container is then sealed using edge labels. The edge labels prevent the container from being easily opened, and prevent the asset and security tag from being removed from the container. Such a container can also be used with an external security apparatus that wraps around the container to provide additional security to the asset within the container.

The approach described hereinabove, however, has some limitations. For example, for added security in a live retail or rental environment, the containers are sometimes locked behind the counter, thereby denying a consumer the benefit of a "live sale." Furthermore, consumers often find the edge labels difficult to remove once the container is brought home and ready to be opened. If an additional external security apparatus is used, the apparatus must either be cut off by the retailer at the point of purchase or by the consumer at home. This external apparatus is then discarded, which is not environmentally friendly.

Another approach to locking a storage container involves securing the container with a separate locking device. Examples of such locking devices are described, for example, in Burdett et al. U.S. Pat. No. 5,944,185 and Burdett et al. U.S. Pat. No. 6,135,280. Such locking devices are inserted into or attached to a container to lock the container, and are then removed from communication with the container to unlock the container.

In such an approach, because the locking device is separate from the container, certain complications may arise. For example, in order to lock the container in a live retail or rental environment, a retailer must first insert the lock into or attach the lock to the container, prior to locking the container with a locking apparatus. When the container is unlocked by a retailer, the lock is either reused, stocked, restocked, or discarded. This can lead to, for example, increased costs, administrative complications, and environmental problems. In addition, such a locking device that is both separate from and external to a container is accessible to a consumer, which can lead to tampering.

Accordingly, it would be desirable to provide a lockable container for securing assets that has an integral and internal locking mechanism and methods of use.

SUMMARY OF THE INVENTION

In accordance with the present invention, a lockable container for securing assets that has an integral and internal locking mechanism and methods of use are provided. Such assets may include, for example, storage media (e.g., DVDs, CDs, video games, memory cards or any other suitable storage media), jewelry, pharmaceutical products, razor blades, printer cartridges, or any other item of value. The lockable container of the present invention may also be used to secure items such that others are prevented from accessing the item, whether or not the item is of particular value. For example, the lockable container of the present invention may be used to secure violent or adult movies or video games in the home, such that children are unable to access the items. However, for simplicity, the present invention will be described herein as securing an "asset."

In some embodiments of the present invention, a lockable container for securing an asset therein may be provided. The lockable container may include a first cover and a second cover coupled to the first cover. The first and second covers may be configured to move between an open position which allows access to the asset and a closed position which encloses the asset. The lockable container may include a locking mate arrangement that is operatively coupled to at least one of the first and second covers. The lockable container may include a locking member that is configured to move between an unlocked position, in which the first and second covers can move to the open position, and a locked position, which locks the first and second covers in the closed position. The entirety of the locking member may be internal to the container in the unlocked position.

In some embodiments of the present invention, a method for securing an asset within a container may be provided. A lockable container may be provided having a first cover and a second cover coupled to the first cover. The lockable container may have a locking mate arrangement that is operatively coupled to at least one of the first and second covers and a locking member. The first and second covers of the container may be in a closed position which encloses the asset, and the locking member may be in an unlocked position in which the first and second covers can move to an open position. In the unlocked position, the entirety of the locking member may be internal to the container. The lockable member may be moved from the unlocked position to a locked position to lock the first and second covers in the closed position.

In some embodiments of the present invention, a method for accessing an asset from within a container may be provided. A lockable container may be provided having a first cover and a second cover coupled to the first cover. The lockable container may have a locking mate arrangement that is operatively coupled to at least one of the first and second covers and a locking member. The first and second covers may be in a closed position which encloses the asset. The locking member may be in a locked position which locks the first and second covers in the closed position. The locking member may be moved from the locked position to an unlocked position in which the first and second covers can move to an open position. In the unlocked position, the entirety of the locking member may be internal to the container.

In some embodiments of the present invention, a lockable container for securing an asset may be provided. The lockable container may include a base portion having a locked position receptacle. A cover may be pivotally coupled to the base portion to enclose the asset in the container. The lockable container may include a locking mate arrangement that is coupled to at least one of the cover and the base portion and that has at least one tab portion. The lockable container may include a locking member that is slideably coupled to at least one of the cover and the base portion. The locking member may be arranged entirely within the container and may be configured to detachably couple to the locking mate arrangement to secure the cover to the base portion, thereby retaining the asset within the container. The locking member may include at least one engagement structure that is configured to engage the at least one tab portion. The locking member may include at least one first magnetically attractable portion that is configured to magnetically interact with a corresponding first magnet arrangement of an external key arrangement. The locking member may include at least one resilient locked position flange that is biased into a locking state and is configured to selectively engage the locked position receptacle to prevent the locking member from sliding into an unlocked position once in a locked position. The locking member may be configured to be acted upon by the external key arrangement to selectively position the locking member into one of the locked position and the unlocked position with respect to the locking mate arrangement.

In some embodiments of the present invention, a key arrangement for at least one of locking and unlocking a container may be provided. The key arrangement may include a receptacle arrangement that is configured to receive the container. The receptacle arrangement may include at least one magnet arrangement that is configured to at least one of lock and unlock the container. The key arrangement may include a processing arrangement and a lock/unlock detection arrangement that is configured to detect a locking state of the container and to communicate a signal to the processing arrangement in accordance with the locking state. The key arrangement may include a user interface arrangement that is in communication with the processing arrangement and that is configured to communicate the locking state of the container to a user.

In some embodiments of the present invention, a system for securing and gaining access to an asset may be provided. The system may include a lockable container for securing an asset that has a first cover and a second cover pivotally coupled to the first cover to enclose the asset within the container. The lockable container may include a locking mate arrangement coupled to at least one of the first and second covers. The lockable container may include a locking member that is slideably coupled to at least one of the first and second covers. The locking member may be configured to detachably couple to the locking mate arrangement to secure the first cover to the second cover, thereby retaining the asset item within the container. The system may include a key arrangement for at least one of locking and unlocking the container. The key arrangement may include a receptacle arrangement that is configured to receive the container. The receptacle arrangement may have at least one magnet arrangement that is configured to at least one of lock and unlock the container. The locking member may be configured to be acted upon by the external key arrangement to selectively position the locking member into one of a locked position and an unlocked position with respect to the locking mate arrangement. The entirety of the locking member may be internal to the container in the unlocked position.

In some embodiments of the present invention, a method for securing an asset within a container may be provided. A lockable container may be provided having a first cover and a second cover pivotally coupled to the first cover to enclose the asset within the container. The lockable container may include a locking mate arrangement that is coupled to at least one of the first and second covers. The lockable container may include a locking member that is slideably coupled to at least one of the first and second covers. The locking member may be in an unlocked position, and the entirety of the locking member may be internal to the container in the unlocked position. A key arrangement for unlocking the container may be provided. The key arrangement may include a receptacle arrangement that has at least one magnet arrangement. The container may be positioned within the receptacle arrangement. The container may be acted upon with the at least one magnet arrangement to move the locking member from the unlocked position into a locked position with respect to the locking mate arrangement, such that the locking member engages the locking mate arrangement to secure the first cover to the second cover.

In some embodiments of the present invention, a method for providing access to an asset from within a container may be provided. A lockable container may be provided having a first cover and a second cover pivotally coupled to the first cover to enclose the asset within the container. The lockable container may include a locking mate arrangement coupled to at least one of the first and second covers. The lockable container may include a locking member slideably coupled to at least one of the first and second covers. The entirety of the locking member may be internal to the container in an unlocked position. The locking member may engage the locking mate arrangement to secure the first cover to the second cover in a locked position. A key arrangement for unlocking the container may be provided. The key arrangement may include a receptacle arrangement that has at least one magnet arrangement. The container may be positioned within the receptacle arrangement. The container may be acted upon with the at least one magnet arrangement to move the locking member from the locked position into the unlocked position with respect to the locking mate arrangement.

In some embodiments of the present invention, a lockable container for securing an asset may be provided. The lockable container may include a first cover and a second cover coupled to the first cover. The first and second covers may be configured to move between an open position which allows access to the asset and a closed position which encloses the asset. The lockable container may include at least one tab portion coupled to the first cover, and at least one corresponding tab portion coupled to the second cover. The lockable container may include a locking member that is operatively coupled to at least one of the first and second covers. The locking member may have a trap portion and a release portion. The locking member may be configured to move between an unlocked position, in which the first and second covers can move to the open position, and a locked position, which locks the container in the closed position. The entirety of the locking member may be internal to the container in the unlocked position.

In some embodiments of the present invention, a lockable container for securing an asset therein may be provided. The lockable container may include a receptacle that has an open configuration, allowing access to the asset, and a closed configuration, enclosing the asset. The lockable container may include a locking mate arrangement that is operatively coupled to the receptacle. The lockable container may include a locking member that is configured to move between an unlocked position, in which the receptacle is in the open configuration, and a locked position, which locks the receptacle in the closed configuration. The entirety of the locking member may be internal to the container in the unlocked position.

In some embodiments of the present invention, a key arrangement for at least one of locking and unlocking a container may be provided. The container may have a receptacle that has an open configuration which allows access to an asset and a closed configuration which encloses the asset. The container may have a locking member that is configured to move between an unlocked position in which the receptacle is in the open configuration and a locked position which locks the receptacle in the closed configuration. The locking member may have at least one magnetically attractable portion. The key arrangement may include a channel portion that is configured to receive the container and at least one magnetic arrangement. The at least one magnetic arrangement may be configured to hold the at least one magnetically attractable portion of the locking member within a magnetic field created by the at least one magnetic arrangement while the container slides through the channel, thereby positioning the locking member in at least one of the locked and unlocked positions.

In some embodiments of the present invention, a method for at least one of locking and unlocking a container may be provided. The container may have a receptacle that has an open configuration which allows access to an asset and a closed configuration which encloses the asset. The container may have a locking member that is configured to move between an unlocked position in which the receptacle is in the open configuration and a locked position which locks the receptacle in the closed configuration. The locking member may have at least one magnetically attractable portion. A key arrangement may be provided that has a channel portion and at least one magnetic arrangement. The container may be positioned within the channel portion. The at least one magnetically attractable portion of the locking member may be held within a magnetic field created by the at least one magnetic arrangement. While the at least one magnetically attractable portion of the locking member is held within the magnetic field created by the at least one magnetic arrangement, the container may slide through the channel such that the locking member attains at least one of the locked and unlocked positions.

Further features of the invention, its nature and various advantages will be more apparent from the accompanying drawings and the following detailed description.

BRIEF DESCRIPTION OF THE DRAWINGS

FIGS. 5 and 6 are perspective views of an illustrative locking member for use with the lockable container of FIG. 2 in accordance with the present invention.

FIG. 30 is a perspective view of yet another illustrative lockable container for securing an asset in accordance with the present invention.

DETAILED DESCRIPTION OF THE INVENTION

In accordance with the present invention, a lockable container for securing assets that has an integral and internal locking mechanism and methods of use are provided.

The locking mechanism of the present invention is integral with the container, and therefore remains with the container, regardless of whether the container is locked or unlocked. Thus, the container may be both locked and unlocked without removing any portion of the locking mechanism (e.g., a locking member) from the container. Accordingly, there is no need to reuse, restock, recycle or discard any portion of the locking mechanism.

The locking mechanism of the present invention is internal to the container, and therefore is situated entirely within the container when the container is closed. This makes it more difficult for an individual to tamper with the locking mechanism.

When locked, the lockable container of the present invention may be displayed, for example, in a live retail or rental environment. Consumers may handle the container without gaining access to its contents. Once the consumer decides to purchase, rent, or lease the contents of a particular lockable container, the consumer may bring the container to a checkout counter. At the checkout counter, an employee or other authorized user may unlock the lockable container using a key arrangement so that the consumer can gain access to its contents.

Since the integral and internal locking mechanism of the present invention may be selectively positioned into either a locked or unlocked position, the lockable container of the present invention may be used in applications that do not require the container to be locked.

Figure 1:
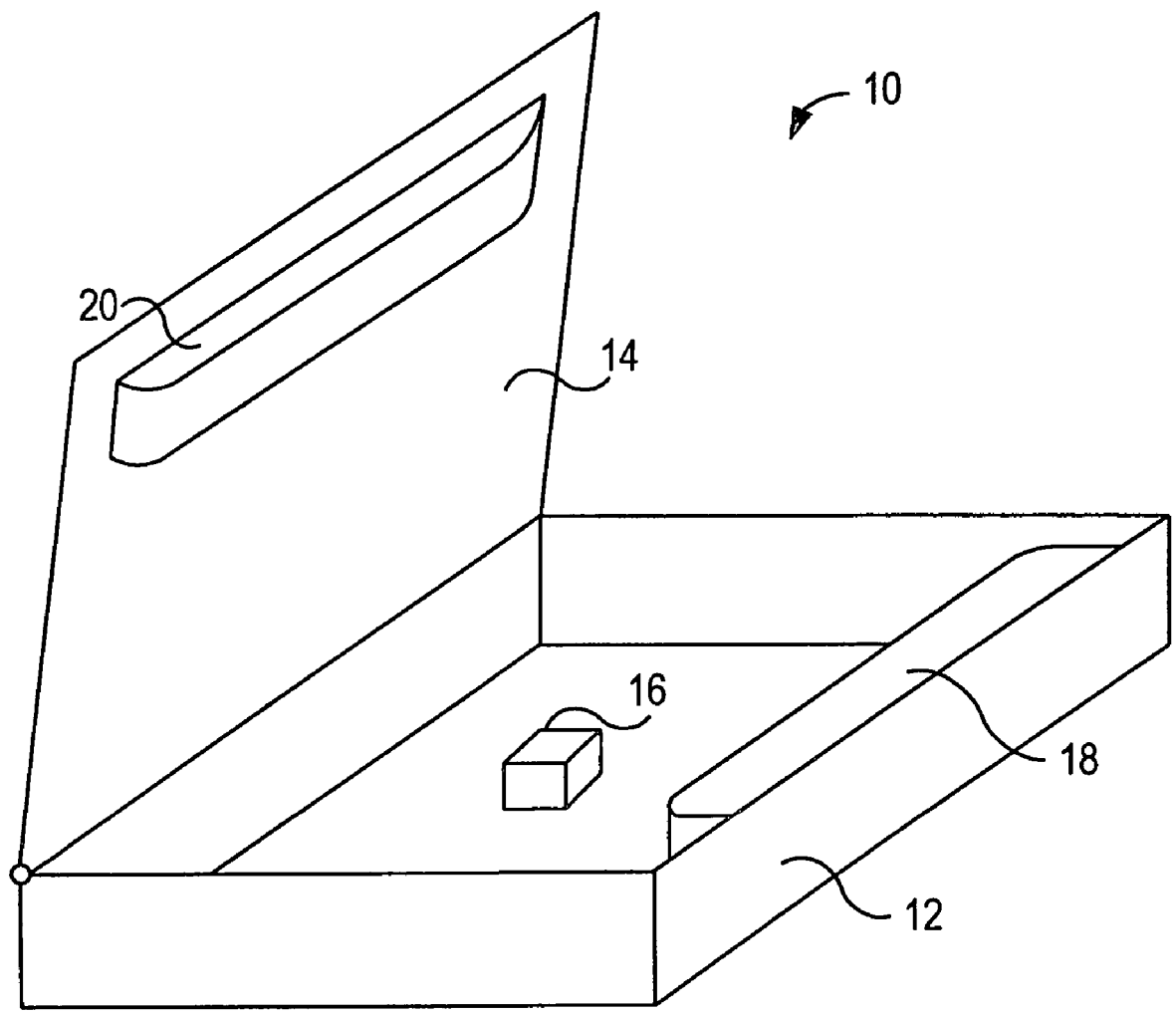
FIG. 1 is a simplified perspective of an illustrative lockable container in accordance with the present invention.

FIG. 1 shows a simplified perspective view of an illustrative lockable container 10 in accordance with the present invention. (It should be noted that lockable container 10 of FIG. 1 is merely a schematic illustration to generally illustrate features of the lockable container of the present invention.) Lockable container 10 includes a first cover 12 and a second cover 14 that is pivotally coupled, or "hinged," to the first cover for securing at least one asset 16 within container 10. As shown in the FIG., asset 16 resides within first cover 12. However, this is merely illustrative, and one or both of first cover 12 and second cover 14 may be capable of receiving asset 16. (It should be noted that first cover 12 may also be referred to herein as a "base portion" of container 10 since it is the portion of the container within which the asset reside. Second cover 14 may also be referred to herein as a "cover.")

Container 10 may be locked to secure asset 16 within the container. In particular, container 10 includes an internal locking member 18 and a locking mate arrangement 20 situated within container 10. Locking member 18 and locking mate arrangement 20 are configured for engagement such that first cover 14 is secured to second cover 12, thereby securing asset 16 within container 10.

It should be noted that, although locking member 18 is illustrated as being coupled to first cover 12, this is merely illustrative, and locking member 18 may be coupled to either first cover 12 or second cover 14. Additionally, although locking mate arrangement 20 is illustrated as being joined to second cover 115, this is merely illustrative, and locking mate arrangement 20 may be joined to one or both of first cover 12 and second cover 14.

In examples in which container 10 is used to secure storage media (e.g., DVDs, CDs, or any other suitable storage media), container 10 may be sized similarly to, for example, a standard library case. In such an example, container 10 may work with current manufacturing automation, and may posses similar wall heights, disc position, and booklet size as a standard library case. Preferably, container 10 is constructed of any durable material suitable to secure asset 16 within container 10 and prevent unauthorized persons from breaking the container to gain access to the asset. Container 10 may be constructed of, for example, plastic, metal, wood, a polymer, a thermoplastic resin (such as polypropylene, ABS, or polycarbonate), or any other suitable durable material.

Container 10 may include at least one transparent portion (not shown) to permit an user to view the contents of the container, for example, asset 16. In such an embodiment, if container 10 is used to contain an item for sale, a consumer may view the contents before deciding whether to purchase asset 16. Container 10 may include, for example, a transparent jacket (not shown) arranged on the outside of the container for displaying information materials in connection with the asset 16 to the customer. For example, if container 10 is used to secure a DVD movie, the transparent jacket (not shown) may include a miniature pictograph, title, or any other suitable information in connection with the DVD movie.

Figure 4:
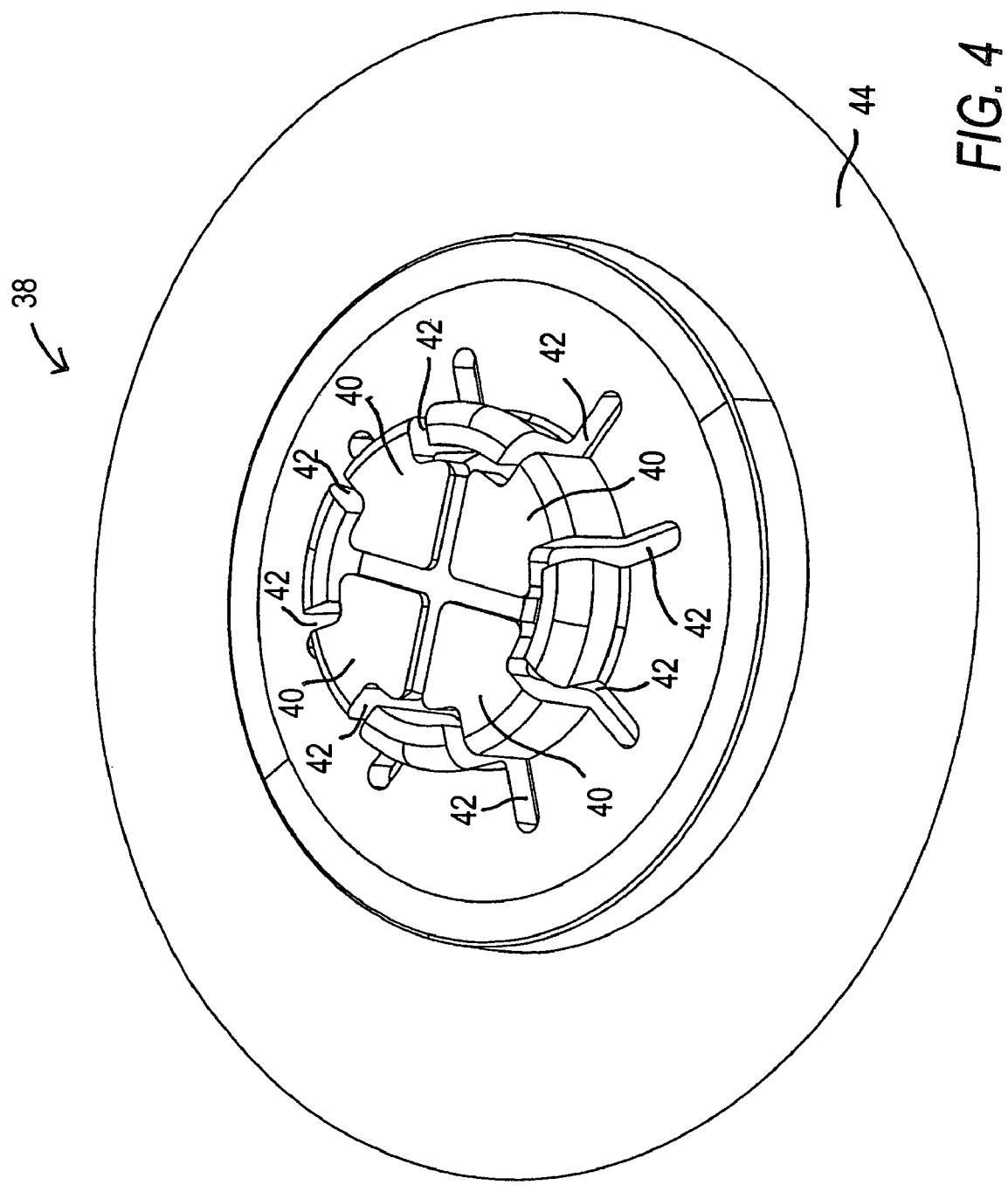
FIG. 4 is a perspective view of an illustrative hub structure for a lockable container in accordance with the present invention.

To prevent damage to asset 16, container 10 may include a securing mechanism (not shown) for securing the asset within the container, such that the asset is prevented from moving about the interior of the container while the container is being moved or transported. For example, if container 10 is used to secure storage media (e.g., a DVD, CD, or any other suitable storage media), the securing mechanism (not shown) may include, for example, a hub to receive and retain the storage media thereon. (An example of a hub is shown in FIG. 4, which will be described hereinbelow.)

Locking member 18 is configured to detachably couple to locking mate arrangement 20 to secure first cover 12 to second cover 14. For this purpose, one or both of locking member 18 and locking mate arrangement 20 may be configured to be acted upon by an external magnetic key arrangement (described in detail hereinbelow). The interaction of the external magnetic key arrangement and container 10 selectively positions internal locking member 18 in either a locked position or an unlocked position, and thereby couples or decouples locking member 18 and locking mate arrangement 20, respectively.

Figure 2:
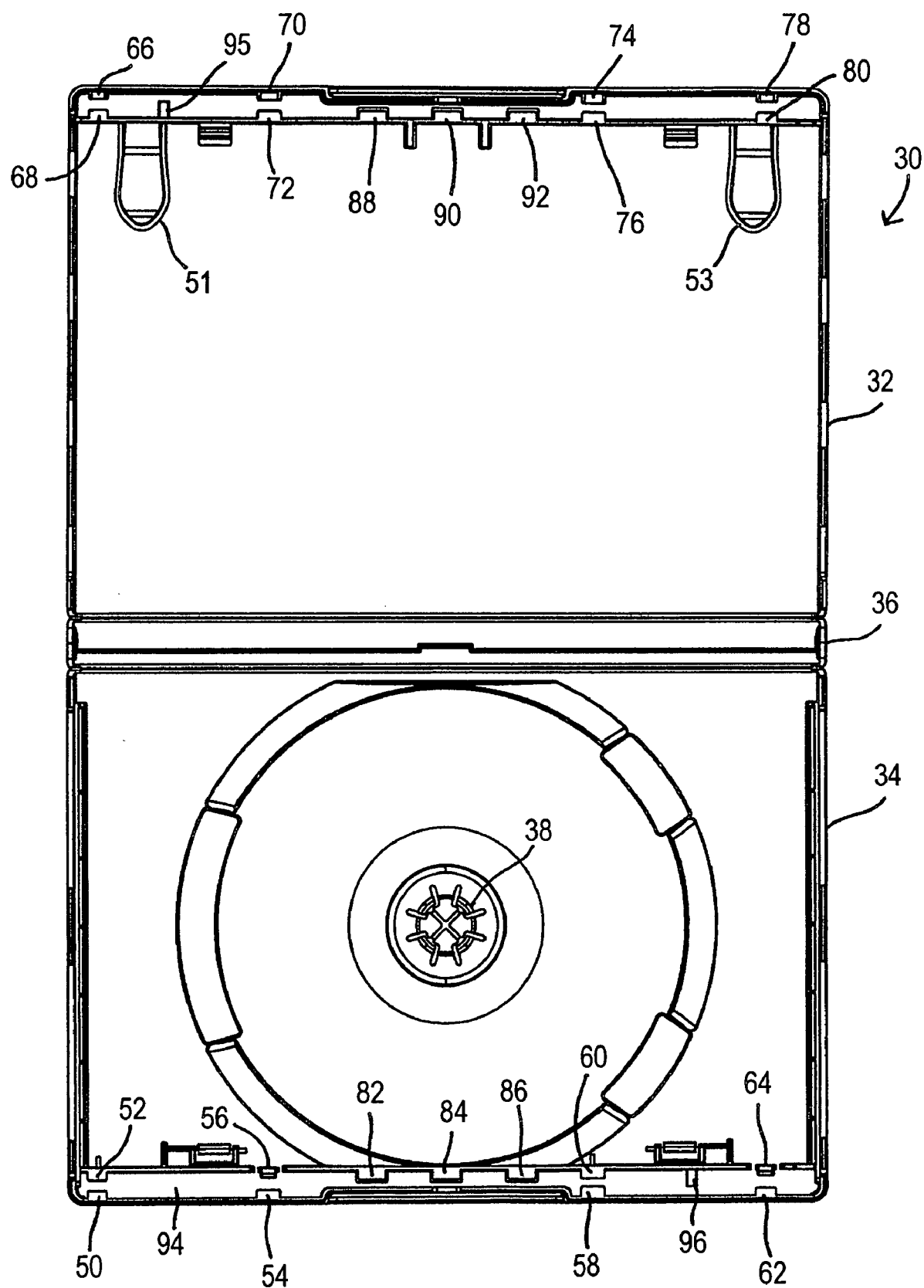
FIG. 2 is a top plan view of an illustrative lockable container for securing a storage medium in accordance with the present invention.
Figure 3:
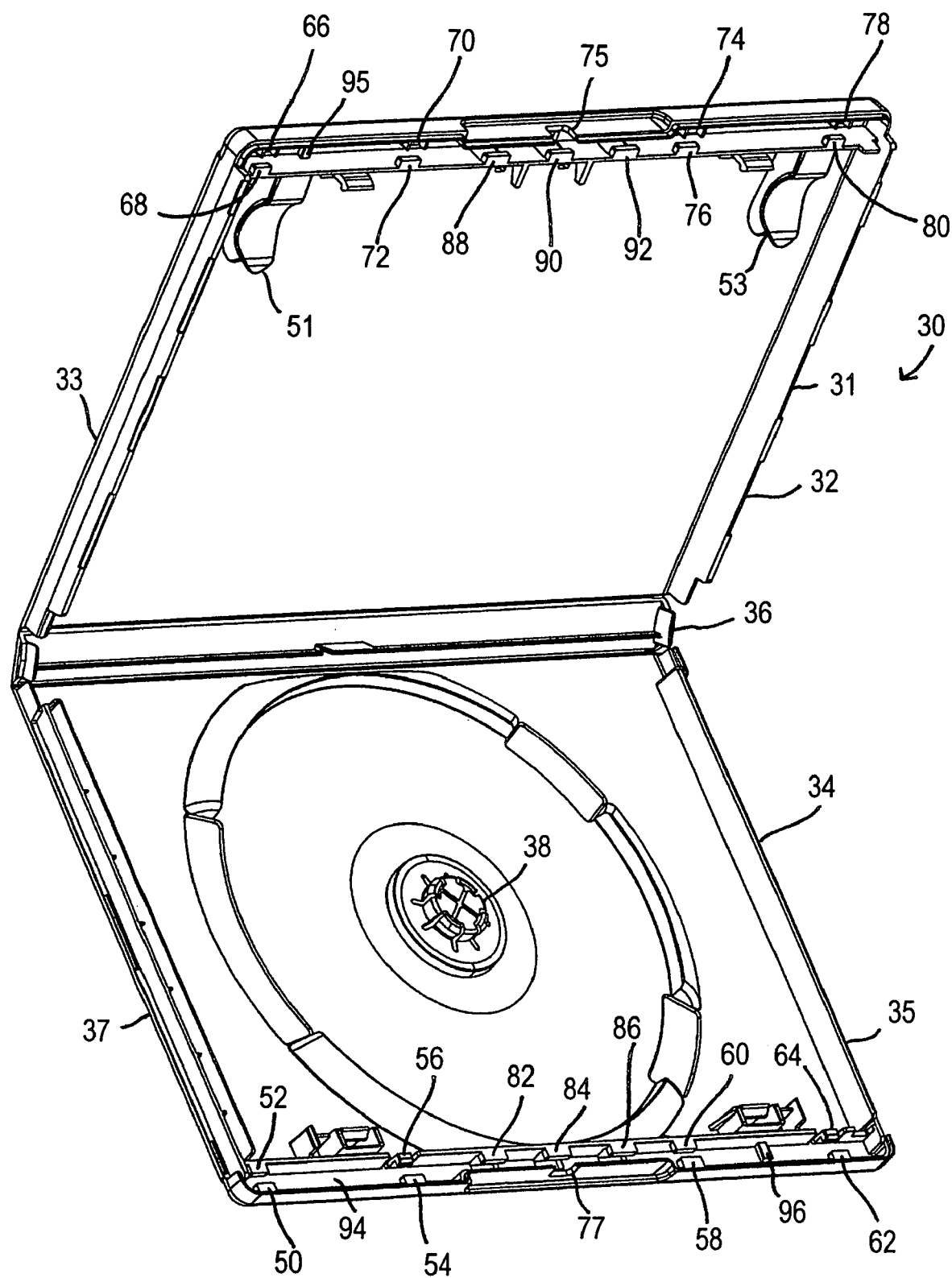
FIG. 3 is a perspective view of the lockable container of FIG. 2 in accordance with the present invention.

FIGS. 2 and 3 show a top plan view and a perspective view, respectively, of an illustrative lockable container 30 for securing a storage medium in accordance with the present invention. Container 30 includes a first cover 32, a second cover 34, and a spine 36 disposed therebetween. First cover 32 and second cover 34 are pivotally coupled to spine 36 to form a living hinge.

First cover 32 may include two resilient document retaining members 51 and 53 which may be used to retain documents, such as a booklet related to the storage media secured within container 30.

Second cover 34 may receive and retain a storage medium or other asset with a hub 38, which is shown in more detail in FIG. 4. In use, when a storage medium (not shown) is placed upon hub 38, the opening in the center of the storage medium is placed around resilient members 40. (It should be noted that while four resilient members 40 are shown, this is merely illustrative, and any suitable number of resilient members may be used.) A downward force is applied to the storage medium which causes resilient members 40 to bend further inwardly into voids 42, due to the engagement of the opening of the storage medium with resilient members 40. Upon the application of sufficient downward force upon the storage medium, resilient members 40 bend inwardly far enough such that the circumference around resilient members 40 is less than the circumference of the opening in the storage medium, thereby allowing the storage medium to be placed upon frustum 44. At this point, resilient members 40 resume their original positioning due to their natural resiliency, and the storage medium is retained on frustum 44. To remove the storage medium, a user may apply a force upon hub 38, allowing the user to lift the storage medium off of the hub. Thus, the storage medium may be safely placed upon and removed from hub 38 without being damaged.

It should be noted that hub 38 of FIG. 4 is merely illustrative, and that any suitable hub may be used to receive and retain a storage medium within container 30. For example, exemplary hubs are described in U.S. patent application Ser. No. 09/696,614, filed Oct. 25, 2000 and U.S. patent publication No. 2002/0023853, published Feb. 28, 2002, both of which are hereby incorporated by reference herein in their entireties.

Like the illustrative lockable container described hereinabove in connection with FIG. 1, container 30 is designed to work in conjunction with an internal locking member. An illustrative locking member 100 for use with container 30 is shown in FIGS. 5 and 6. Locking member 100 may include a plurality of I-beam engagement portions that interact with a plurality of corresponding I-beam engagement tabs or protrusions formed in one or both of first and second covers 32 and 34. As more fully explained below, locking member 100 locks container 30 in a closed position by trapping the corresponding engagement tabs formed in one or both of first and second covers 32 and 34 together in locking trenches of the I-beam engagement portions.

Locking member 100 includes at least one spring-arm arranged on an end of the locking member that is configured to magnetically couple with an external magnetic key arrangement (see, for example, key arrangement 300 of FIG. 15, which will be described in detail hereinbelow). The spring arm causes locking member 100 to alternately move into the locked and unlocked positions. In the embodiment shown in FIGS. 5 and 6, and as more fully explained below, locking member 100 includes spring arms 102 and 104 arranged on opposite ends of the locking member.

As shown in FIGS. 5 and 6, locking member 100 includes multiple I-beam engagement portions for engaging associated tabs or protrusions within container 30. Locking member 100 includes three engagement portions 106, 108, and 110 that will be referred to herein as "single engagement portions." "Single engagement portion" shall refer to an engagement portion that has no corresponding engagement portion on the opposite side of locking member 100. Locking member 100 includes eight engagement portions 112 and 114, 116 and 118, 120 and 122, and 124 and 126 that will be referred to herein as "double engagement portions." "Double engagement portion" shall refer to an engagement portion that has a corresponding engagement portion on the opposite side of locking member 100. (It should be noted that although locking member 100 is described herein as having three single engagement portions and eight double engagement portions, this arrangement is merely illustrative, and locking member 100 may have any suitable arrangement and number of engagement portions.)

The double engagement portions of locking member 100 (i.e., portions 112-126) are configured to engage associated tabs of first cover 32 and second cover 34 of container 100 (see FIGS. 2 and 3). In connection with second cover 34, the double engagement portions engage the tabs as follows: double engagement portions 112 and 114 are configured to engage tabs 50 and 52, respectively; double engagement portions 116 and 118 are configured to engage tabs 54 and 56, respectively; double engagement portions 120 and 122 are configured to engage tabs 58 and 60, respectively; and double engagement portions 124 and 126 are configured to engage tabs. 62 and 64, respectively. In connection with first cover 32, the double engagement portions engage the tabs as follows: double engagement portions 112 and 114 are configured to engage tabs 66 and 68, respectively; double engagement portions 116 and 118 are configured to engage tabs 70 and 72, respectively; double engagement portions 120 and 122 are configured to engage tabs 74 and 76, respectively; and double engagement portions 124 and 126 are configured to engage tabs 78 and 80, respectively.

Single engagement portions 106, 108, and 110 are configured to engage tab portions 82, 84, and 86 of second cover 34 and corresponding respective tabs 88, 90, and 92 of first cover 32.

Each engagement portion (i.e., engagement portions 106-126) includes a locking trench and a release trench. The various locking trenches are designed so that when container 30 is closed and the tab portions on first cover 32 are aligned with the corresponding tab portions on second cover 34, locking member 100 slides into the locked position so that each locking trench catches and traps the corresponding tab portions therebetween, preventing the corresponding tab portions from being separated. This alignment prevents container 30 from being opened.

In particular, engagement portions 106, 108, and 110 each have locking and release trenches 128 and 130, 132 and 134, and 136 and 138, respectively. Engagement portions 112 and 114 include locking trenches 140 and 142, respectively. With regard to release trenches for engagement portions 112 and 114, the engagement portions share a "release trench" 93 in container 30 (see FIG. 7). In actuality, release trench 93 is a space within container 30. Engagement portions 116 and 118 each include locking and release trenches 144 and 146, and 148 and 150, respectively. Engagement portions 120 and 122 each include locking and release trenches 152 and 154, and 156 and 158, respectively. Engagement portions 124 and 126 each include locking and release trenches 160 and 162, and 164 and 166, respectively.

Figure 8:
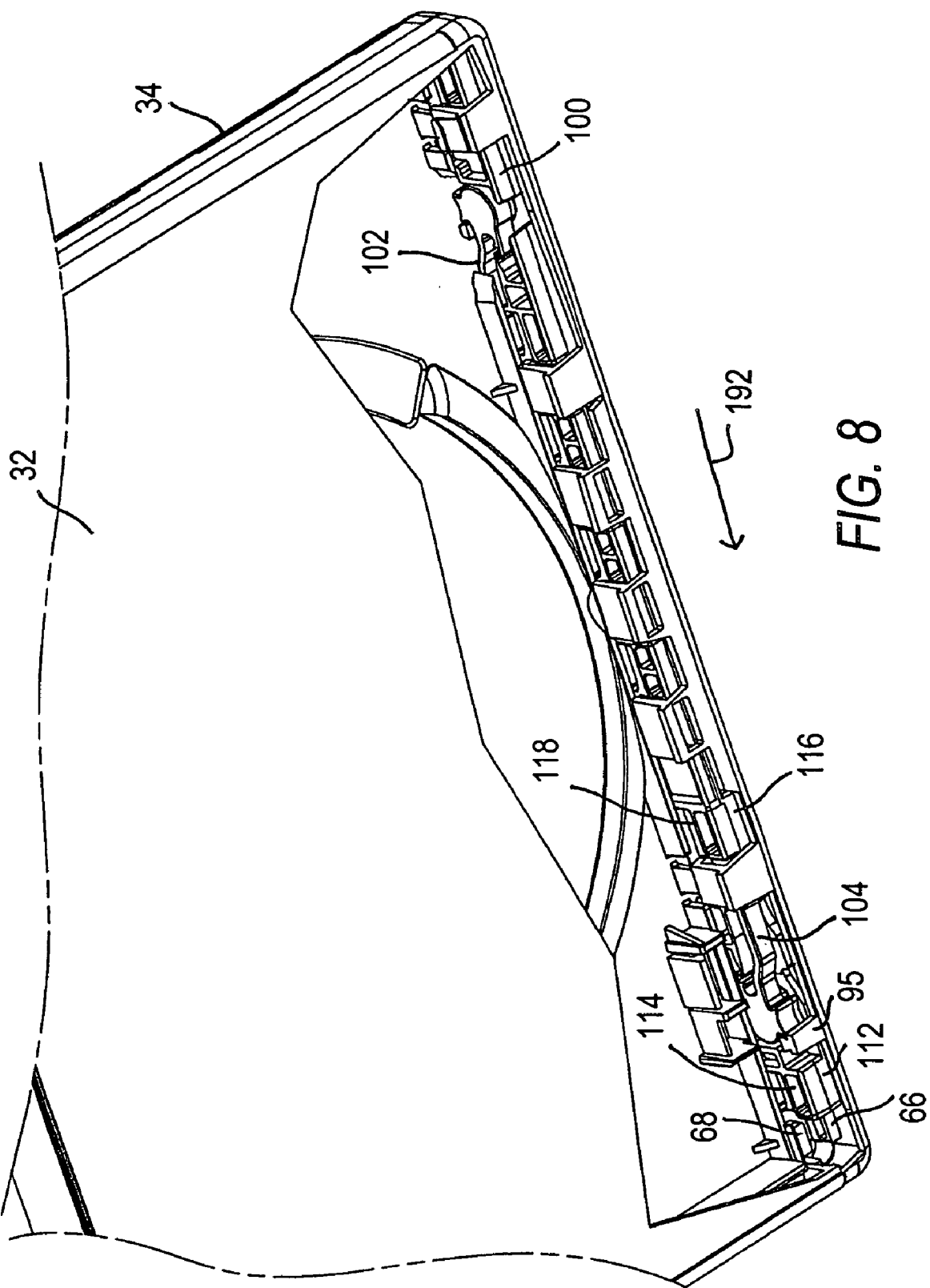
FIG. 8 is a partially cut-away perspective view of the assembly of FIG. 7 in which the container is in an unlocked state in accordance with the present invention.
Figure 9:
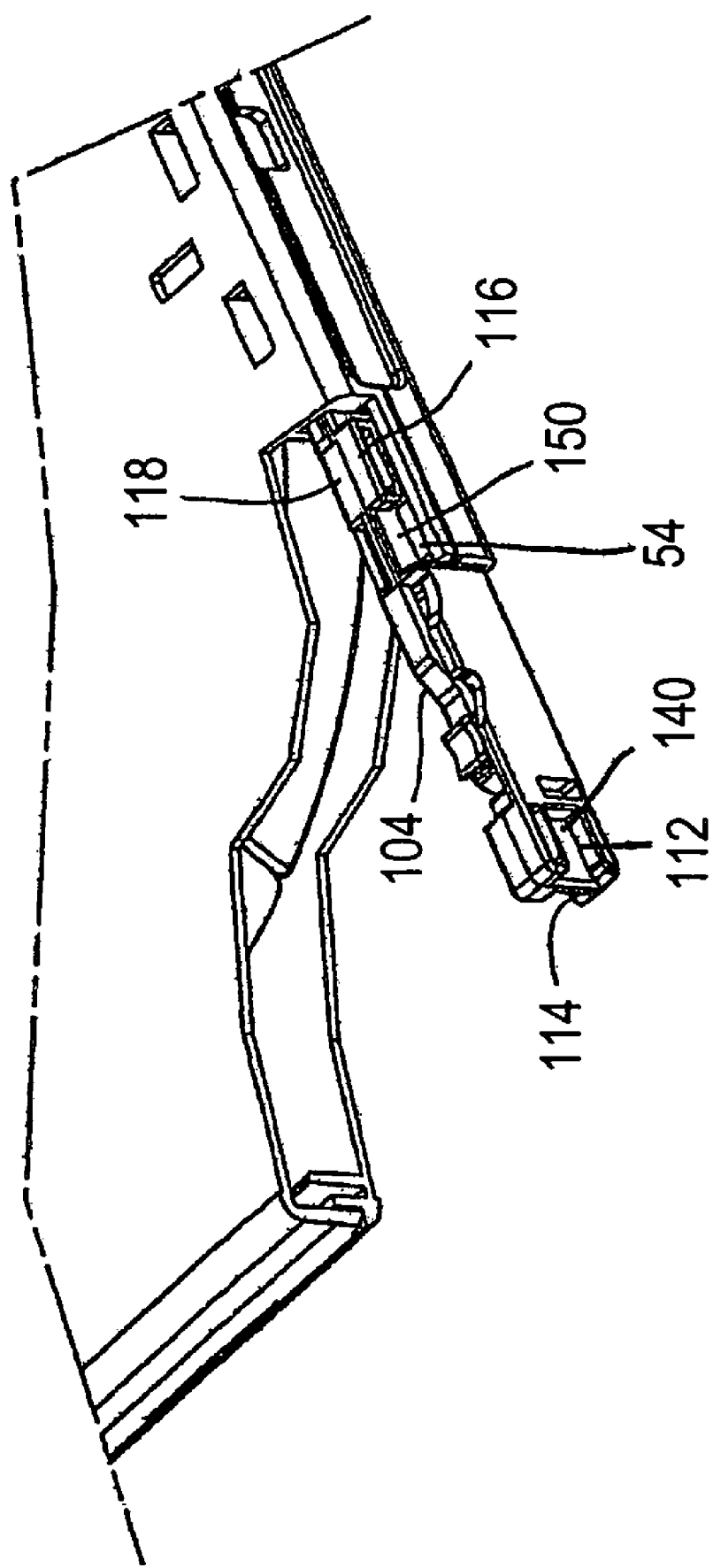
FIG. 9 is another partially cut-away perspective view of the assembly of FIG. 7 in which the container is in an unlocked state in accordance with the present invention.

A simplified example of the interaction between tabs of first and second covers 32 and 34 and locking and release trenches of locking member 100 is as follows. When first cover 32 is closed upon second cover 34, tabs 66 and 68 face corresponding tabs 50 and 52, respectively, and tab 88 faces corresponding tab 82. In this position, tabs 50 and 66 sit within and traverse release trench 93 (i.e., space 93) of container 30, tabs 52 and 68 sit within and traverse release trench 93 of container 30, and tabs 88 and 82 sit within and traverse release trench 130 of single engagement portion 106. Because the tabs sit within the release trenches and are able to traverse the trenches, the container can be opened (see, for example, locking member 100 in an unlocked position in FIGS. 8 and 9).

To lock container 30, locking member 30 is made to slide in a direction that engages the corresponding tabs with the appropriate locking trenches. This traps the corresponding tabs within the locking trenches and prevents the tabs from separating and, consequently, the container from opening. In other words, the container may not be opened, since the associated tabs of first cover 32 are prevented from freely traversing the various release trenches when the first cover is pulled away from second cover 34. For example, when locking member 30 is slid into the locked position, the corresponding tabs 50 and 66 are caught within locking trench 140 of double engagement portion 112, corresponding tabs 52 and 68 are caught within locking trench 142 of double engagement portion 114, and corresponding tabs 82 and 88 are caught within locking trench 128 of single engagement portion 106. The locking trenches prevent tabs 66 and 68 of first cover 32 from separating from corresponding tabs 50 and 52, respectively, of second cover 34, and prevent tab 88 of the first cover from separating from corresponding tab 82 of the second cover. The remaining tab portions are similarly caught within the corresponding locking trenches to securely lock the container in a closed position.

Figure 7:
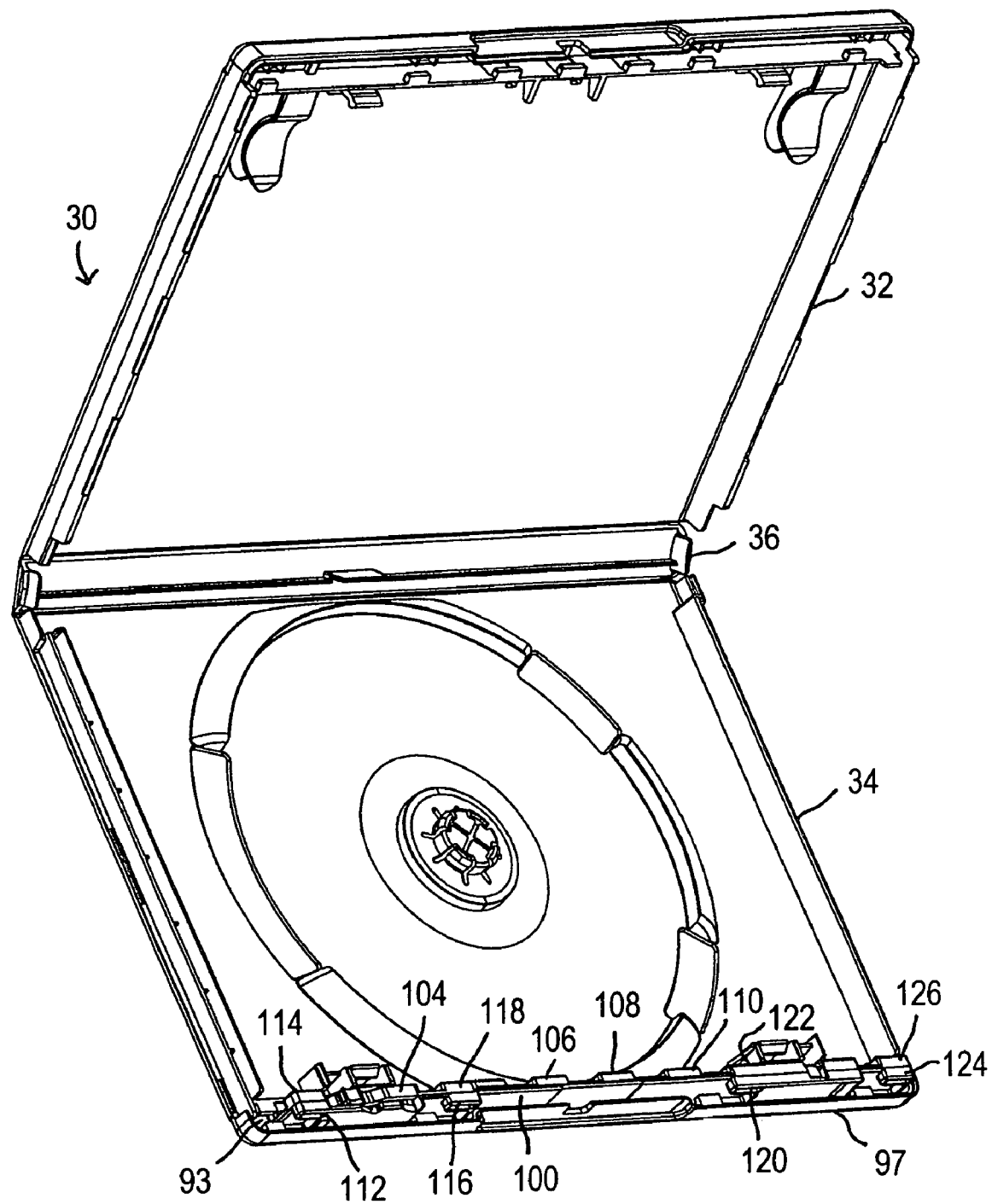
FIG. 7 is a perspective view of an assembly of the lockable container of FIG. 2 and the locking member of FIG. 5 in accordance with the present invention.

FIG. 7 shows container 30 with locking member 100 inserted therein in the unlocked position. Locking member 100 may be inserted into container 30 after the container has been manufactured. For example, locking member 100 may be snapped into place within container 30 at the location in which the container is manufactured. As shown in FIG. 7, in some embodiments of the present invention, at least one end of locking member 100 may be extended to the edge of container 30 to provide more security. This may prevent, for example, a thief from prying at the corners of container 30 to attempt to open the container.

In some embodiments, during the molding or stamping process of container 30, locking member 100 may be fabricated offline and assembled, if necessary. Locking member 100 may subsequently be inserted into container 30 during the last stage of the molding or stamping process, prior to closing the container and before a film is attached.

Locking member 100 sits in second cover 34 in a lock-receiving space 94 (FIG. 2), preferably in a sliding engagement within the space. This may be accomplished by any suitable method. For example, as described hereinabove, locking member 100 may be snap-fit into lock receiving space 94 (FIG. 2) by fitting engagement portions 116 and 118, and 124 and 126, between tabs 56 and 54, and 64 and 62, respectively. The tabs keep locking member 100 securely in place.

As shown in FIGS. 5 and 6, locking member 100 includes two spring-arms 102 and 104 that are integrally formed with the locking member. (It should be noted that the embodiment shown in the FIGS. in which the spring arms are formed with the locking member is merely illustrative. The spring arms may alternatively be integrally formed with one or both of first cover 32 and second cover 34.) Spring arms 102 and 104 are configured to work in conjunction with a stop 95 formed in first cover 32 and a stop 96 formed in second cover 34, respectively. Spring arms 102 and 104 are configured to be acted upon by a magnetic key arrangement, for example, to allow locking member 100 to selectively move into the locked and unlocked positions. For this purpose, spring arms 102 and 104 may include locking heads 170 and 168, respectively, having metallic inserts 174 and 172.

Figure 10:
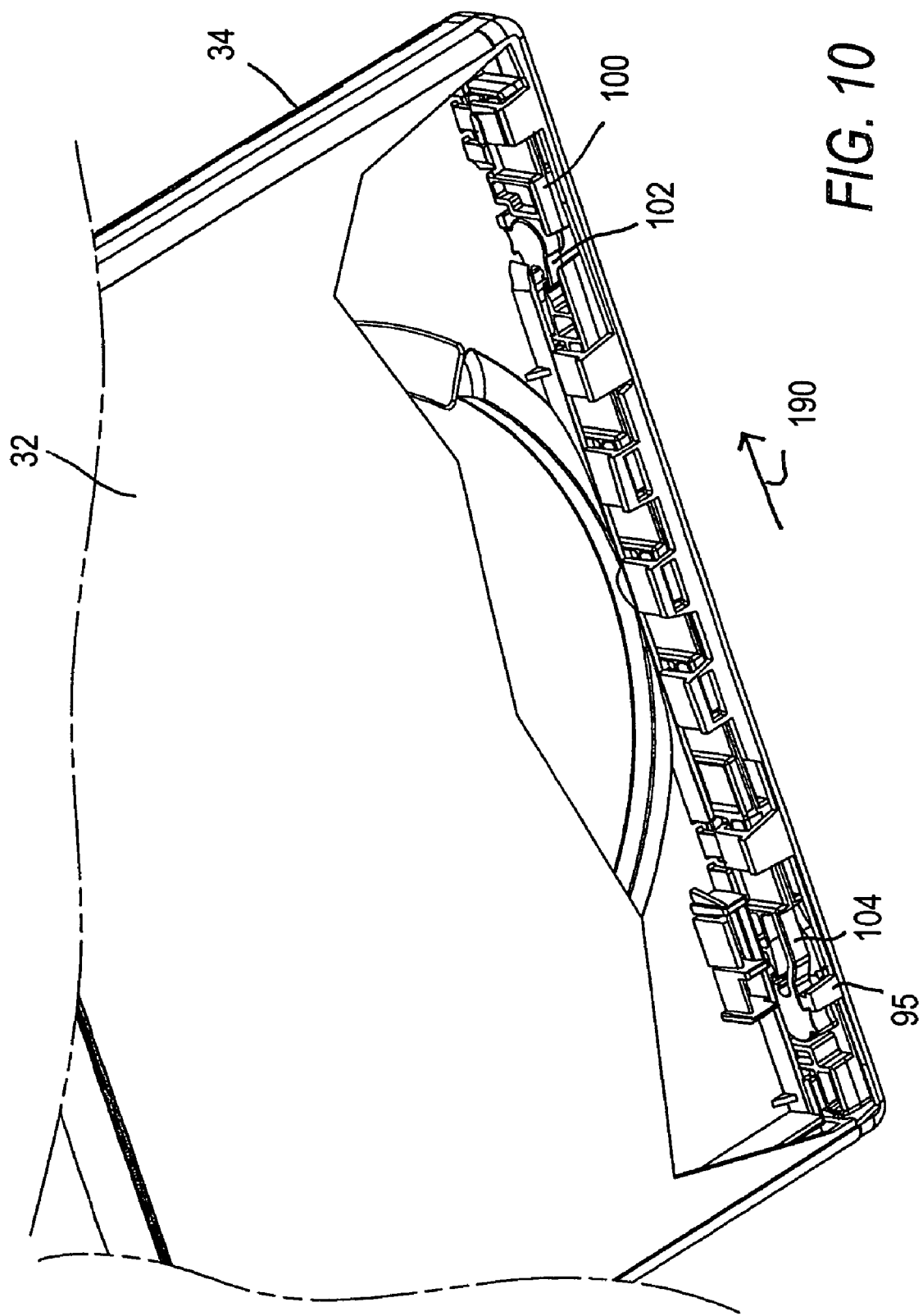
FIG. 10 is a partially cut-away perspective view of the assembly of FIG. 7 in which the container is in a locked state in accordance with the present invention.
Figure 11:
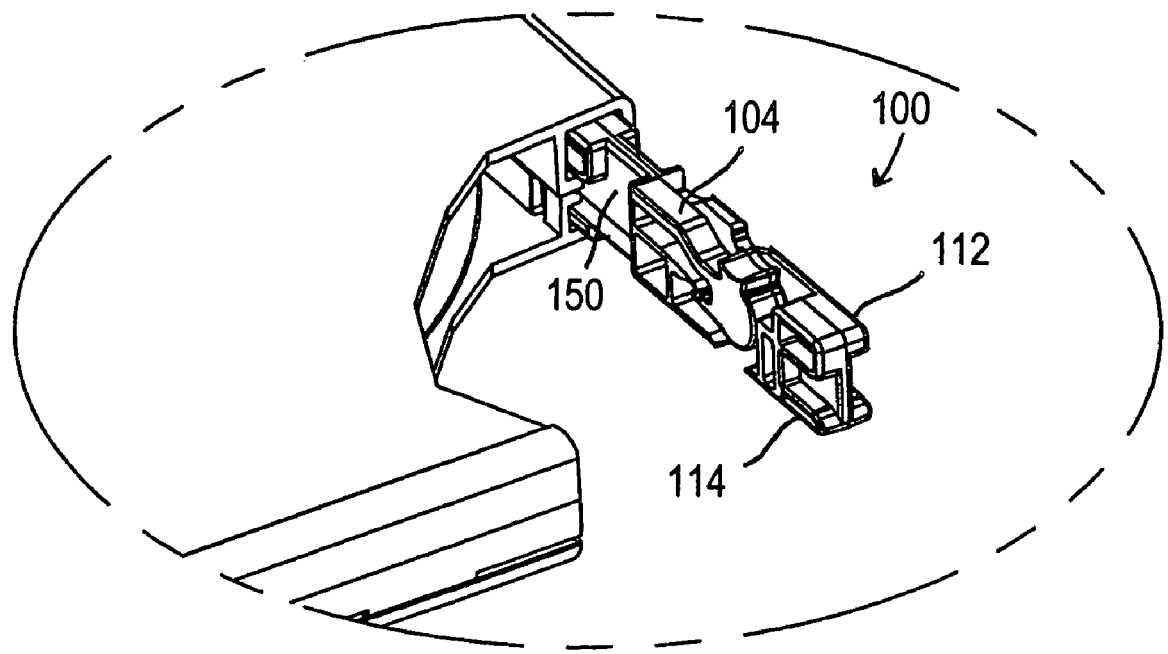
FIGS. 11 and 12 are other partially cut-away perspective views of the assembly of FIG. 7 in which the container is in a locked state in accordance with the present invention.
Figure 12:
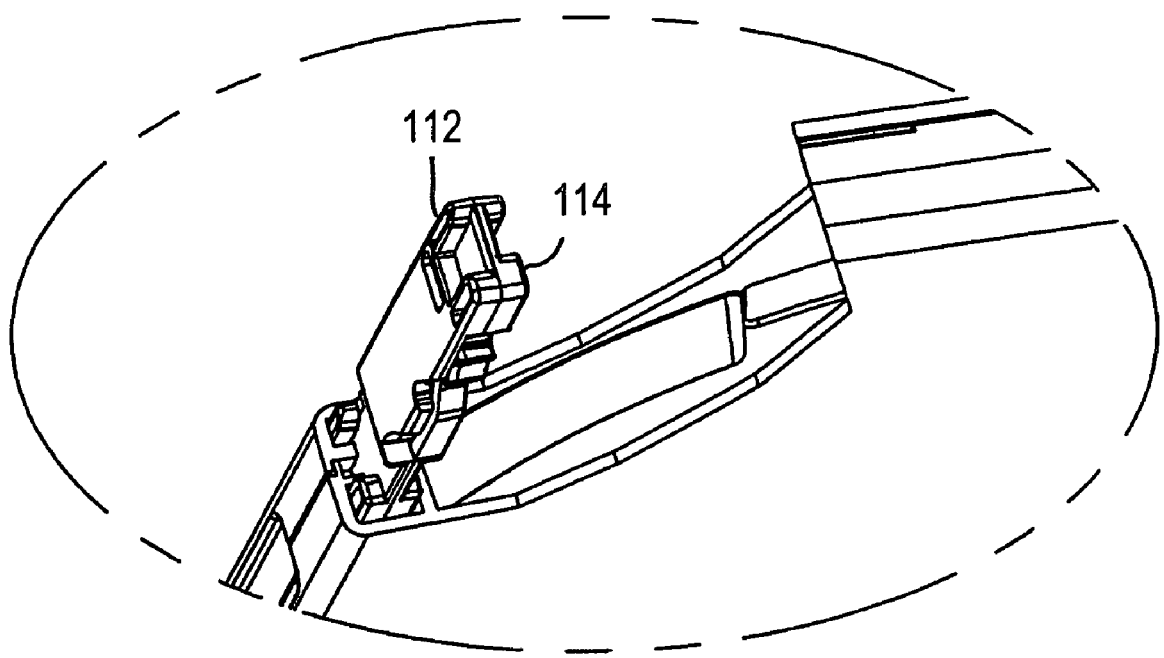

In this manner, a first magnetic arrangement of a magnetic key arrangement (e.g., magnetic key arrangement 300 of FIG. 15) operates to displace spring arm 104 in direction 176, while a second magnetic arrangement of the magnetic key arrangement operates to displace spring arm 102 in direction 178. In particular, spring arms 102 and 104 each include locking heads 170 and 168, respectively, having locking surfaces 171 and 169, respectively. Locking surfaces 171 and 169 are configured to engage respective stops 96 and 95 to lock and unlock container 30. Once spring arms 102 and 104 are displaced, the spring arms can clear associated stops 95 and 96. In this manner, locking member 100 may be slideably displaced into either the locked position (as shown, for example, in FIGS. 8 and 9) or the unlocked position (as shown, for example, in FIGS. 10-12).

For example, first and second magnetic arrangements of a magnetic key arrangement (see, for example, magnetic key arrangement 300 of FIG. 15) may attract spring arms 104 and 102, thereby displacing the spring arms in directions 176 and 178, respectively. The first and second magnetic arrangements of the magnetic key arrangement may maintain spring arms 104 and 102 within first and second magnetic fields created by the first and second magnetic arrangements while container 30 slides through a channel in the magnetic key arrangement. This magnetic attraction holds locking member 100 in place, allowing locking surfaces 171 and 169 to clear stops 95 and 96, respectively, when container 30 moves within the channel of the magnetic key arrangement. The relative motion between locking member 100 and container 30 results in positioning the locking member into either a locked or unlocked position.

In some embodiments of the present invention in which spring arms 102 and 104 are integrally formed (e.g., molded) with locking member 100, the spring arms may need to be rotated out of alignment with the longitudinal axis of the locking member so that magnetic inserts 174 and 172 are properly positioned within the spring arms. The process of rotating each of spring arms 102 and 104 out of alignment with locking member 30, however, may cause an unwanted bias on the spring arms, thereby causing locking heads 170 and 168 to be displaced outward in a direction perpendicular to the longitudinal axis of the locking member. Accordingly, each spring arm 102 and 104 may be provided with hooks 184 and 180, and hook catches 186 and 182, respectively. In this manner, spring arms 102 and 104 may be properly positioned after inserting magnetic inserts 174 and 172, respectively, so that the spring arms do not protrude perpendicularly to the longitudinal axis of locking member 100.

Figure 13:
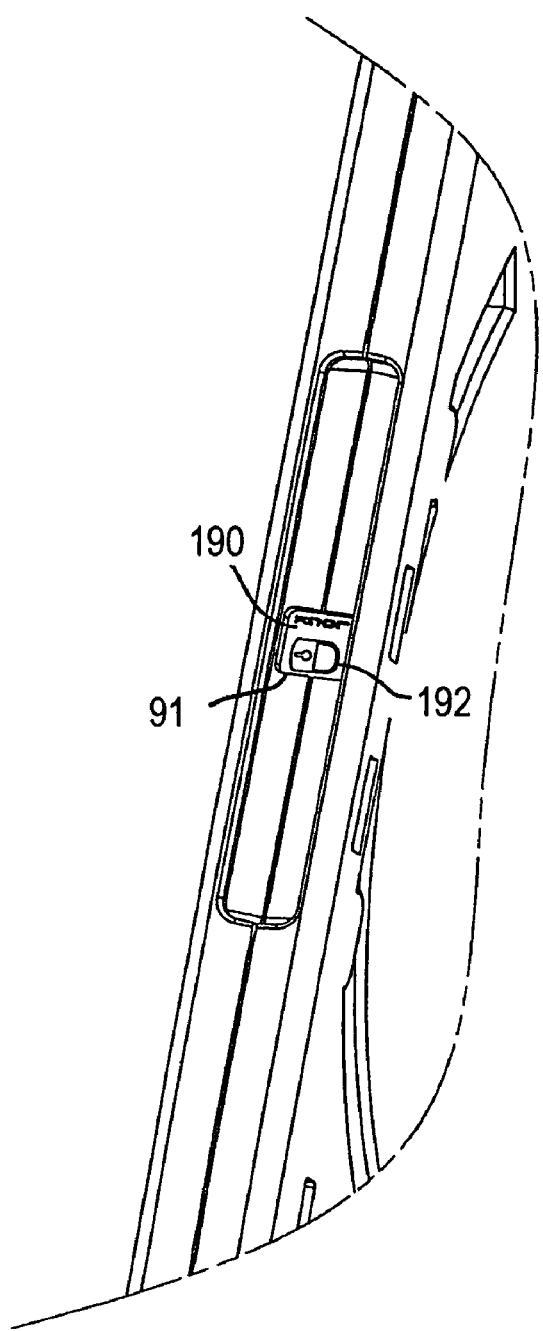
FIG. 13 is a perspective view of an illustrative status window indicating that a container is in a locked state in accordance with the present invention.
Figure 14:
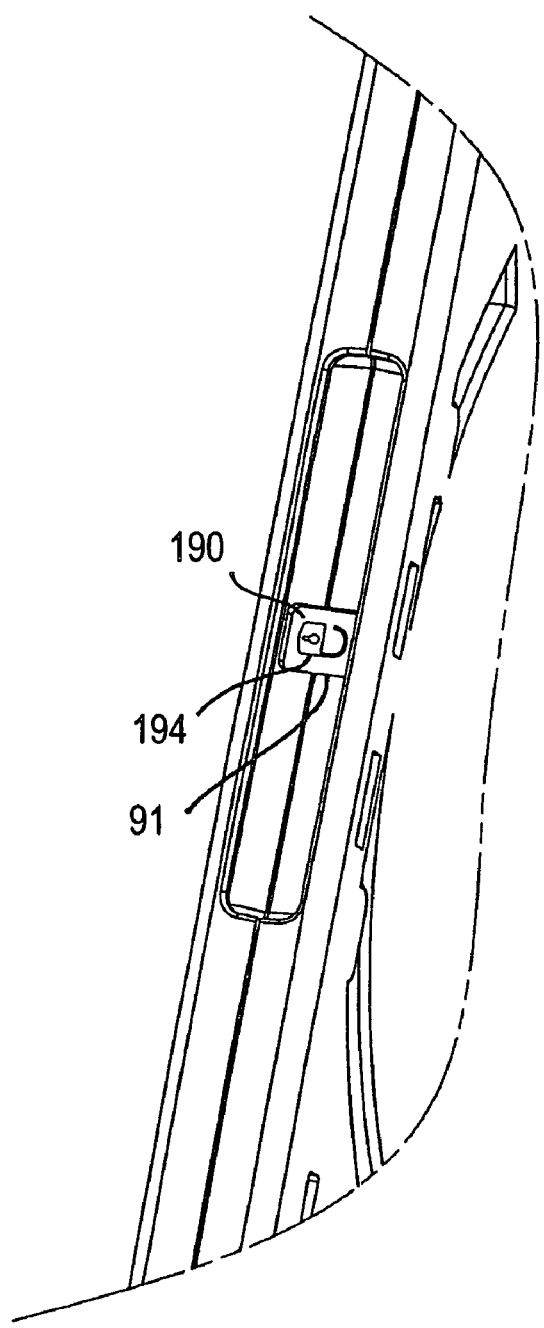
FIG. 14 is a perspective view of an illustrative status window indicating that a container is in an unlocked state in accordance with the present invention.

As shown in FIGS. 13 and 14, container 30 may include a status window 91 for indicating the locked or unlocked status of the container. In one example, first and second covers 32 and 34 may include respective cut-outs 75 and 77 (see FIG. 3) that, when combined upon closure of container 30, form status window 91. In some embodiments, status window 91 allows a user to view at least of portion of locking member 100.

As shown in FIGS. 13 and 14, status portion 190 on the face of locking member 100 includes locking and unlocking status information. The status information may be placed thereon by any of the known methods. When the locking member 100 is slid between the locked and unlocked positions, the appropriate status information, and consequently the position of the locking member, appears through status window 91 for a user to read. In one example, status portion 190 of locking member 100 may include a sticker that shows a green opened lock 194 and a red closed lock 192. Thus, when locking member 100 is slid into the locked position, red closed lock 192 shows through status window 91 (FIG. 13). When locking member 100 is slid into the unlocked position, green opened lock 194 shows through status window 91 (FIG. 14).

Figure 15:
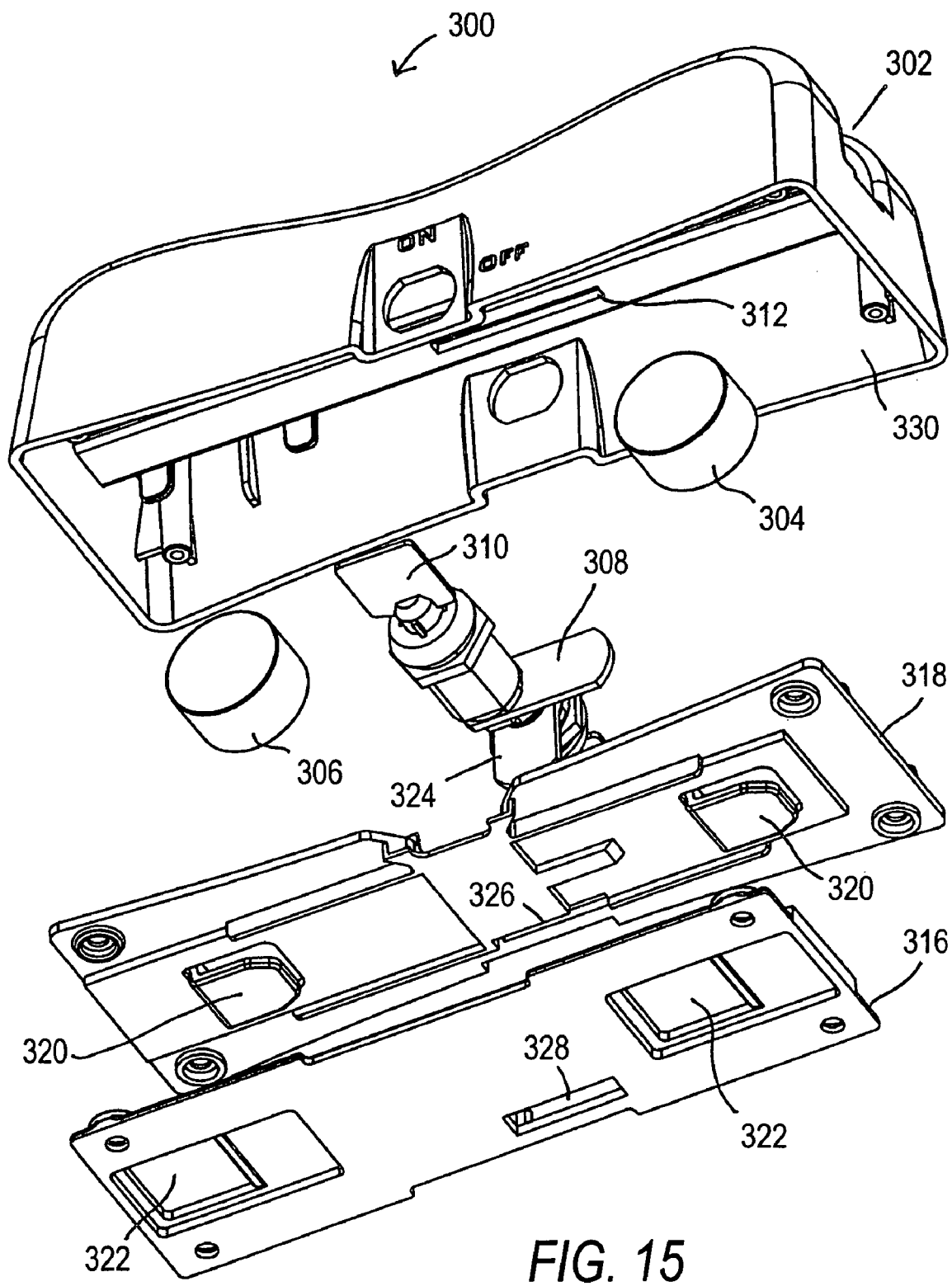
FIG. 15 is an exploded perspective view of an illustrative magnetic key arrangement in accordance with the present invention.
Figure 16:
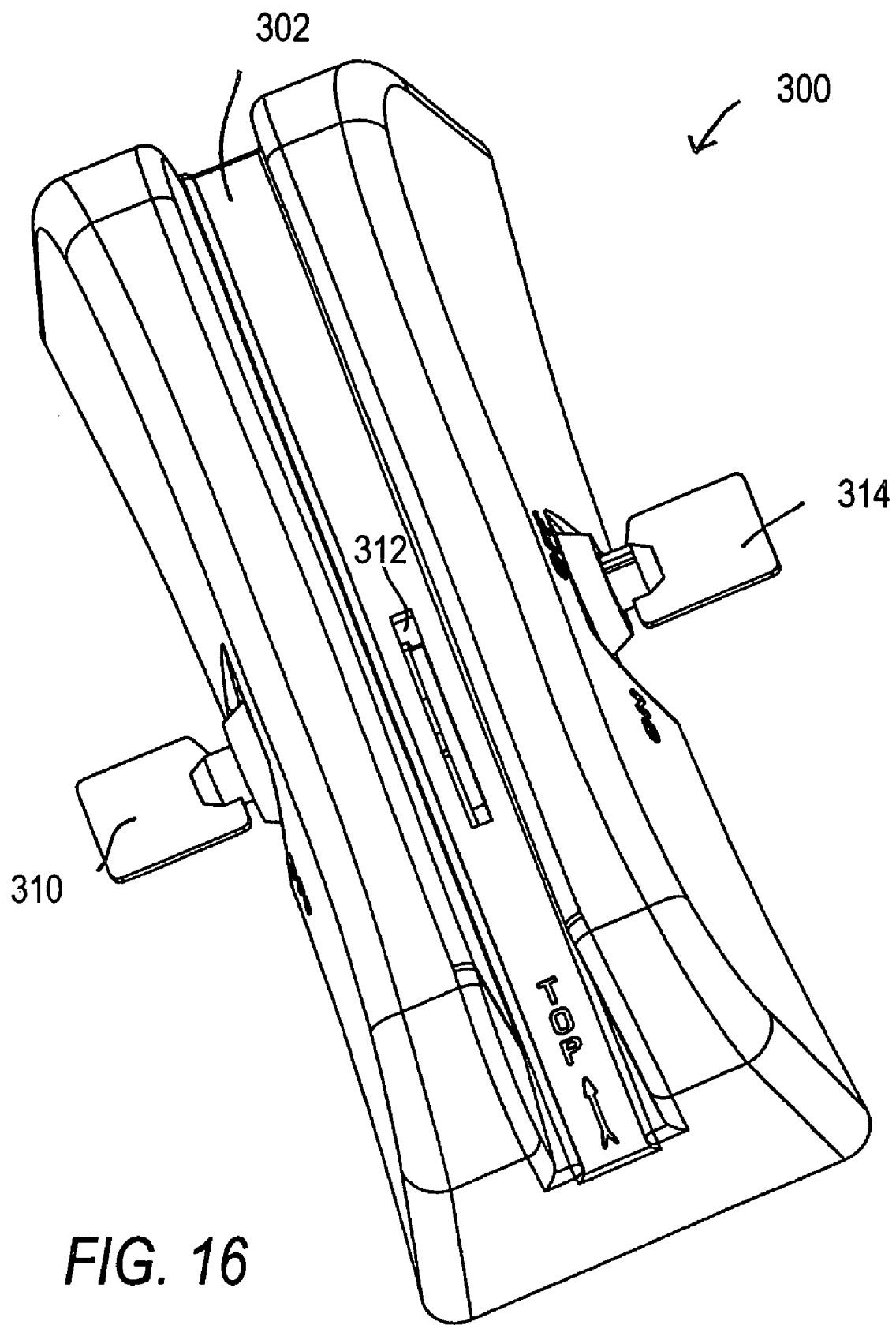
FIG. 16 is a perspective view of the magnetic key arrangement of FIG. 15 in which the key arrangement is in an unlocked state in accordance with the present invention.
Figure 17:
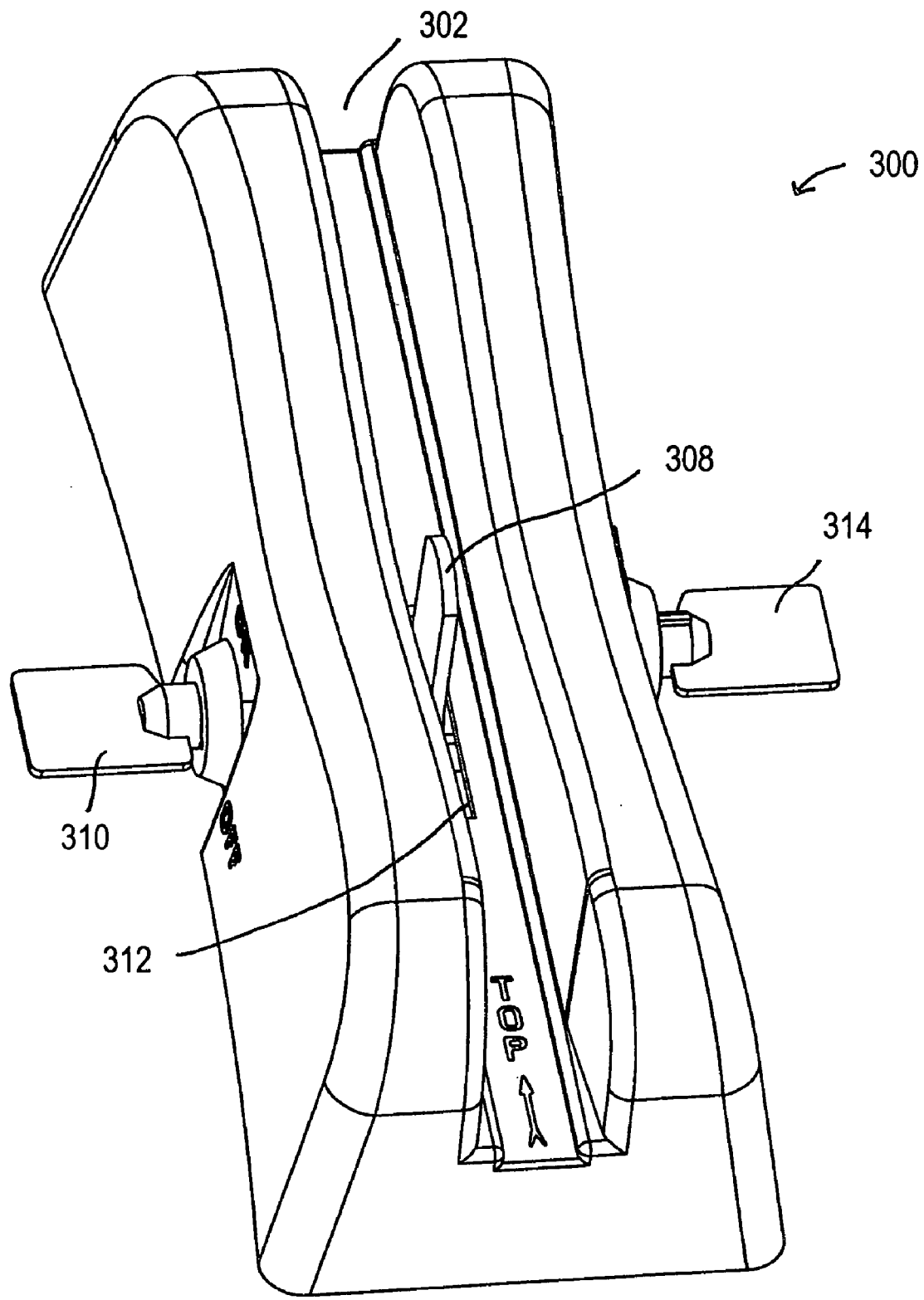
FIG. 17 is a perspective view of the magnetic key arrangement of FIG. 15 in which the key arrangement is in a locked state in accordance with the present invention.

FIGS. 15-17 show an exemplary magnetic key arrangement 300 in accordance with the present invention. FIG. 15 shows an exploded perspective view of magnetic key arrangement 300. Magnetic key arrangement 300 may be used, for example, in connection with container 30 and locking member 100 to position the locking member in the locked and unlocked positions with respect to the container. Magnetic key arrangement 300 may include a channel 302 for receiving a side edge 97 (FIG. 7) of container 30. Magnetic key arrangement may include a first magnetic arrangement 304 and a second magnetic arrangement 306 embedded in opposite sides and opposite ends of the magnetic key arrangement. Magnets 304 and 306 may be, for example, non-commercial magnets that are not readily available. Magnets 304 and 306 may be of different sizes, thereby making the magnets even more difficult to manipulate.

In an exemplary embodiment, first and second magnetic arrangements 304 and 306 are magnets or the like designed to interact with metallic inserts 172 and 174 (FIG. 6) to displace spring arm 104 in direction 176 (magnetic arrangement 306) and spring arm 102 in direction 178 (magnetic arrangement 304) to unlock container 30. Similarly, first and second magnetic arrangements 304 and 306 are magnets or the like designed to interact with metallic inserts 172 and 174 (FIG. 6) to displace spring arm 102 in direction 176 (magnetic arrangement 306) and spring arm 104 in direction 178 (magnetic arrangement 304) to lock container 30.

It should be noted that although key arrangement 300 of the present invention shows first and second magnet arrangements 304 and 306, the number of magnets and combinations thereof may be increased as desired. For example, key arrangement 300 may include three magnets, rendering it extremely difficult for a thief to properly manipulate three magnets to unlock container 30.

Magnetic key arrangement 300 may include exemplary security features such as, for example, a key-lock feature, a key-lock counter-mount feature, a benefit-denial feature, or any combination thereof. These features will be described in detail hereinbelow.

The "key-lock" feature of the present invention locks magnetic key arrangement 300 closed, thereby preventing its use to unlock container 30 if, for example, a cash register is unmanned or if a store is closed. In some embodiments, channel 302 includes a blocking member or bar 308, operatively connected to a key assembly 310. Key assembly 310 is structured and arranged to move blocking member 308 into a locked position (FIG. 17) and an unlocked position (FIG. 16).

To move blocking member 308 into the locked position (FIG. 17), an appropriate key is inserted into key assembly 310 and turned. Bar 308 is then released, thereby causing bar 308 to extend in a perpendicular direction with respect to the surface of channel 302. In this locked position, bar 308 prevents container 30 from "sliding" through channel 302, rendering magnetic key arrangement 300 inoperable. This prevents unauthorized use of magnetic key arrangement 300 to unlock or lock container 30. For example, a thief may be prevented from simply walking over to an unmanned register and unlocking container 30. The key-lock feature of the present invention also prevents internal theft by rendering magnetic key arrangement 300 inactive after the store is closed.

To unlock magnetic key arrangement 300 (FIG. 16), the appropriate key is inserted into key assembly 310 and turned in a direction that moves bar 308 out of channel 302. In some embodiments, to move bar 308 out of channel 302, the bar may be rotated out of the channel such that it rests in a groove 312 that extends below the surface of channel 302 (see, for example, FIG. 16).

The "key-lock counter-mount" feature of the present invention permits magnetic key arrangement 300 to be securely and detachably coupled to, for example, a retail store checkout counter. Magnetic key arrangement 300 may be releasably attached by use of a second key arrangement 314 that locks and unlocks magnetic key arrangement 300 to the counter. Second key arrangement 314 works in connection with a permanent mounting plate 316 that is permanently affixed to a checkout counter using any suitable method.

In some embodiments, magnetic key arrangement 300 may be releasably attached to mounting plate 316 by a bottom cover 318. Bottom cover 318 may include hook portions 320 that are constructed and arranged to slidingly engage into associated catch portions 322 formed in mounting plate 316. Hook portions 320 may be strong enough so that a potential thief can not forcibly remove magnetic key arrangement 300 from mounting plate 316. For example, hook portions 320 may include reinforced walls for increased strength.

Second key arrangement 314 includes a second blocking member or bar 324 that is constructed and arranged to traverse grooves 326 and 328 of bottom cover 318 and mounting plate 316, respectively. Grooves 326 and 328 are aligned in a linear relationship when bottom cover 318 of magnetic key arrangement 300 is slidingly engaged to mounting plate 316. When second bar 324 traverses grooves 326 and 328, bottom cover 318 is prevented from sliding out of engagement with mounting plate 316.

To move second bar 324 into a locked position in which magnetic key arrangement 300 is locked to a checkout counter, bottom cover 318 is slid into engagement with mounting plate 316. An appropriate key is then inserted into second key assembly 314 and turned. Bar 324 is then released, thereby causing the bar to extend into and traverse grooves 326 and 328. To unlock magnetic key arrangement 300 from the counter, the appropriate key is inserted into key assembly 314 and turned in a direction that moves bar 322 out of grooves 326 and 328. Magnetic key arrangement 300 may then be slid out of engagement with mounting plate 316.

The "benefit denial" feature of the present invention may be used in addition to, or in combination with, either of the key-lock or key-lock counter-mount features described hereinabove. With the benefit denial feature, if a thief tries to forcibly tamper with magnetic key arrangement 300 (e.g., by trying to remove it from a retail store checkout counter), magnetic key arrangement 300 is made to "fall apart," rendering it useless. In some embodiments, magnetic key arrangement 300 may be manufactured such that forceful tampering with the unit will cause magnets 304 and 306 to fly together, breaking the unit and rendering it unusable. Magnetic key arrangement 300 may also be manufactured such that it can not be easily reassembled without certain assembly tools.

For security, any of the known EAS or RFID tags (e.g., an AM or RF non-deactivatable security tag) (not shown) may be mounted on mounting plate 318 or within outer casing 330 of magnetic key arrangement 300. In such an embodiment, an AM or RF detector may be placed within a retail store to detect if an unauthorized user attempts to steal magnetic key arrangement 300 or, for example, if a stolen magnetic key arrangement is brought into the store. The non-deactivatable tags may set off alarms, notifying security personnel.

In some embodiments, magnetic key arrangement 300 may be configured to communicate the locking state of lockable container 30 to a user in an audible manner, tactile manner, optical manner, visual manner, or any combination thereof. For example, magnetic key arrangement 300 may include any number of indicators or verification redundancies (e.g., audible, visual, tactile, or optical indicators, or any combination thereof) to indicate the locked or unlocked status of container 30. In one example, magnetic key arrangement 300 may include a speaker arrangement (not shown) for communicating an audible indicator to the user. In another example, magnetic key arrangement 300 may be configured to transmit a tactile indicator to the user, such as a vibration signal through the lockable container. In yet another example, magnetic key arrangement 300 may include at least one light source (e.g., LED, lamp, or any other suitable light source) for communicating an optical indicator to the user.

In some embodiments, magnetic key arrangement 300 may include an "identification, serialization, and web server with database" feature. A bar code (not shown), for example, may be placed on outer casing 330 of magnetic key arrangement 300. The bar code may show, for example, one or more of the product number or serial number, the name or ID number of the store or other authorized user, the date the product was sold, leased or the like to the authorized user, or any other suitable information. This allows stolen magnetic key arrangements to be traced through a database containing serial numbers, manufacturing information and store ID of the key arrangement distributed to retailers, replicators, or the like. The stolen magnetic key arrangement may then be traced back to the last listed authorized user.

Figure 18:
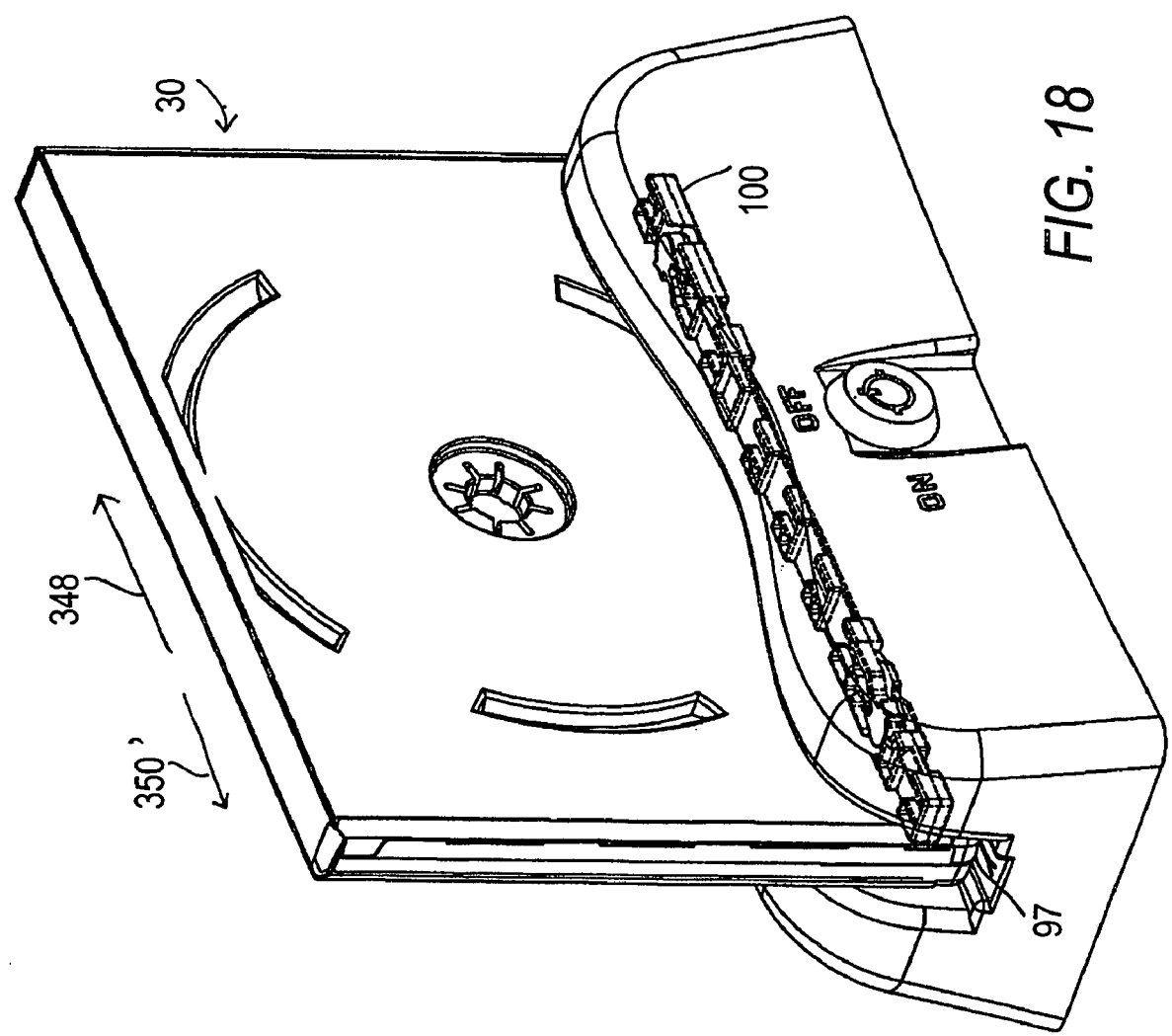
FIG. 18 is a perspective view of the lockable container of FIG. 7 and the key arrangement of FIG. 15 in a position to lock the container in accordance with the present invention.
Figure 19:
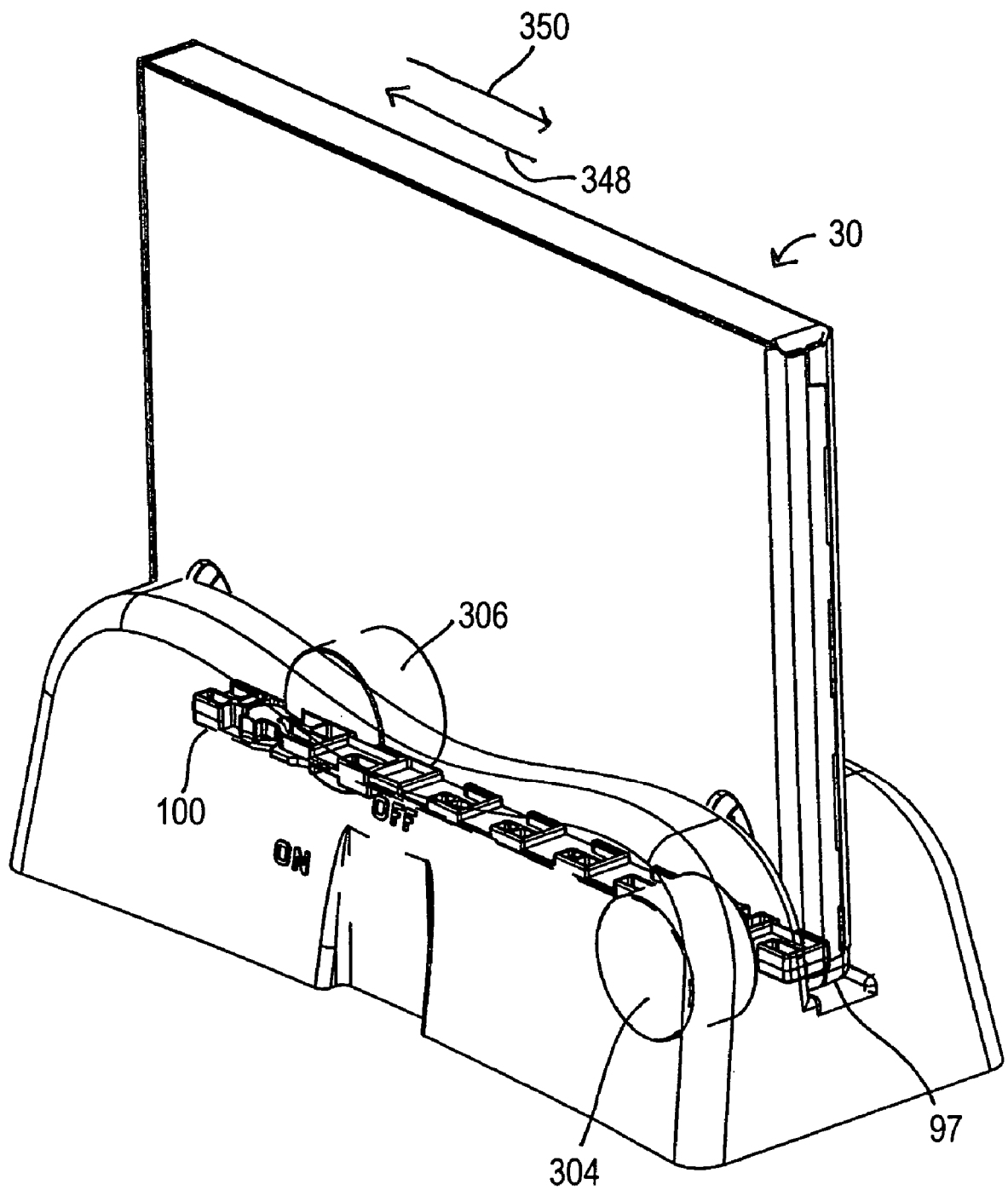
FIG. 19 is a perspective view of the lockable container of FIG. 7 and the key arrangement of FIG. 15 in a position to unlock the container in accordance with the present invention.

FIGS. 18 and 19 demonstrate methods for positioning locking member 100 into the locked and unlocked positions, respectively, within container 30.

To lock container 30 by orienting locking member 100 in the locked position, side edge 97 of container 30 is positioned within channel 302 in the orientation shown in FIG. 18. Spring arm 102 is aligned with magnet 306 (FIG. 15), and spring arm 104 is aligned with magnet 304 (FIG. 15). In this position, metallic insert 174 of spring arm 102 is drawn towards magnet 306, thereby displacing locking head 170 in direction 176 (FIG. 6). At the same time, metallic insert 172 of spring arm 104 is drawn towards magnet 304, thereby displacing locking head 168 in direction 178. The movement of spring arms 102 and 104 displaces the locking surfaces of each spring arm from their respective stops. In particular, locking surface 171 of spring arm 102 is displaced from stop 96, and locking surface 169 of spring arm 104 is displaced from stop 95. This allows locking member 100 to slide freely into the locked position as described hereinabove and as shown, for example, in FIGS. 10-12. Locking member 100 may attain the locked position by the movement of container 30 in direction 348. In actuality, container 30 slides through channel 302 (FIG. 15) while locking member 100 remains stationary, held in place by magnets 304 and 306. In particular, spring arms 102 and 104 may be held in place by the respective magnetic fields created by magnets 306 and 304. After locking member 100 is moved into the locked position, locking surface 171 of spring arm 102 is located on the opposite side of stop 96, and locking surface 169 of spring arm 104 is located on the opposite side of stop 95 (see positioning shown in FIGS. 10-12). Stops 95 and 96 prevent locking member 100 from sliding in direction 190 (FIG. 10), thereby preventing locking member 100 from moving into the unlocked position.

To unlock container 30 by engaging locking member 100 in the unlocked position, side edge 97 of the container is positioned within channel 302 (FIG. 15) in the orientation shown in FIG. 19. Spring arm 102 is aligned with magnet 304, and spring arm 104 is aligned with magnet 306. In this position, metallic pin 174 of spring arm 102 is drawn towards magnet 304 such that locking head 170 is displaced in direction 178 (FIG. 6). At the same time, metallic insert 172 of spring arm 104 is drawn towards magnet 306 such that locking head 168 is displaced in direction 176. The movement of spring arms 102 and 104 displaces the locking surfaces of each spring arm from their respective stops. In particular, locking surface 171 of spring arm 102 is displaced from stop 96, and locking surface 169 of spring arm 104 is displaced from stop 95. This allows locking member 100 to slide freely into the unlocked position as described hereinabove and as shown, for example, in FIGS. 8 and 9. Locking member 100 may attain the unlocked position by the movement of container 30 in direction 350. In actuality, container 30 slides through channel 302 (FIG. 15) while locking member 100 remains stationary, held in place by magnets 304 and 306. In particular, spring arms 102 and 104 may be held in place by the respective magnetic fields created by magnets 304 and 306. After locking member 100 is moved into the unlocked position, locking surface 171 of spring arm 102 is located on the opposite side of stop 96, and locking surface 169 of spring arm 104 is located on the opposite side of stop 95 (see positioning shown in FIGS. 8 and 9). Stops 95 and 96 prevent locking member 100 from sliding in direction 192 (FIG. 8), thereby preventing locking member 100 from moving into the locked position.

As an alternative to the method of unlocking container 30 shown in FIG. 19, the container may be unlocked by reinserting the container into channel 302 in the same orientation as it was inserted to lock the container (see FIG. 18). In such a position, container 30 may be moved in direction 350 to unlock the container.

Container 30 (FIG. 2) may include one or more of the security features described, for example, in Lax U.S. Pat. No. 6,561,347, incorporated by reference herein in its entirety. For example, container 30 may include "overlapping walls" which protect the top and bottom edges of the container from tampering. As shown in FIG. 3, first cover 32 may include walls 31 and 33, extending from the top and bottom edges thereof, and second cover 34 may include walls 35 and 37, extending from the top and bottom edges thereof. Preferably, walls 31, 33, 35, and 37 extend the entire width, or at least substantially the entire width, of container 30. When first cover 32 is closed on second cover 34, wall 35 of second cover 34 sits behind wall 31 of first cover 32, and wall 37 of second cover 34 sits behind wall 33 of first cover 32. When walls 37 and 35 of second cover 34 sit behind walls 33 and 31, respectively, of first cover 32, overlapping or double walls result that make container 30 harder to break into at the location of the double, or overlapping, walls.

Figure 20:
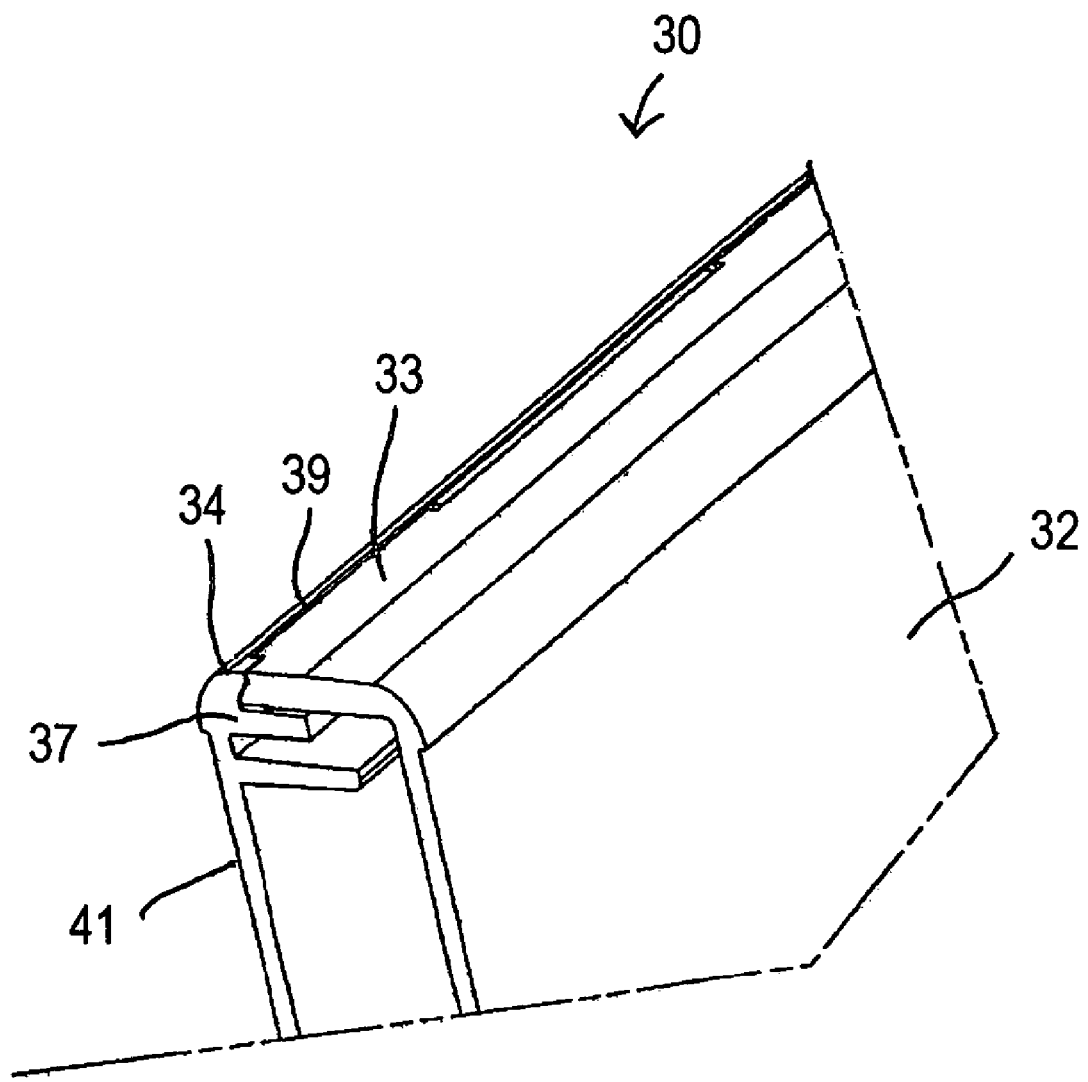
FIG. 20 is a perspective view of an illustrative overlapping walls feature for a lockable container in accordance with the present invention.

FIG. 20 shows another security feature that may be used in connection with container 30 in accordance with the present invention. A portion of container 30 is shown in FIG. 20 in the closed state. Wall 33 of first cover 32 overlaps wall 37 of second cover 34. Wall 33 and wall 37 meet at a seam portion 39. In some embodiments, wall 33 extends to a length so that it meets wall 37 at a location that is at the top of, or extends into, opposite side 41 of second cover 34. Preferably, opposite walls 31 and 35 interact in the same way as walls 33 and 37. Consequently, seam portion 39 is located at the top of, or extends into, opposite side 41 of second cover 34. Such a configuration may be advantageous because seam 39 is likely covered with display material that also typically covers opposite side 41 of second cover 34. Thus, the likelihood that seam 39 will be tampered with is lessened since the seam is hidden.

Figure 21:
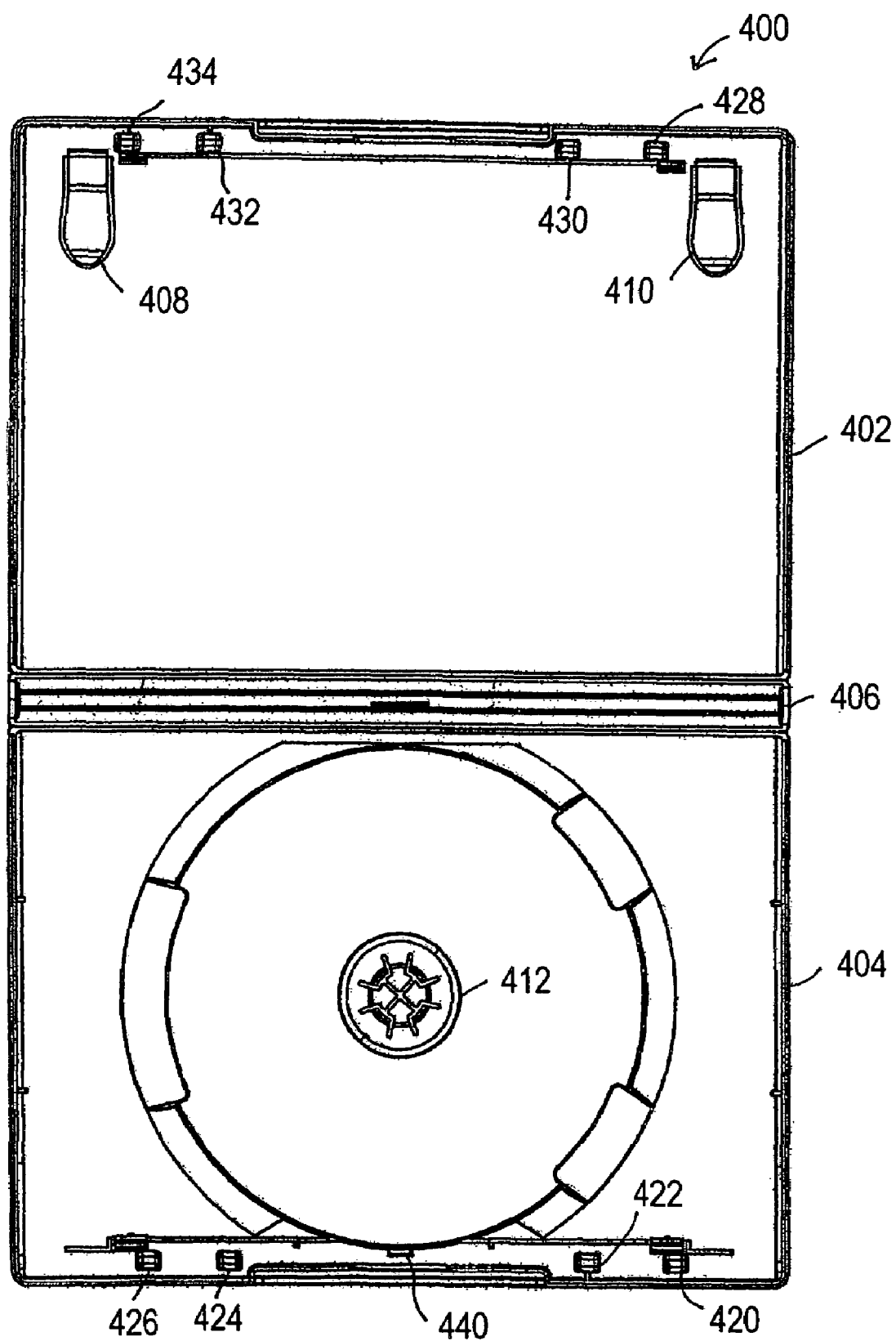
FIG. 21 is a top plan view of another illustrative lockable container for securing a storage medium in accordance with the present invention.
Figure 22:
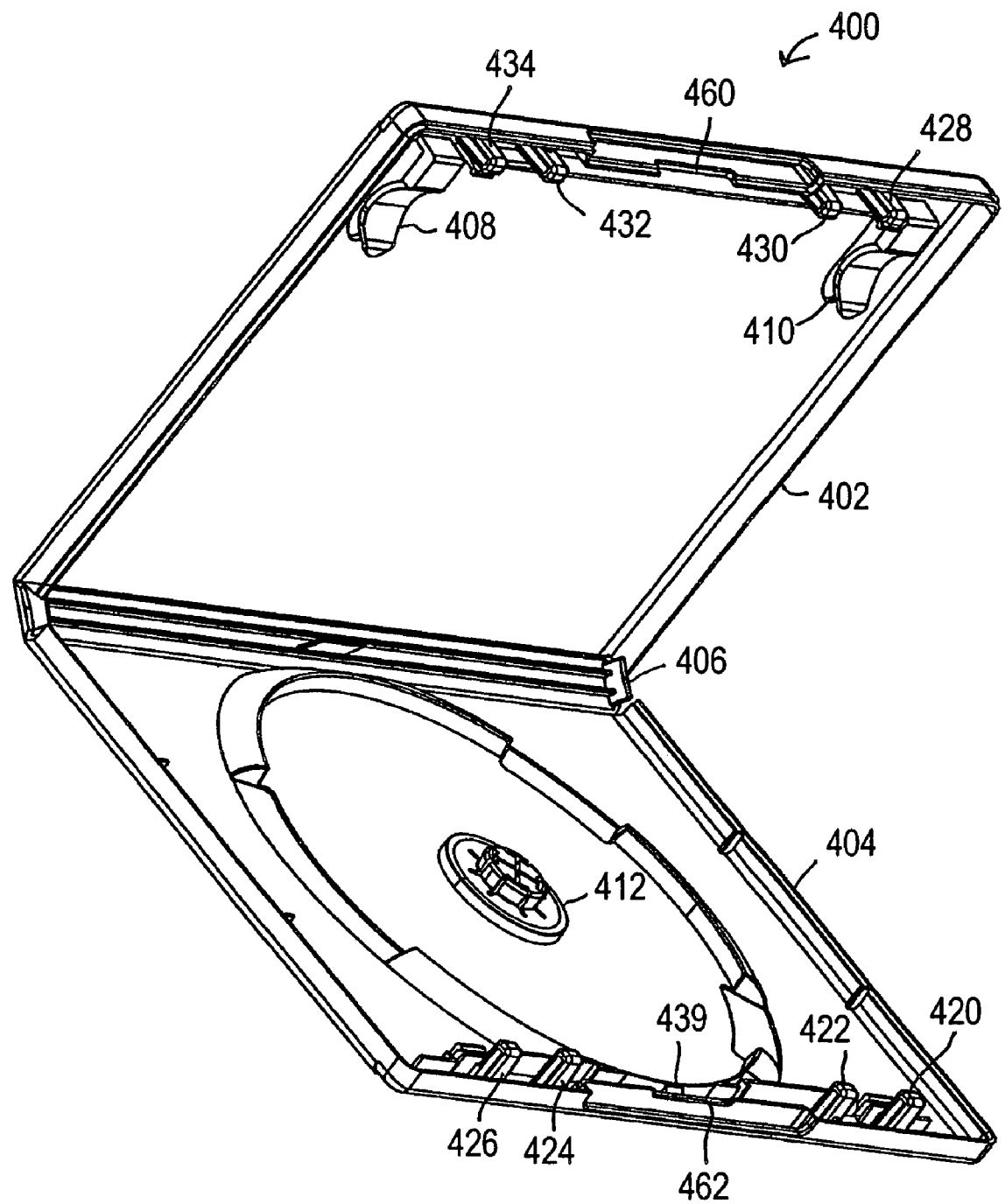
FIG. 22 is a perspective view of the lockable container of FIG. 21 in accordance with the present invention.

FIGS. 21 and 22 show a top plan view and a perspective view, respectively, of another illustrative lockable container 400 for securing a storage medium in accordance with the present invention. In contrast with container 30 and locking member 100 described hereinabove, container 400 has various loops that are configured to engage associated portions of locking member 500 to secure the contents of the container.

Container 400 includes a first cover 402, a second cover 404, and a spine 406 disposed therebetween. Second cover 404 may retain a storage medium (not shown). First cover 402 and second cover 404 are pivotally coupled to spine 406 to form a living hinge. The living hinge allows first and second covers 402 and 404 to be rotated toward each other so that the first and second covers can meet and couple to one another to enclose and, therefore, secure the storage medium or other asset.

First cover 402 may include two resilient document retaining members 408 and 410 which may be used to retain documents, such as a booklet related to the storage media secured within container 400. Second cover 404 may include a hub 412 to retain the storage medium (not shown). An illustrative hub is described hereinabove in connection with FIG. 4.

Figure 23:
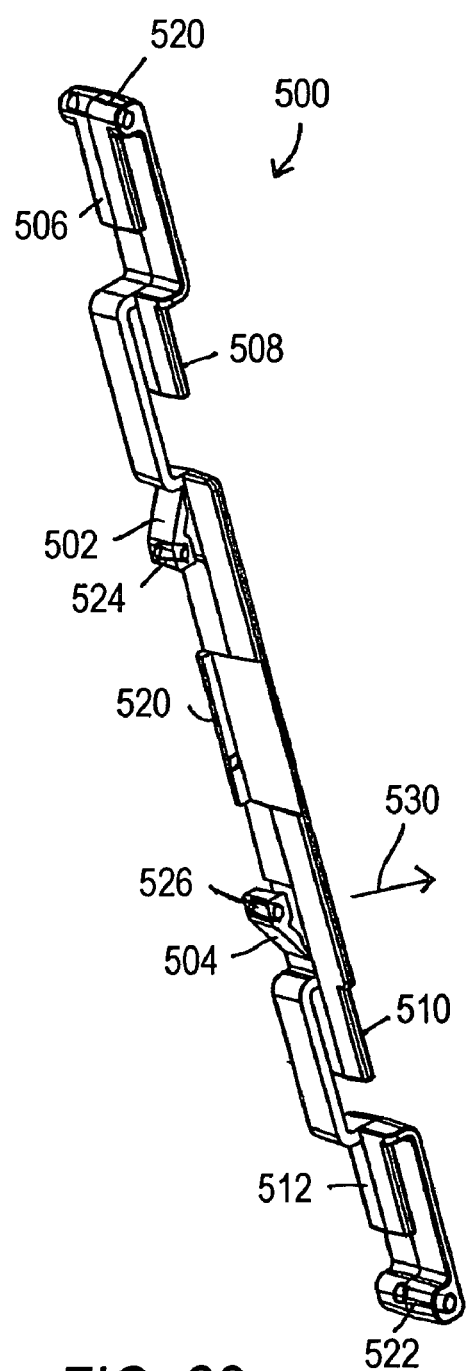
FIGS. 23 and 24 are perspective views of an illustrative locking member for use with the lockable container of FIG. 21 in accordance with the present invention.
Figure 24:
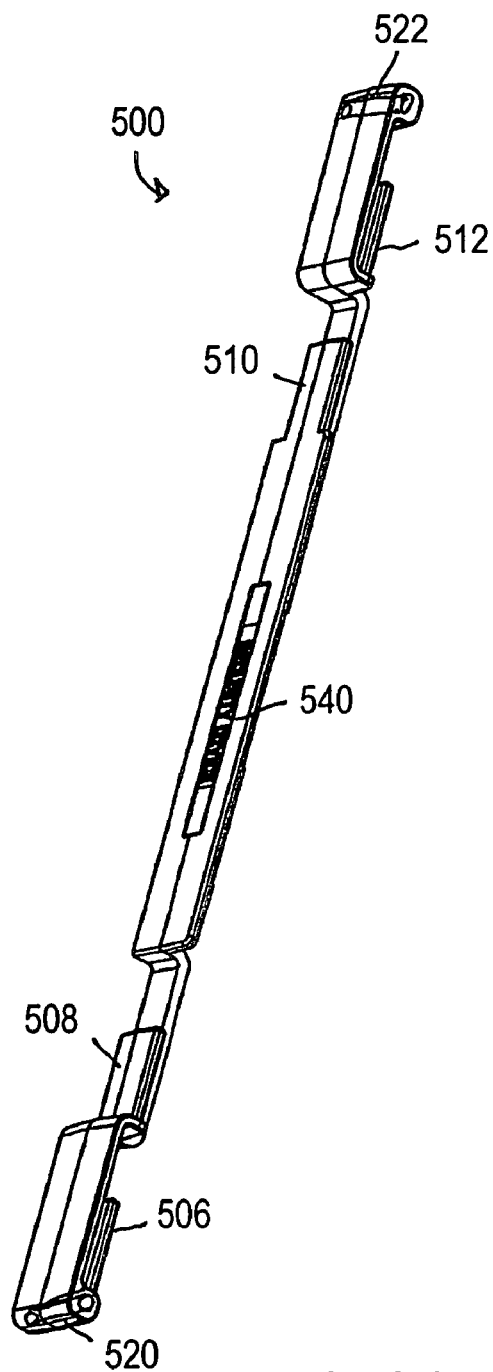

FIGS. 23 and 24 show perspective views of an illustrative locking member 500 for use with container 400 in accordance with the present invention. Locking member 500 is slideably coupled to container 400 so that the locking member may be selectively slid into the locked and unlocked positions.

First and second covers 402 and 404 may include a plurality of loops that interact with locking member 500 to lock container 400 in the closed position. Locking member 500 is inserted into container 400 so that it is capable of sliding in directions 414 and 416 (see FIG. 25) into the locked and unlocked positions, respectively.

Locking member 500 may include molded spring arms 502 and 504 which, as more fully described hereinbelow, are used to prevent locking member 500 from sliding into the unlocked position when locked and into the locked position when unlocked. It should be noted that spring arms 502 and 504 may take on any other suitable arrangements so long as they meet the objectives of the present invention. For example, for locking member 500, molded spring arms 502 and 504 may be metal leaf springs (not shown) that are included as part of second cover 404 of container 400, rather than as part of locking member 500.

Figure 25:
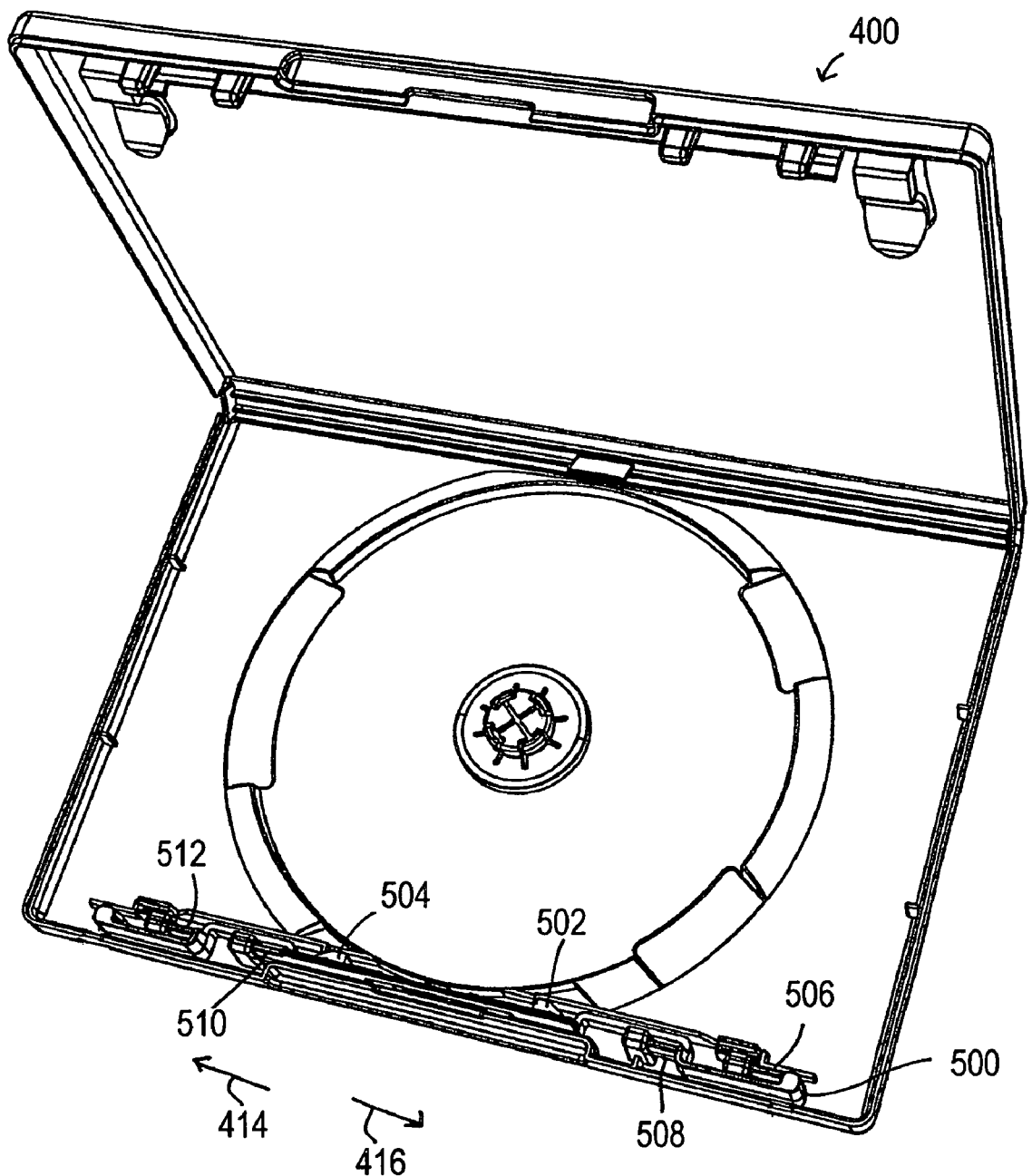
FIG. 25 is a perspective view of an assembly of the lockable container of FIG. 21 and the locking member of FIG. 23 in accordance with the present invention.
Figure 26:
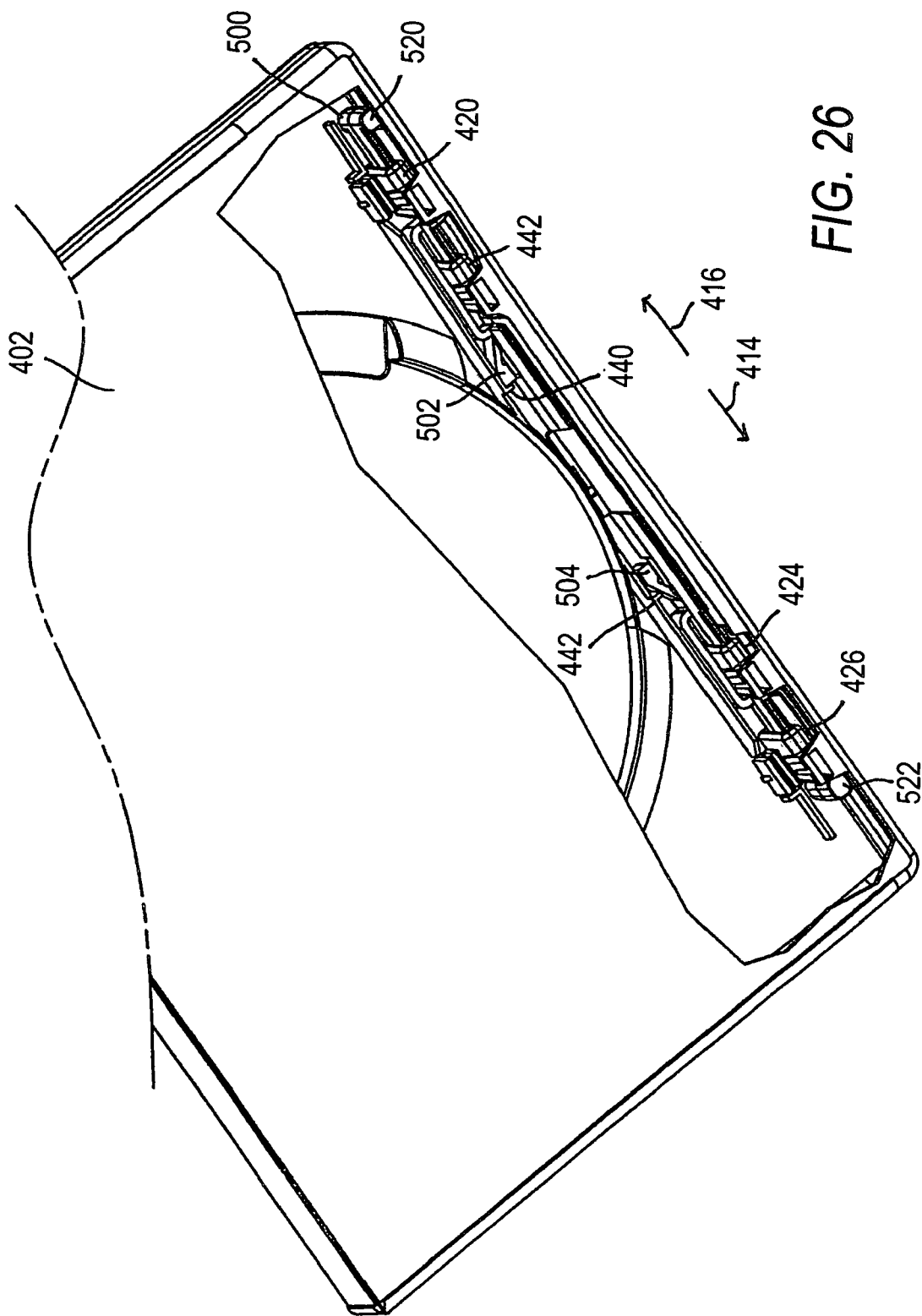
FIG. 26 is a partially cut-away perspective view of the assembly of FIG. 25 in which the container is in an unlocked state in accordance with the present invention.

Locking member 500 includes locking tabs 506, 508, 510, and 512 that interlock with adjacent corresponding loops 420 and 428, 422 and 430, 424 and 432, and 426 and 434, respectively, formed in each side of container 400 to lock the container in the closed position, as described in detail hereinbelow. The locking tabs and loops function similarly to the engagement and receptacle structures of container 30 and locking member 100, described hereinabove. Loops 420, 422, 424, and 426 are disposed on second cover 404, and loops 428, 430, 432, and 434 are disposed on first cover 402, so that when container 400 is in the closed position, the loops sit in an adjacent relationship. For example, when container 400 is closed and ready to be locked, loop 420 sits adjacent to loop 428, loop 422 sits adjacent to loop 430, loop 424 sits adjacent to loop 432, and loop 426 sits adjacent to loop 434. Locking tabs 506, 508, 510, and 512 are constructed and arranged to at least partially sit within the corresponding loops when locking member 500 is in the unlocked position, as shown in FIGS. 25 and 26. This allows the locking tabs of locking member 500 to more easily slide into engagement with the loops of container 400 when the container is in the closed position.

Locking member 500 may be inserted into container 400 by, for example, snapping the member into the container. In some embodiments, locking member 500 includes a shoulder portion 520 that snap fits with, and sits under, tab portion 439 of container 400 (FIGS. 21 and 22). Shoulder portion 520 may maintain locking member 500 securely within container 400, even when the locking member slides between the locked and unlocked positions.

In one example, the available working distance from the inside edge of container 400 to a booklet inserted in the container may be approximately 7.5 mm. In such an example, locking member 500 may occupy about 5 mm of the available space.

Figure 28:
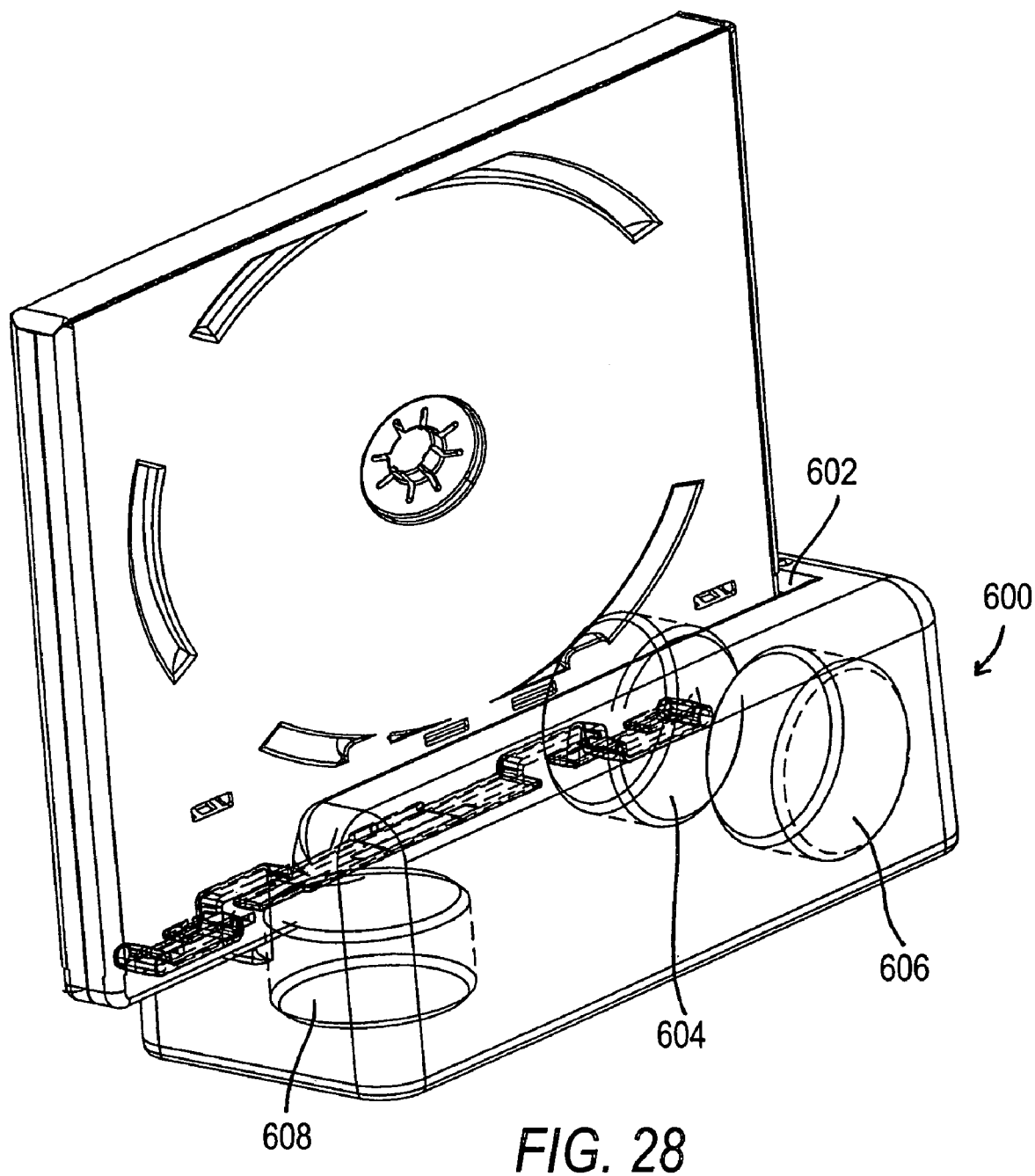
FIG. 28 is a perspective view of the lockable container of FIG. 25 and an illustrative key arrangement in a position to lock the container in accordance with the present invention.
Figure 29:
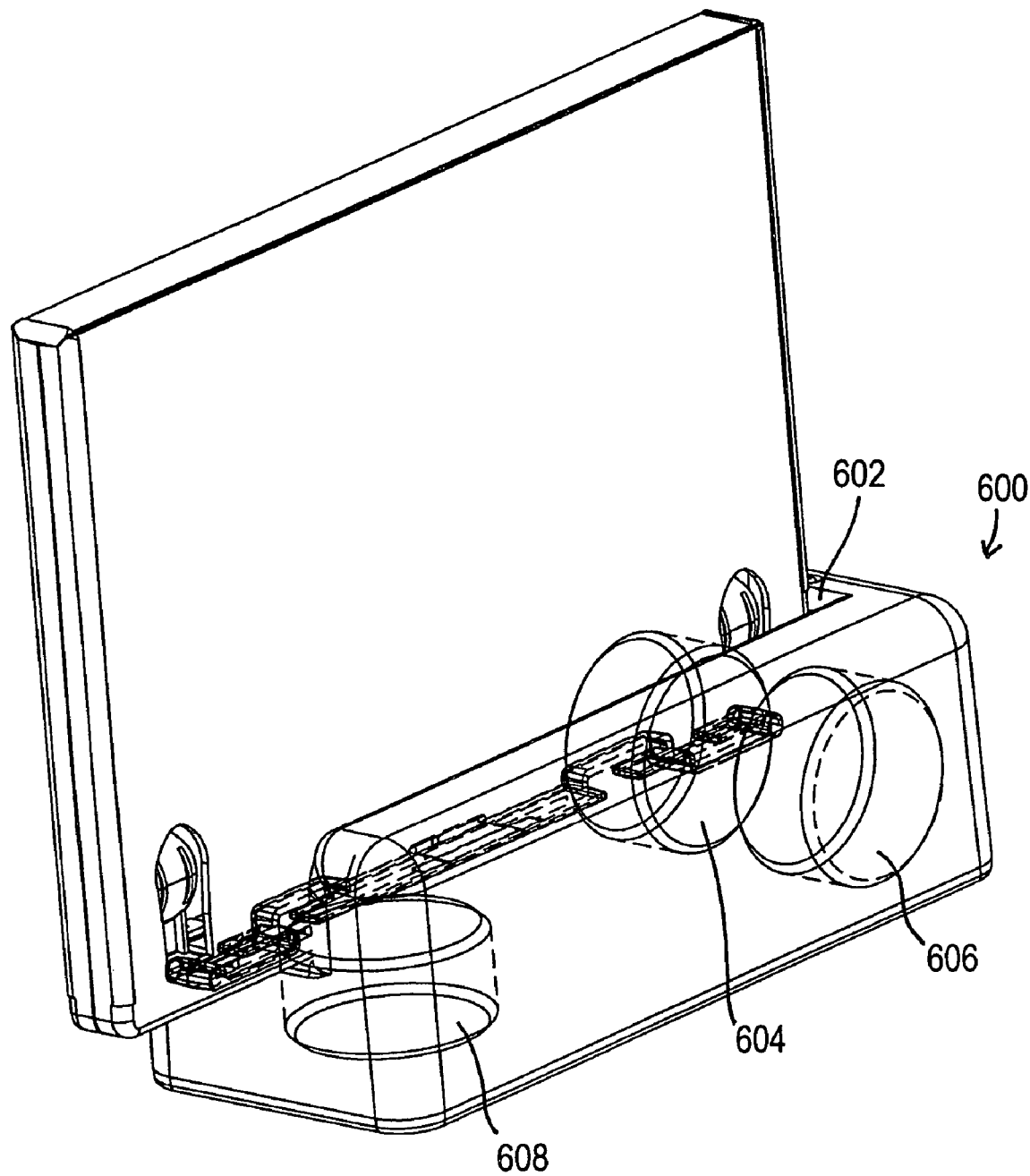
FIG. 29 is a perspective view of the lockable container of FIG. 25 and the key arrangement of FIG. 28 in a position to unlock the container in accordance with the present invention.

Locking member 500 is designed to be used with an external magnetic key arrangement, such as magnetic key arrangement 600 of FIGS. 28 and 29, to respectively lock and unlock container 400. In particular, magnetic key arrangement 600 selectively positions internal locking member 500 into either the locked position or the unlocked position. For this purpose, internal locking member 500 includes magnetically attractable portions formed therein for magnetically coupling to at least one magnet arrangement of the magnetic key arrangement 600. For example, metallic inserts 520 and 522 may be respectively inserted at opposite ends of locking member 500, and metallic inserts 524 and 526 may be respectively inserted into spring arms 502 and 504.

As shown in FIGS. 26-29, when container 400 is used to secure an asset, first cover 402 is pivoted toward second cover 404. The loops in first and second covers 402 and 404 (i.e., loops 420, 422, 424, 426, 428, 430, 432, and 434) then fall into the adjacent relationship described hereinabove, and shown in FIG. 26. In the position shown in FIG. 26, container 400 is ready to be locked by interlocking locking tabs 506, 508, 510, and 512 with loops 420-432. In particular, container 400 may be inserted into channel 602 of magnetic key arrangement 600, as shown in FIG. 28. Locking member 500 interacts with magnets 604, 606, and 608 embedded in magnetic key arrangement 600. In particular, magnet 608 aligns with spring arm 502 and magnets 604 and 606 line up with insert 522. Magnet 608 pulls spring arm 502 in direction 530 (FIG. 23) so that spring arm 502 is no longer in abutting relationship with stop 440. This allows locking member 500 to slide in direction 414 (FIG. 25).

Figure 27:
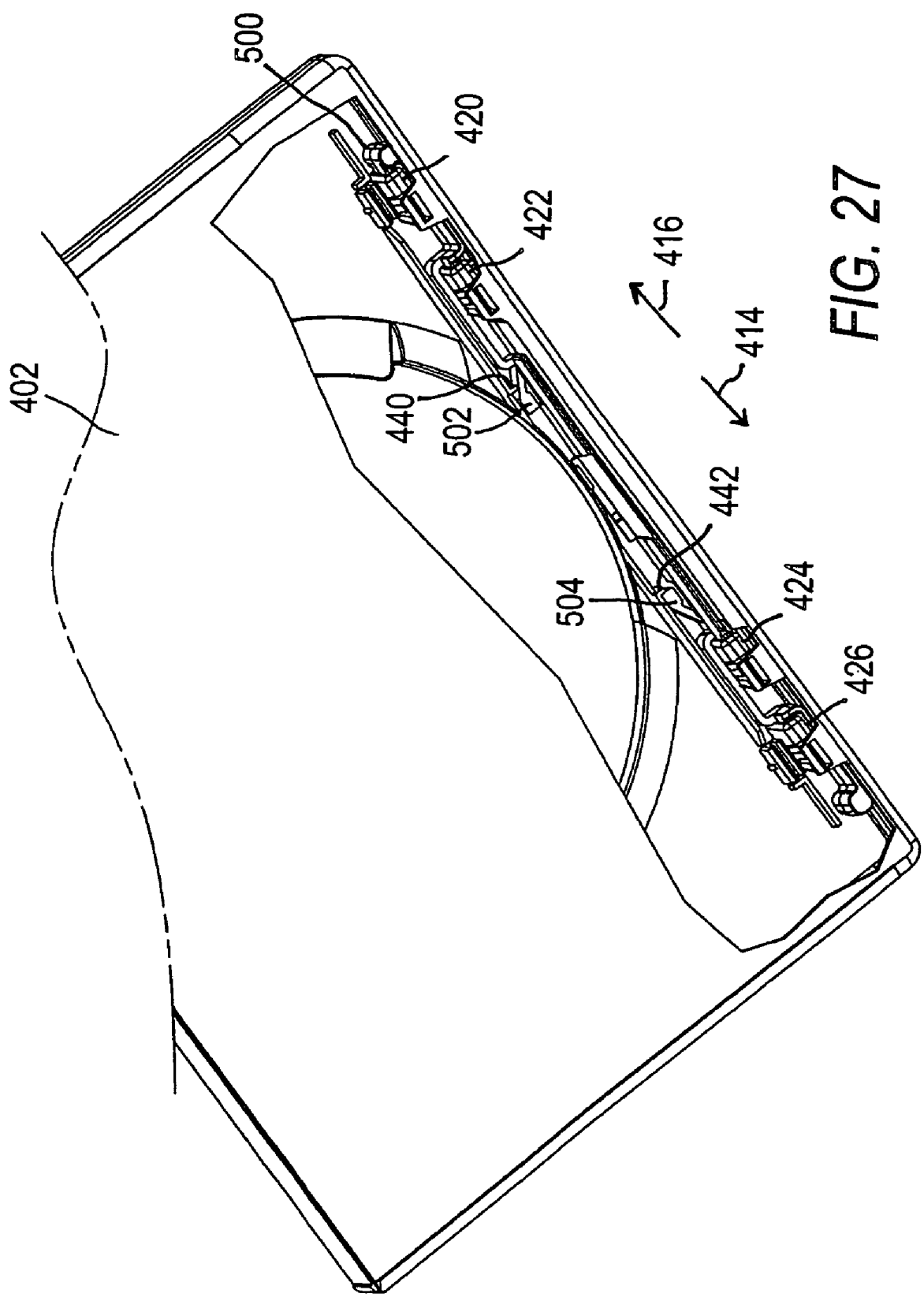
FIG. 27 is a partially cut-away perspective view of the assembly of FIG. 25 in which the container is in a locked state in accordance with the present invention.

Locking member 500 locks container 400 in the closed position because, as a result of the sliding action, locking tab 506 interlocks with loops 420 and 428, locking tab 508 interlocks with loops 422 and 430, locking tab 510 interlocks with loops 424 and 432, and locking tab 512 interlocks with loops 426 and 434. This locked positioning of locking member 500 is shown in FIG. 27. Once locked, locking member 500 is prevented from moving in direction 416 because, as a result of the sliding action, spring arm 502 abuts against stop 440.

It should be noted that any number or combination of magnets may be used to allow locking member 500 to slide in directions 414 and 416. For example, one or more magnets may be located at the end of the magnetic key arrangement, rather than at the sides as shown in FIGS. 28 and 29. With this configuration, the placement of the magnets will pull on locking member 500, thereby causing the locking member to slide in direction 416.

Referring to FIGS. 27 and 29, to unlock container 400, the container may be rotated by 180-degrees and inserted into channel 602 of magnetic key arrangement 600. (It should be noted that locking member 500 may alternatively be used along with a magnetic key arrangement such as arrangement 300 (FIG. 15), having a channel that extends the entire length of the key arrangement.) The process to unlock the container 400 is substantially the reverse of the process described hereinabove. Locking member 500 interacts with magnets 604, 606, and 608 embedded in magnetic key arrangement 600, as shown in FIG. 29. Magnet 608 aligns with spring arm 504, and magnets 604 and 606 align with insert 520. Magnet 606 pulls spring arm 504 in direction 530 (FIG. 23) so that spring arm 504 no longer abuts stop 442. This allows the locking bar to slide in direction 416. Magnets 604 and 606 cause locking member 500 to slide in direction 416 as explained hereinabove (i.e., by pulling insert 520 into the center of the magnetic field created by magnets 604 and 606). Consequently, locking member 500 moves into the unlocked position because, as a result of the sliding action, locking tab 506 is moved out of interlocking relationship with loops 420 and 428, locking tab 508 is moved out of interlocking relationship with loops 422 and 430, locking tab 510 is moved out of interlocking relationship with loops 424 and 432, and locking tab 512 is moved out of interlocking relationship with loops 426 and 434 once unlocked, locking member 504 is prevented from moving in direction 414 because, as a result of the sliding action, spring arm 504 now abuts stop 442. Stop 442 also helps to maintain locking member 500 of container 400 in the unlocked position during shipping.

It has been found that the three-magnet magnetic key arrangement (e.g., magnetic key arrangement 600) is particularly secure because it makes it extremely hard for a thief to manipulate the magnets to unlock the container. It should be noted, however, that even though the magnetic key arrangement of the present invention shows three magnets that work with four magnetically attractable portions, the number of magnets, magnetically attractable portions, and combinations thereof may be increased to make security more efficient or decreased for efficiency or ease of manufacture. Moreover, for increased security, the magnets may be non-commercial magnets that are not readily available, and may be of different sizes, making them even more difficult to manipulate. Moreover, the magnetic key arrangement may include steel inserts on opposite edges or may be a saturated bias-type permanent magnet.

Inserts 520, 522, 524, and 526 and the corresponding magnets 604, 606, and 608 result in seven variables that may be changed to create different lock and key combinations akin to changing the cylinder of a door lock. For example, one or more of inserts 520, 522, 524, and 526 may be constructed from a metallic or semi-metallic material, or may have a varying diameter or shape. By varying one or both of the size and material of the inserts, a corresponding magnetic key arrangement requires magnetic assemblies of varying characteristics to unlock container 400. For example, if inserts 520 and 522 were constructed with small diameters, and inserts 524 and 526 were constructed with large diameters, larger decoupling magnets would be required to magnetically couple with inserts 520 and 522, whereas a relatively small decoupling magnet would magnetically couple with inserts 524 and 526.

Similarly, magnets 604, 606, and 608 may be varied in material, size, shape, and any combination thereof. For example, magnets 604, 606, and 608 may be constructed of ferrite or semi-ferrite materials to work with a particular locking member 500 having inserts 520, 522, 524, and 526 specifically designed to work with magnets 604, 606, and 608.

In one example, the force needed to lock or unlock container 400 may be small. For example, magnets 604 and 606 of magnetic key arrangement 600 may pull about a 0.6 inch stroke. The magnets may be, for example, 2 inches in diameter, 1.5 inches thick, and NEO 42.

In practice, when locked, container 400 may be displayed in a live retail or rental environment. Moreover, since locking member 500 is completely located inside container 400, it can not be accessed or tampered with by a consumer. At a checkout counter, container 400 is positioned in magnetic key arrangement 600 to unlock the container, and the consumer goes home with the entire container—nothing is removed. As a result, no separate locking device is generated that needs to be stored, reused, recycled, or discarded by the retailer or rental establishment.

As described hereinabove in connection with container 30, container 400 may be provided with at least one status window, for indicating the locked or unlocked status of the lockable container. As shown in FIG. 22, first and second covers 402 and 404 may include respective cut-outs 460 and 462 that, when combined upon closure of container 400, form a status window (not shown) indicating the locked or unlocked status of the container. In some embodiments, the status window may allow a user to view at least of portion of locking member 500.

As shown in FIG. 24, a status portion 540 on the face of locking member 500 may include locked and unlocked status information placed thereon by any of the known methods. In this way, when locking member 500 is slid between the locked and unlocked positions, the appropriate status information and consequently the status of container 400 appears through the status window for a user to read. For example, status portion 540 may show nothing (e.g., if container 400 is never locked), a green color if unlocked, a red color if locked, or any other suitable information. In one example, color indicators may be pad printed on locking member 500, or placed thereon with stickers or the like. Thus, when locking member 500 is slid into the locked position, a colored portion (e.g., a red portion) shows through the status window, and when slid into the unlocked position, another colored portion (e.g., a green portion) shows through the status window.

In the embodiments described hereinabove, the magnetic key arrangements 300 and 600 are single units. In such embodiments, a user locks and unlocks containers 30 and 400 by properly orienting the container in the corresponding magnetic key arrangement. Alternatively, the magnetic key arrangement may be broken down into two different units. One unit may act as a coupler, and the other unit may act as a decoupler. Preferably, the coupler and decoupler are constructed and arranged so that the coupler acts as a decoupler, but not the other way around. For example, the container and the magnetic key arrangement may be "keyed" so that the decoupler can not act as a coupler. This prevents a clerk from accidentally locking a container, rendering the purchaser unable to open the container when he or she gets home.

Preferably, to key the container and the decoupler, the container may include raised stops located at the bottom of the container (not shown). The decoupler may include a thin throat or track (not shown). Thus, if a clerk tries to insert the bottom of the container having the stops into the thin throat, the container will not fit. In other words, the clerk can only put the container into the decoupler in one orientation, and therefore is only able to unlock the container. Similarly, the coupler may have a wider throat which is wide enough to accommodate the bottom of the container and the stops when attempting to lock the container (not shown). Since the throat of the coupler is wider than the throat of the decoupler, the coupler also functions as decoupler.

In some embodiments, there may be two versions of magnetic key arrangement. One may be a more robust decoupler with four mounts, RFID or EAS security tags or the like, and is leased. Preferably, the security tag is either an RF or AM (acousto-magnetic) non-deactivatable tag. The other version may be a lower cost decoupler that retailers can purchase.

Preferably, distribution of the separate coupler and decoupler is controlled for security reasons. The coupler may, for example, only be given to replicators (e.g., those persons who package the container for retail sale). The decoupler may only be given to the point-of-sale retailer (e.g., checkout counters).

Figure 32:
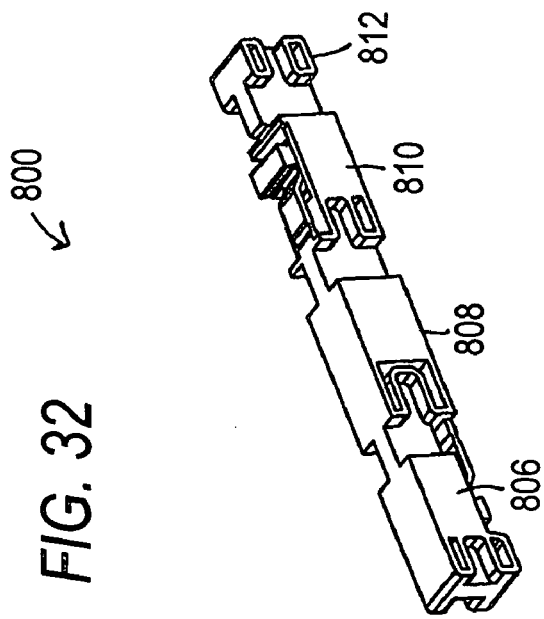
FIGS. 31 and 32 are perspective views of an illustrative locking member for the lockable container of FIG. 30 in accordance with the present invention.
Figure 31:
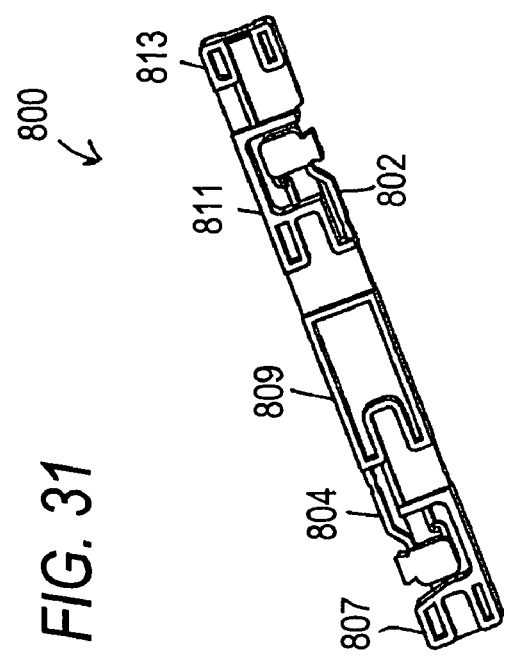
Figure 33:
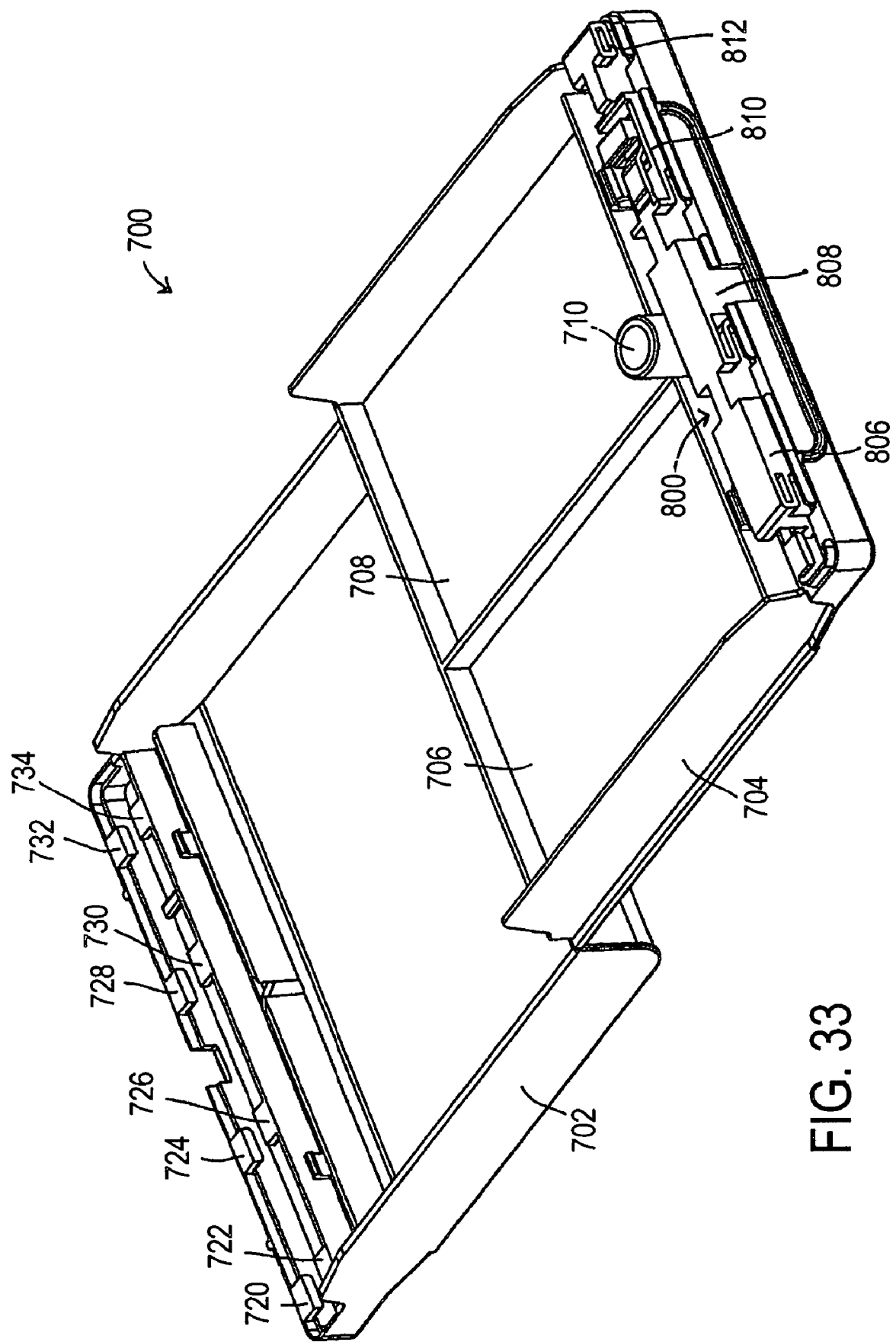
FIG. 33 is a perspective view of an assembly of the lockable container of FIG. 30 and the locking member of FIG. 31 in accordance with the present invention.

FIG. 30 is a perspective view of yet another illustrative lockable container 700 for securing an asset in accordance with the present invention. The corresponding locking member for lockable container 700 is shown in FIGS. 31 and 32. An assembly of lockable container 700 and locking member 800 is shown in FIG. 33. Lockable container 700 and locking member 800 are substantially similar to lockable container 30 and locking member 100, described in detail hereinabove.

In particular, locking member 800 has a plurality of double engagement portions (i.e., portions 808-813) that are configured to engage associated tabs of second cover 704 of container 700. Double engagement portions 806 and 807 are configured to engage tabs 720 and 722, respectively; double engagement portions 808 and 809 are configured to engage tabs 724 and 726, respectively; double engagement portions 810 and 811 are configured to engage tabs 728 and 730, respectively; and double engagement portions 812 and 813 are configured to engage tabs 732 and 734, respectively.

A difference between container 700 and container 30 is that container 700 is sized and designed to accommodate an asset such as, for example, razor blades. For example, as shown in FIG. 33, container 700 may include portions 706 and 708 for retaining razor blade cartridges. Additionally, container 700 may include a hole 710 for use in hanging container 700 in a retail establishment (e.g., a drug store).

Figure 35:
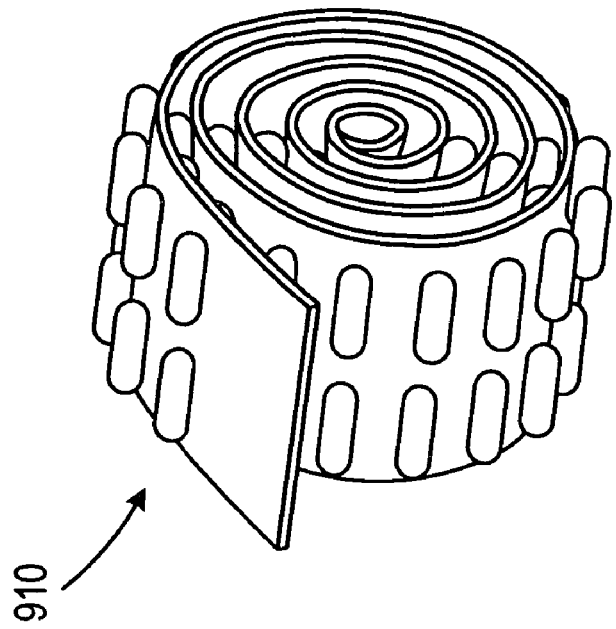
FIG. 35 is a perspective view of an illustrative roll of capsules for use in the container of FIG. 34 in accordance with the present invention.
Figure 34:
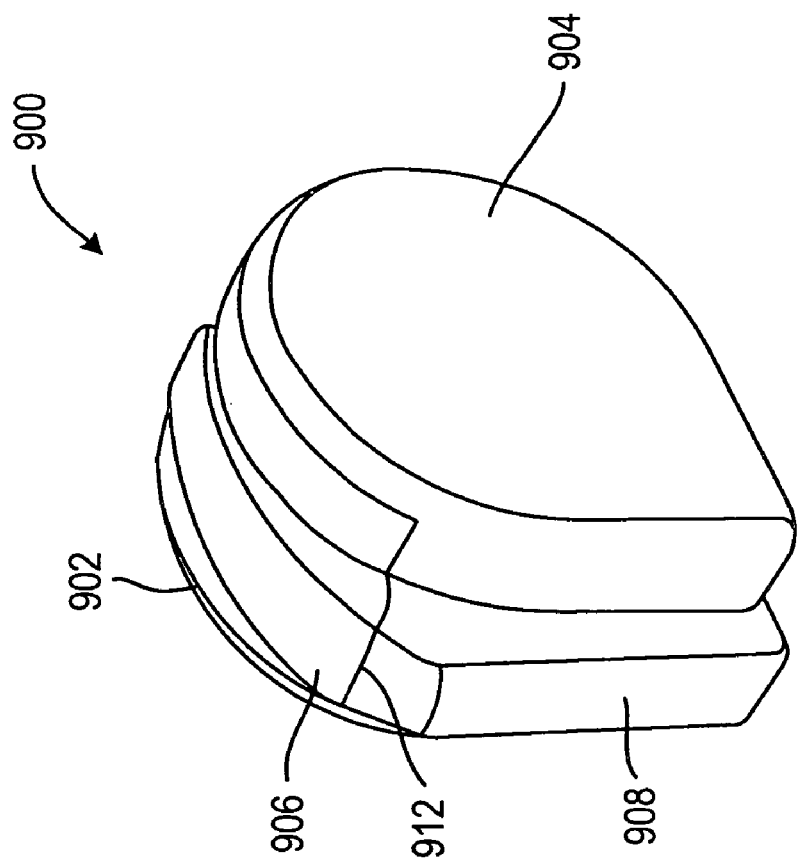
FIG. 34 is a perspective view of still another illustrative lockable container for securing an asset in accordance with the present invention.
Figure 36:
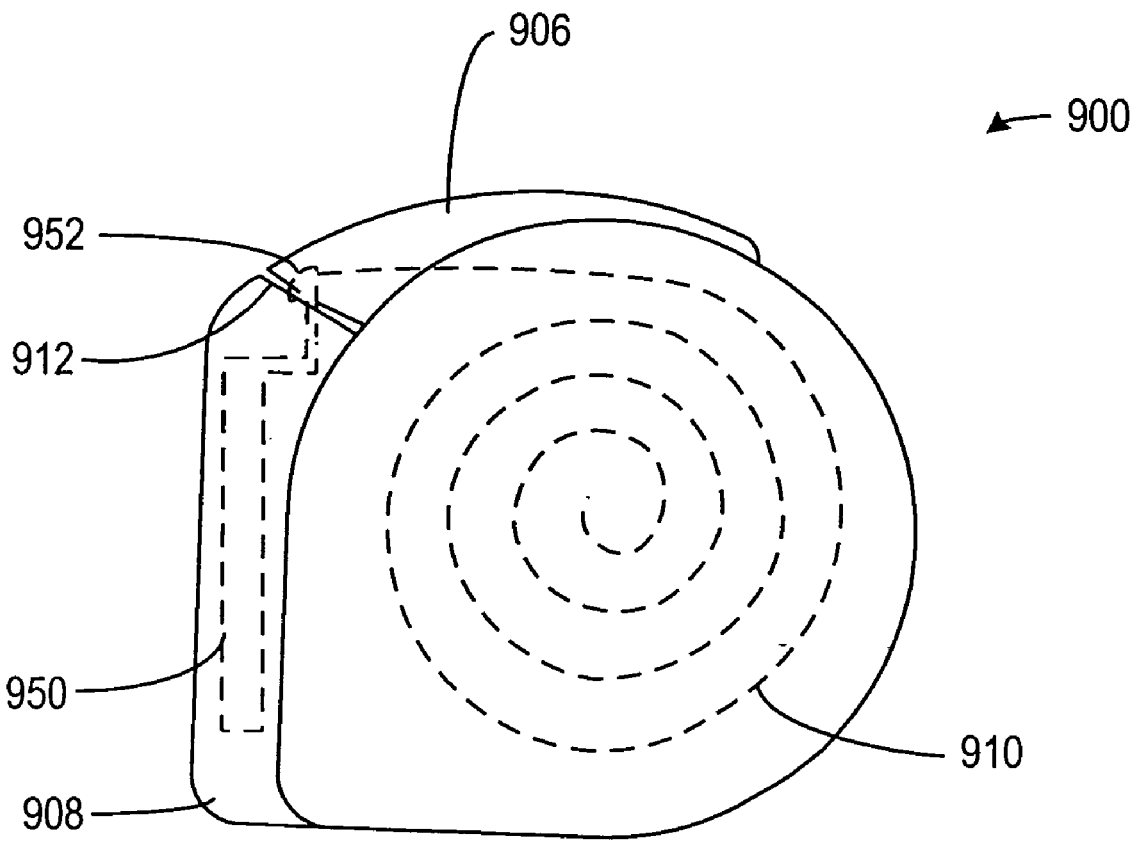
FIG. 36 is a simplified sectional view of the container of FIG. 34 in accordance with the present invention.
Figure 37:
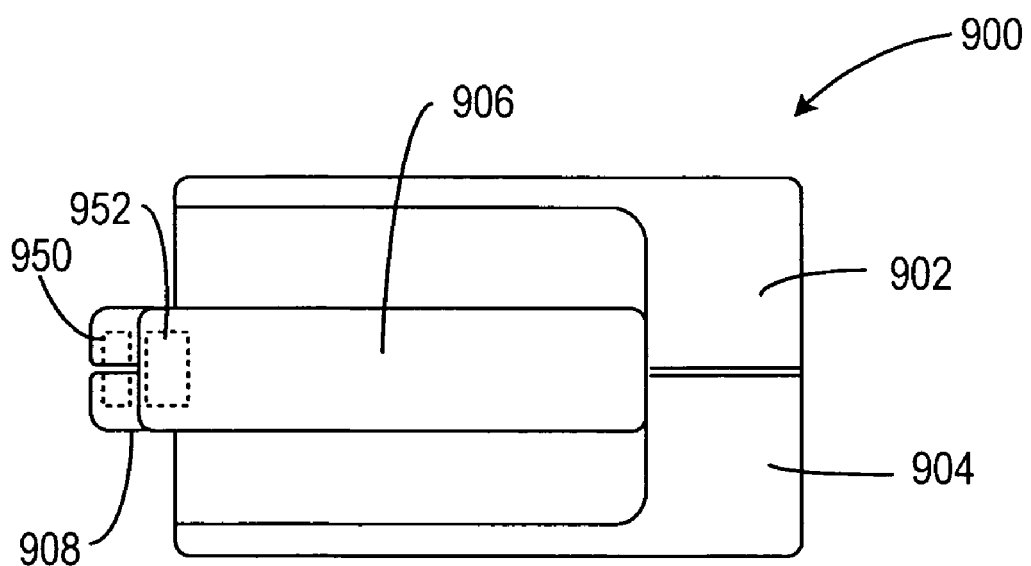
FIG. 37 is a top plan view of the container of FIG. 34 in accordance with the present invention.
Figure 39:
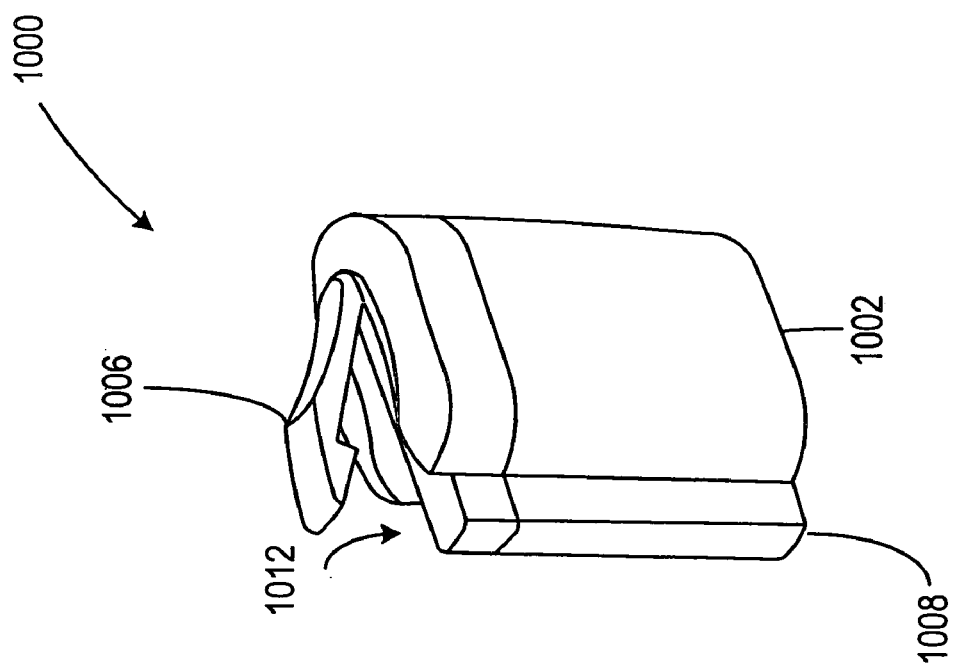
FIG. 39 is a perspective view of the container of FIG. 38 demonstrating how a lid of the container may open in accordance with the present invention.
Figure 38:
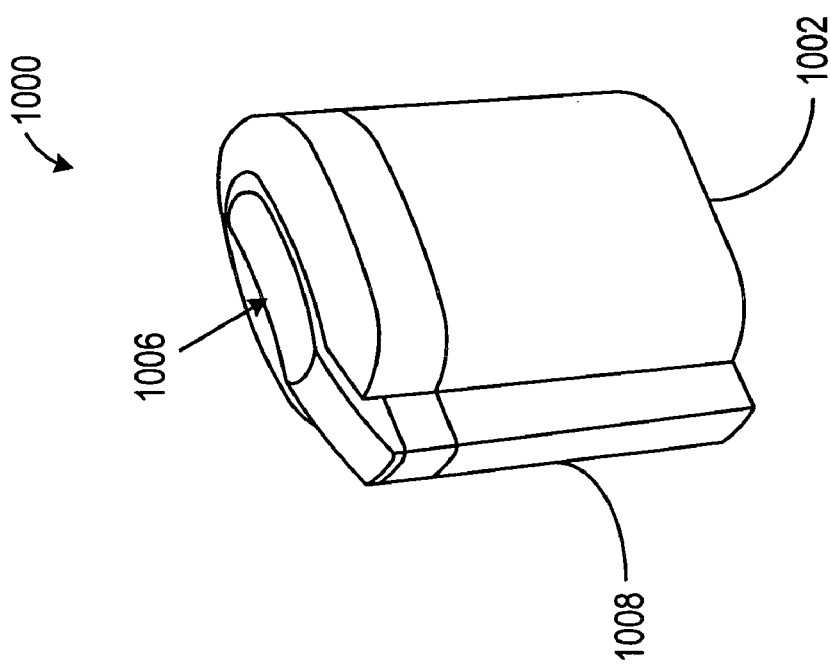
FIG. 38 is a perspective view of yet another illustrative lockable container for securing an asset in accordance with the present invention.
Figure 40:
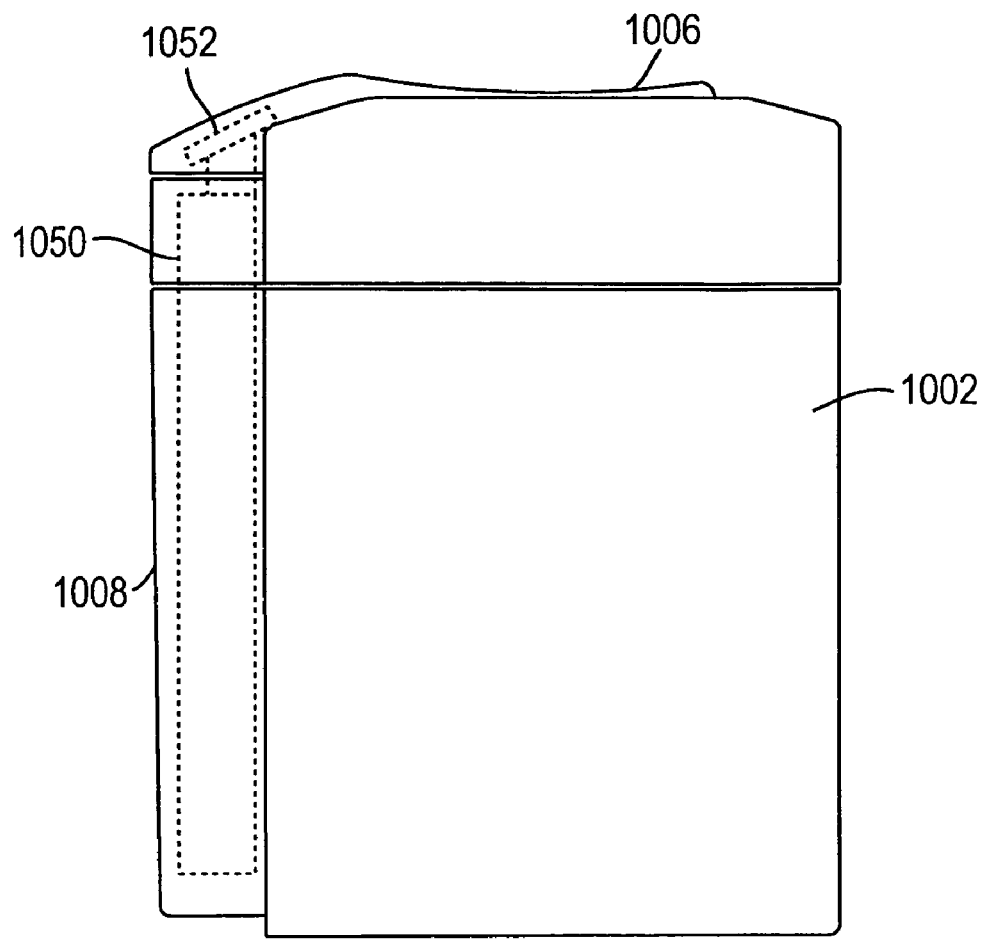
FIG. 40 is a simplified sectional view of the container of FIG. 38 in accordance with the present invention.
Figure 41:
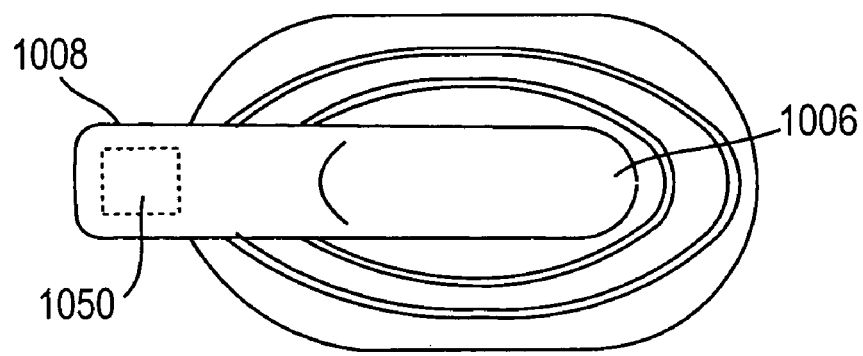
FIG. 41 is a top plan view of the container of FIG. 38 in accordance with the present invention.

Still another illustrative lockable container 900 for securing an asset in accordance with the present invention is shown in FIGS. 34-37. Container 900 may use a locking member 950 (FIG. 36) that is substantially similar to locking member 800 of FIGS. 31 and 32. Container 900 may be used, for example, to secure a plurality of tablets therein, as demonstrated by roll 910 (FIG. 35). Roll 910 may be secured within first cover 902 and second cover 904 of container 900. Locking member 950 may reside within portion 908 of container 900, formed by first and second covers 902 and 904. By interacting with a suitable magnetic key arrangement, lid retention portion 952 of locking member 950 disengages lid portion 906. This allows lid portion 906 to open slightly such that roll 910 may be pulled through opening 912 of container 900. Thus, one or more tablets from roll 910 may be dispensed through opening 912. To lock container 900 such that tablets may no longer be dispensed through opening 912, the container may interact with a suitable magnetic key arrangement.

Yet another illustrative lockable container 1000 for securing an asset in accordance with the present invention is shown in FIGS. 38-41. Container 1000 may use a locking member 1050 that is substantially similar to locking member 800 of FIGS. 31 and 32. Container 1000 may be used, for example, to secure a plurality of tablets within receptacle 1002. Locking member 1050 may reside within portion 1008 of container 1000, formed by receptacle 1002. By interacting with a suitable magnetic key arrangement, lid retention portion 1052 of locking member 1050 disengages lid portion 1006. This allows lid portion 1006 to open such that tablets may be accessed through opening 1012 of container 1000. Thus, one or more tablets may be dispensed through opening 1012. To lock container 1000 such that tablets may no longer be dispensed through opening 1012, the container may interact with a suitable magnetic key arrangement.

Accordingly, various embodiments of a lockable container having an integral and internal locking mechanism are provided. The container and locking member of the present invention are advantageous because once the locking member is inserted into the container, the container may be used in applications requiring the container to be locked. If the container needs to be used in applications where the container is not required to be locked, the lock is simply not activated. The container is no additional cost to the consumer or retailer, and only minimally more for the manufacturer and replicator. Some adjustments may be required at the molder/replicator, which may cost up to $0.04 per piece. Savings on the security sticker edge labels, which may no longer be needed, may offset this. Revenue from every piece may be generated through royalties.

In practice, when a container is molded and the locking member inserted therein, the container is not locked (i.e., the locking member is not in the closed position). The container may be locked anytime thereafter. When the container needs to be locked, the container may be put in the presence of a magnetic key arrangement and locked after replication (e.g., after packaged with a disc, booklet, etc.) by, for example, a replicator.

It will be understood that the foregoing is only illustrative of the principles of the invention, and that still other modifications can be made by those skilled in the art without departing from the scope and spirit of the invention. For example, any of the features described hereinabove in connection with illustrative lockable containers, illustrative locking members, and illustrative magnetic key arrangements may be present in any of the embodiments of the present invention described herein.

What is claimed is:

1. A lockable container for securing an asset therein, comprising: a first cover;
a second cover coupled to the first cover, wherein the first and second covers are configured to move between an open position which allows access to the asset, and a closed position which encloses the asset;
a locking mate arrangement operatively coupled to at least one of the first and second covers; and
a locking member, wherein the locking member is configured to move between an unlocked position in which the first and second covers can move to the open position and a locked position which locks the first and second covers in the closed position, and wherein the entirety of the locking member is internal to the container in the unlocked position and in the locked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container and the locking member is permanently connected to the lockable container.

2. The lockable container of claim 1, wherein the locking member engages the locking mate arrangement when the locking member is in the locked position.

3. The lockable container of claim 1, wherein the locking member engages the locking mate arrangement when the locking member is in the locked position, and wherein the locking member is configured to be acted upon by an external key arrangement to selectively position the locking member into one of the locked position and the unlocked position with respect to the locking mate arrangement.

4. The lockable container of claim 1, wherein the first cover is pivotally coupled to the second cover.

5. The lockable container of claim 1, wherein the locking mate arrangement is formed as part of the first and second covers, and wherein the locking member is detachably coupled to the second cover.

6. The lockable container of claim 5, wherein the locking mate arrangement has at least one tab formed in the first cover and at least one corresponding tab formed in the second cover.

7. The lockable container of claim 6, wherein the at least one tab formed in the first cover and the at least one corresponding tab formed in the second cover are in an adjacent relationship when the first and second covers are in the closed position.

8. The lockable container of claim 7, wherein at least a portion of the locking member has an I-beam construction with a recess formed therein.

9. The lockable container of claim 8, wherein the at least one tab formed in the first cover and the at least one corresponding tab formed in the second cover are located in the recess and prevented from separating when the locking member is in the locked position.

10. The lockable container of claim 1, wherein the first cover has at least one pair of top closing walls and the second cover has at least one pair of bottom closing walls, and wherein the top and bottom pairs of closing walls are disposed so that each of the respective top and bottom closing walls sits behind the other of the respective top and bottom closing walls when the first cover is closed upon the second cover, thereby forming a double wall so that each of the respective top and bottom closing walls substantially overlaps a major portion of the height of the other of the respective top and bottom closing walls.

11. The lockable container of claim 10, wherein each of the at least one pair of top closing walls and each of the at least one pair of bottom closing walls extends the entire width of the respective first and second covers.

12. The lockable container of claim 10, wherein each of the at least one pair of top closing walls and each of the at least one pair of bottom closing walls extends substantially the entire width of the respective first and second covers.

13. The lockable container of claim 1, wherein the first cover has at least one pair of top closing walls, wherein the second cover has top and bottom edges that meet a backside of the second cover, and wherein the at least one pair of top closing walls meets the second cover at the top and bottom edges to form respective seam portions.

14. The lockable container of claim 1, wherein the first cover has at least one pair of top closing walls, wherein the second cover has top and bottom edges that substantially meet a backside of the second cover, and wherein the at least one pair of top closing walls meets the second cover at the top and bottom edges to form respective seam portions.

15. The lockable container of claim 1, wherein the locking member engages the locking mate arrangement when the locking member is in the locked position, wherein the locking member is configured to be acted upon by an external key arrangement to selectively position the locking member into one of the locked position and the unlocked position with respect to the locking mate arrangement, and wherein the locking mate arrangement is formed as part of the first cover and the locking member is detachably coupled to the second cover.

16. The lockable container of claim 15, wherein the locking member has at least one tab, and wherein the locking mate arrangement has at least one corresponding loop.

17. The lockable container of claim 16, wherein the at least one tab is configured to engage the at least one corresponding loop when the locking member is in the locked position.

18. The lockable container of claim 16, wherein the locking member forms a single molded structure, and wherein the locking member is constructed from a material selected from the group consisting of thermoplastic resin polypropylene, ABS, polycarbonate, and any combination thereof.

19. The lockable container of claim 15, wherein the locking member has at least one engagement structure and the locking mate arrangement has at least one corresponding engagement structure, and wherein the engagement structure of the locking member is configured to engage the corresponding engagement structure of the locking mate arrangement.

20. The lockable container of claim 19, wherein the locking member has a stopping arrangement which selectively blocks the locking member from moving into the locked and unlocked positions.

21. The lockable container of claim 20, wherein the at least one engagement structure of the locking member has at least one first magnetically attractable portion configured to magnetically interact with a corresponding first magnet arrangement of the external key arrangement.

22. The lockable container of claim 21, wherein the stopping arrangement has at least one resilient locked position flange biased into a locked state, wherein the container has a corresponding locked position tab, and wherein the locked position flange is configured to selectively engage the corresponding locked position tab to prevent the locking member from sliding into the unlocked position once in the locked position.

23. The lockable container of claim 22, wherein the resilient locked position flange has at least one second magnetically attractable portion configured to magnetically interact with a corresponding second magnet arrangement of the external key arrangement, the magnetic interaction between the second magnetically attractable portion and the second magnet arrangement of the external key arrangement causing the resilient locked position flange to bend toward the external key arrangement.

24. The lockable container of claim 21, wherein the first magnetically attractable portion is selected from a group consisting of a steel pin, a metallic pin, a metallic insert, a magnetic insert, and any combination thereof.

25. The lockable container of claim 23, wherein the second magnetically attractable portion is selected from a group consisting of a steel pin, a metallic pin, a metallic insert, a magnetic insert, and any combination thereof.

26. The lockable container of claim 21, wherein the stopping arrangement has at least one resilient unlocked position flange biased into an unlocked state, wherein the container has a corresponding unlocked position tab, and wherein the unlocked position flange is configured to selectively engage the corresponding unlocked position tab to prevent the locking member from sliding into the locked position once in the unlocked position.

27. The lockable container of claim 26, wherein the resilient unlocked position flange has at least one third magnetically attractable portion configured to magnetically interact with a corresponding third magnet arrangement of the external key arrangement, the magnetic interaction between the third magnetically attractable portion and the third magnet arrangement of the external key arrangement causing the resilient unlocked position flange to bend toward the external key arrangement.

28. The lockable container of claim 23, wherein the stopping arrangement has at least one resilient unlocked position flange biased into an unlocked state, and wherein the resilient unlocked position flange has at least one third magnetically attractable portion configured to magnetically interact with the second magnet arrangement of the external key arrangement, the magnetic interaction between the third magnetically attractable portion and the second magnet arrangement of the external key arrangement causing the resilient unlocked position flange to bend toward the external key arrangement.

29. The lockable container of claim 20, wherein the external key arrangement interacts with the at least one corresponding engagement structure and the at least one stopping arrangement of the locking member to selectively move the locking member into the locked and unlocked positions.

30. The lockable container of claim 29, wherein the external key arrangement simultaneously interacts with the at least one corresponding engagement structure and the at least one stopping arrangement.

31. The lockable container of claim 1, wherein the locking member engages the locking mate arrangement when the locking member is in the locked position, and wherein the locking member is configured to be acted upon by an external magnetic key arrangement to selectively position the locking member into one of the locked position and the unlocked position with respect to the locking mate arrangement.

32. The lockable container of claim 1, wherein the locking member is not viewable from the outside of the container when the first and second covers are in the closed position.

33. The lockable container of claim 1, wherein the container is sized as a standard library case.

34. The lockable container of claim 1, wherein the container is constructed of a material selected from a group consisting of a plastic, a metal, a wood, a polymer, a thermoplastic resin, polypropylene, ABS, polycarbonate, and any combination thereof.

35. The lockable container of claim 1, wherein at least one of the first and second covers has a transparent portion configured to permit a user to view the asset in the container.

36. The lockable container of claim 1, wherein at least one of the first and second covers has a transparent jacket to display information materials related to the asset to a user.

37. The lockable container of claim 1, wherein at least one of the first and second covers has a securing mechanism configured to retain the asset within the container.

38. The lockable container of claim 1, wherein the container has at least one status window, wherein the locking member has an indicator, and wherein the indicator is configured to communicate to a user via the status window the unlocked or locked status of the container in accordance with a position of the locking member.

39. A method for securing an asset within a container, comprising:

providing a lockable container having a first cover, a second cover coupled to the first cover, a locking mate arrangement operatively coupled to at least one of the first and second covers, and a locking member, wherein the first and second covers are in a closed position which encloses the asset, and wherein the locking member is in an unlocked position in which the first and second covers can move to an open position and in which the entirety of the locking member is internal to the container such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container and the locking member is permanently connected to the lockable container; and moving the locking member from the unlocked position to a locked position to lock the first and second covers in the closed position.

40. The method of claim 39, wherein the moving the locking member from the unlocked position to the locked position comprises engaging the locking mate arrangement with the locking member.

41. The method of claim 39, wherein the moving the locking member comprises: acting upon the locking member with an external key arrangement to move the locking member into the locked position with respect to the locking mate arrangement; and engaging the locking mate arrangement with the locking member.

42. The method of claim 39, wherein the locking mate arrangement is formed as part of the first and second covers, and wherein the locking member is detachably coupled to the second cover.

43. The method of claim 42, wherein the locking mate arrangement has at least one tab formed in the first cover and at least one corresponding tab formed in the second cover.

44. The method of claim 43, wherein the at least one tab formed in the first cover and the at least one corresponding tab formed in the second cover are in an adjacent relationship when the first and second covers are in the closed position.

45. The method of claim 44, wherein at least a portion of the locking member has an I-beam construction with a recess formed therein.

46. The method of claim 45, wherein the at least one tab formed in the first cover and the at least one corresponding tab formed in the second cover are located in the recess and prevented from separating when the locking member is in the locked position.

47. The method of claim 39, wherein the first cover has at least one pair of top closing walls and the second cover has at least one pair of bottom closing walls, and wherein the top and bottom pairs of closing walls are disposed so that each of the respective top and bottom closing walls sits behind the other of the respective top and bottom closing walls when the first cover is closed upon the second cover, thereby forming a double wall so that each of the respective top and bottom closing walls substantially overlaps a major portion of the height of the other of the respective top and bottom closing walls.

48. The method of claim 47, wherein each of the at least one pair of top closing walls and each of the at least one pair of bottom closing walls extends the entire width of the respective first and second covers.

49. The method of claim 47, wherein each of the at least one pair of top closing walls and each of the at least one pair of bottom closing walls extends substantially the entire width of the respective first and second covers.

50. The method of claim 39, wherein the first cover has at least one pair of top closing walls, wherein the second cover has top and bottom edges that meet a backside of the second cover, and wherein the at least one pair of top closing walls meets the second cover at the top and bottom edges to form respective seam portions.

51. The method of claim 39, wherein the first cover has at least one pair of top closing walls, wherein the second cover has top and bottom edges that substantially meet a backside of the second cover, and wherein the at least one pair of top closing walls meeting the second cover at the top and bottom edges to form respective seam portions.

52. The method of claim 39, wherein the locking mate arrangement is formed as part of the first cover and the locking member is detachably coupled to the second cover, and wherein the moving the locking member comprises:
  acting upon the locking member with an external key arrangement to move the locking member into the locked position with respect to the locking mate arrangement; and engaging the locking mate arrangement with the locking member.

53. The method of claim 52, wherein the locking member has at least one tab, and wherein the locking mate arrangement has at least one corresponding loop.

54. The method of claim 53, wherein the moving the locking member from the unlocked position to the locked position further comprises engaging the at least one loop of the locking member with the corresponding at least one tab of the locking mate arrangement.

55. The method of claim 52, wherein the locking member has at least one engagement structure and the locking mate arrangement has at least one corresponding engagement structure, and wherein the moving the locking member from the unlocked position to the locked position further comprises engaging the corresponding engagement structure of the locking mate arrangement with the engagement structure of the locking member.

56. The method of claim 55, wherein the locking member has a stopping arrangement which selectivity blocks the locking member from moving into the locked and unlocked positions.

57. The method of claim 56, wherein the at least one engagement structure of the locking member has at least one first magnetically attractable portion configured to magnetically interact with a corresponding first magnet arrangement of the external key arrangement.

58. The method of claim 57, wherein the stopping arrangement has at least one resilient locked position flange biased into a locked state, wherein the container has a corresponding locked position tab, the method further comprising engaging the locked position tab with the corresponding locked position flange to prevent the locking member from sliding into the unlocked position once in the locked position.

59. The method of claim 58, wherein the resilient locked position flange has at least one second magnetically attractable portion configured to magnetically interact with a corresponding second magnet arrangement of the external key arrangement, the method further comprising causing the resilient locked position flange to bend toward the external key arrangement due to the magnetic interaction between the second magnetically attractable portion and the second magnet arrangement of the external key arrangement.

60. The method of claim 56, wherein the moving the locking member comprises engaging the at least one corresponding engagement structure and the at least one stopping arrangement with the external key arrangement to move the locking member into the locked position.

61. The method of claim 60, wherein the moving the locking member further comprises simultaneously engaging the at least one corresponding engagement structure and the at least one stopping arrangement with the external key arrangement.

62. The method of claim 39, wherein the moving the locking member comprises: acting upon the locking member with an external magnetic key arrangement to position the locking member into the locked position with respect to the locking mate arrangement; and engaging the locking mate arrangement with the locking member when the locking member is in the locked position.

63. The method of claim 39, wherein the locking member is not viewable from the outside of the container when the first and second covers are in the closed position.

64. The method of claim 39, wherein at least one of the first and second covers has a securing mechanism configured to retain the asset within the container.

65. The method of claim 39, wherein the container has at least one status window, wherein the locking member has an indicator, the method further comprising: communicating to a user with the indicator via the status window the unlocked or locked status of the container in accordance with the position of the locking member.

66. A method for accessing an asset from within a container, comprising:
  providing a lockable container having a first cover, a second cover coupled to the first cover, a locking mate arrangement operatively coupled to at least one of the first and second covers, and a locking member, wherein the first and second covers are in a closed position which encloses the asset, and wherein the locking member is in a locked position which locks the first and second covers in the closed position; and
  moving the locking member from the locked position to an unlocked position in which the first and second covers can move to an open position, wherein the entirety of the locking member is internal to the container in the unlocked position and in the locked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container and the locking member is permanently connected to the lockable container.

67. The method of claim 66, wherein the locking member engages the locking mate arrangement when the locking member is in the locked position.

68. The method of claim 66, wherein the locking member engages the locking mate arrangement when the locking member is in the locked position, and wherein the moving the locking member comprises acting upon the locking member with an external key arrangement to position the locking member into the unlocked position with respect to the locking mate arrangement.

69. The method of claim 66, wherein the locking mate arrangement is formed as part of the first and second covers, and wherein the locking member is detachably coupled to the second cover.

70. The method of claim 69, wherein the locking mate arrangement has at least one tab formed in the first cover and at least one corresponding tab formed in the second cover.

71. The method of claim 70, wherein the at least one tab formed in the first cover and the at least one corresponding tab formed in the second cover are in an adjacent relationship when the first and second covers are in the closed position.

72. The method of claim 71, wherein at least a portion of the locking member has an I-beam construction with a recess formed therein.

73. The method of claim 72, wherein the at least one tab formed in the first cover and the at least one corresponding tab formed in the second cover are located in the recess and prevented from separating when the locking member is in the locked position.

74. The method of claim 66, wherein the first cover has at least one pair of top closing walls and the second cover has at least one pair of bottom closing walls, and wherein the top and bottom pairs of closing walls are disposed so that each of the respective top and bottom closing walls sits behind the other of the respective top and bottom closing walls when the first cover is closed upon the second cover, thereby forming a double wall so that each of the respective top and bottom closing walls substantially overlaps a major portion of the height of the other of the respective top and bottom closing walls.

75. The method of claim 74, wherein each of the at least one pair of top closing walls and each of the at least one pair of bottom closing walls extends the entire width of the respective first and second covers.

76. The method of claim 74, wherein each of the at least one pair of top closing walls and each of the at least one pair of bottom closing walls extends substantially the entire width of the respective first and second covers.

77. The method of claim 66, wherein the first cover has at least one pair of top closing walls, wherein the second cover has top and bottom edges that meet a backside of the second cover, and wherein at least one pair of top closing walls meets the second cover at the top and bottom edges to form respective seam portions.

78. The method of claim 66, wherein the first cover has at least one pair of top closing walls, wherein the second cover has top and bottom edges that substantially meet a backside of the second cover, wherein at least one pair of top closing walls meets the second cover at the top and bottom edges to form respective seam portions.

79. The method of claim 66, wherein the locking mate arrangement is formed as part of the first cover and the locking member is detachably coupled to the second cover, wherein the locking member engages the locking mate arrangement when the locking member is in the locked position, and wherein the moving the locking member comprises acting upon the locking member with an external key arrangement to position the locking member into the unlocked position with respect to the locking mate arrangement.

80. The method of claim 79, wherein the locking member has at least one tab, and wherein the locking mate arrangement has at least one corresponding loop.

81. The method of claim 80, wherein the at least one tab is configured to engage the at least one corresponding loop when the locking member is in the locked position.

82. The method of claim 79, wherein the locking member has at least one engagement structure and the locking mate arrangement has at least one corresponding engagement structure, and wherein the engagement structure of the locking member is configured to engage the corresponding engagement structure of the locking mate arrangement.

83. The method of claim 82, wherein the locking member has a stopping arrangement which selectively blocks the locking member from moving into the locked and unlocked positions.

84. The method of claim 83, wherein the at least one engagement structure of the locking member has at least one first magnetically attractable portion configured to magnetically interact with a corresponding first magnet arrangement of the external key arrangement.

85. The method of claim 84, wherein the stopping arrangement has at least one resilient locked position flange biased into a locked state, wherein the container has a corresponding locked position tab, and wherein the locked position flange is configured to selectively engage the corresponding locked position tab to prevent the locking member from sliding into the unlocked position when in the locked position.

86. The method of claim 85, wherein the resilient locked position flange has at least one second magnetically attractable portion configured to magnetically interact with a corresponding second magnet arrangement of the external key arrangement, the magnetic interaction between the second magnetically attractable portion and the second magnet arrangement of the external key arrangement causing the resilient locked position flange to bend toward the external key arrangement.

87. The method of claim 84, wherein the stopping arrangement has at least one resilient unlocked position flange biased into an unlocked state, wherein the container has a corresponding unlocked position tab, the method further comprising:
engaging the corresponding unlocked position tab with the unlocked position flange to prevent the locking member from sliding into the locked position once in the unlocked position.

88. The method of claim 87, wherein the resilient unlocked position flange has at least one third magnetically attractable portion configured to magnetically interact with a corresponding third magnet arrangement of the external key arrangement, the magnetic interaction between the third magnetically attractable portion and the third magnet arrangement of the external key arrangement causing the resilient unlocked position flange to bend toward the external key arrangement.

89. The method of claim 86, wherein the stopping arrangement has at least one resilient unlocked position flange biased into an unlocked state, and wherein the resilient unlocked position flange has at least one third magnetically attractable portion configured to magnetically interact with the second magnet arrangement of the external key arrangement, the magnetic interaction between the third magnetically attractable portion and the second magnet arrangement of the external key arrangement causing the resilient unlocked position flange to bend toward the external key arrangement.

90. The method of claim 83, wherein the moving the locking member further comprises engaging the at least one corresponding engagement structure and the at least one stopping arrangement of the locking member with the external key arrangement to move the locking member into the unlocked position.

91. The method of claim 90, wherein the moving the locking member further comprises simultaneously engaging the at least one corresponding engagement structure and the at least one stopping arrangement of the locking member with the external key arrangement.

92. The method of claim 66, wherein the locking member engages the locking mate arrangement when the locking member is in the locked position, and wherein the moving the locking member comprises acting upon locking member with an external magnetic key arrangement to position the locking member into the unlocked position with respect to the locking mate arrangement.

93. The method of claim 66, wherein the locking member is not viewable from the outside of the container when the first and second covers are in the closed position.

94. The method of claim 66, wherein at least one of the first and second covers has a securing mechanism configured to retain the asset within the container.

95. The method of claim 66, wherein the container has at least one status window, wherein the locking member has an indicator, the method further comprising:
communicating to a user with the indicator via the status window the unlocked or locked status of the container in accordance with the position of the locking member.

96. A lockable container for securing an asset, comprising:
a base portion having a locked position receptacle;
a cover pivotally coupled to the base portion to enclose the asset in the container;
a locking mate arrangement coupled to at least one of the cover and the base portion, the locking mate arrangement having at least one tab portion; and
a locking member slideably coupled to at least one of the cover and the base portion, the locking member being arranged entirely within the container such that the locking member is inaccessible from an exterior of the lockable container to a physical contact sufficient to slide the locking member from the exterior of the locking container and the locking member and lockable container operable to restrict tampering with the locking member from the exterior of the lockable container, and the locking member is configured to detachably couple to the locking mate arrangement to secure the cover to the base portion, thereby retaining the asset within the container, where the locking member is permanently connected to the lockable container, the locking member further comprising:
at least one engagement structure configured to engage the at least one tab portion;
at least one first magnetically attractable portion configured to magnetically interact with a corresponding first magnet arrangement of an external key arrangement;
at least one resilient locked position flange biased into a locking state and acted on by the first magnetically attractable portion to be moved out of the locking state, the locked position flange being configured to selectively engage the locked position receptacle to prevent the locking member from sliding into an unlocked position once in a locked position; and
wherein the locking member is configured to be acted upon by the external key arrangement via the magnetic field of the first magnet arrangement to selectively position the locking member into one of the locked position and the unlocked position with respect to the locking mate arrangement.

97. A system for securing and gaining access to an asset, comprising:
a lockable container for securing an asset having a first cover, a second cover pivotally coupled to the first cover to enclose the asset within the container, a locking mate arrangement coupled to at least one of the first and second covers, and a locking member slideably coupled to at least one of the first and second covers, wherein the locking member is configured to detachably couple to the locking mate arrangement to secure the first cover to second cover, thereby retaining the asset item within the container; and
a key arrangement for at least one of locking and unlocking the container, the key arrangement having a receptacle arrangement configured to receive the container, wherein the receptacle arrangement has at least one magnet arrangement configured to at least one of lock and unlock the container;
wherein the locking member is configured to be acted upon by the external key arrangement to selectively position the locking member into one of a locked position and an unlocked position with respect to the locking mate arrangement;
and wherein the entirety of the locking member is internal to the container in the unlocked position and the locked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container and the locking member is permanently connected to the lockable container.

98. A method for securing an asset within a container, comprising:
providing a lockable container having a first cover, a second cover pivotally coupled to the first cover to enclose the asset within the container, a locking mate arrangement coupled to at least one of the first and second covers, and a locking member slideably coupled to at least one of the first and second covers, wherein the locking member is in an unlocked position, and wherein the entirety of the locking member is internal to the container when the locking member is in the unlocked position and in a locked position such that the locking member is inaccessible from an exterior of the lockable container to a physical contact sufficient to slide the locking member from the exterior of the lockable container and the locking member and the lockable container operable to restrict tampering with the locking member from the exterior of the locking container, and the locking member is permanently connected to the lockable container;
providing a key arrangement for unlocking the container, the key arrangement having a receptacle arrangement, wherein the receptacle arrangement has at least one magnet arrangement;
positioning the container within the receptacle arrangement;
acting upon the container using the magnetic field of the at least one magnet arrangement to move the locking member from the unlocked position into the locked position with respect to the locking mate arrangement, such that the locking member engages the locking mate arrangement to secure the first cover to the second cover.

99. A method for providing access to an asset from within a container, comprising:
providing a lockable container having a first cover, a second cover pivotally coupled to the first cover to enclose the asset within the container, a locking mate arrangement coupled to at least one of the first and second covers, and a locking member slideably coupled to at least one of the first and second covers, wherein
the entirety of the locking member is internal to the container in an unlocked position and in a locked position such that the locking member is inaccessible from an exterior of the lockable container to a physical contact sufficient to slide the locking member from the exterior of the lockable container and the locking member and the lockable container operable to restrict tampering with the locking member from the exterior of the locking container, and the locking member is permanently connected to the lockable container;

the locking member engages the locking mate arrangement to secure the first cover to the second cover in a locked position;

providing a key arrangement for unlocking the container, the key arrangement having a receptacle arrangement, wherein the receptacle arrangement has at least one magnet arrangement; positioning the container within the receptacle arrangement;

acting upon the container with a magnetic field of the at least one magnet arrangement to move the locking member from the locked position into the unlocked position with respect to the locking mate arrangement.

100. A lockable container for securing an asset, comprising:
a first cover;
a second cover coupled to the first cover, the first and second covers configured to move between an open position which allows access to the asset and a closed position which encloses the asset;
at least one tab portion coupled to the first cover;
at least one corresponding tab portion coupled to the second cover; and
a locking member operatively coupled to at least one of the first and second covers, wherein the locking member has a trap portion and a release portion, wherein the locking member is configured to move between an unlocked position in which the first and second covers can move to the open position and a locked position which locks the container in the closed position, and wherein the entirety of the locking member is internal to the container in the unlocked position and in the locked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container and the locking member is permanently connected to the lockable container.

101. The container of claim 100, wherein the locking member is configured such that, in the locked position, the at least one tab portion and the at least one corresponding tab portion are located in the trap portion and prevented from separating.

102. The container of claim 101, wherein the at least one tab portion and the at least one corresponding tab portion face each other in an adjacent relationship when located in the trap portion.

103. The container of claim 100, wherein the locking member is configured such that, in the unlocked position, the at least one tab portion and the at least one corresponding tab portion are located in the release portion and are allowed to separate.

104. The container of claim 100, wherein the top cover has at least two tab portions, wherein the bottom cover has at least two corresponding tab portions, and wherein the locking member has at least one pair of trap portions located on opposite sides of the locking member.

105. The container of claim 104, wherein the container is configured such that, in the locked position, one of the at least two tab portions and one of the at least two corresponding tab portions are located in one of the at least one pair of trap portions in an adjacent relationship, and the other of the at least two tab portions and the other of the at least two corresponding tab portions are located in the other of the at least one pair of trap portions in an adjacent relationship, wherein the at least two tab portions are prevented from separating from the at least two corresponding tab portions.

106. The container of claim 100, further comprising an electronic security tag, wherein the electronic security tag is situated within the container and is inaccessible when the locking member is in the locked position.

107. The container of claim 100, wherein the first cover has at least one pair of top closing walls and the second cover includes at least one pair of bottom closing walls, and wherein the top and bottom pairs of closing walls are disposed so that when the first cover is closed upon the second cover, each of the respective top and bottom closing walls sits behind the other of the respective top and bottom closing walls, thereby forming a double wall, and each of the respective top and bottom closing walls substantially overlaps a major portion of the height of the other of the respective top and bottom closing walls.

108. The container of claim 107, wherein each of the at least one pair of top closing walls and each of the at least one pair of bottom closing walls extends the entire width of the respective first and second covers.

109. The container of claim 107, wherein each of the at least one pair of top closing walls and each of the at least one pair of the bottom closing walls extends for substantially the entire width of the respective first and second covers.

110. The container of claim 100, wherein the first cover has at least one pair of top closing walls, wherein the second cover has top and bottom edges that meet a backside of the second cover, and wherein the at least one pair of top closing walls meets the second cover at the top and bottom edges to form respective seam portions.

111. The container of claim 100, wherein the first cover has at least one pair of top closing walls, wherein the second cover has top and bottom edges that substantially meet a backside of the second cover, and wherein the at least one pair of top closing walls meets the second cover at the top and bottom edges to form respective seam portions.

112. A lockable container for securing an asset therein, comprising:
a receptacle, wherein the receptacle has an open configuration which allows access to the asset and a closed configuration which encloses the asset;
a locking mate arrangement operatively coupled to the receptacle; and
a locking member, wherein
the locking member is configured to move between an unlocked position in which the receptacle is in the open configuration and a locked position which locks the receptacle in the closed configuration, and wherein the entirety of the locking member is internal to the container in the unlocked position and in the locked position such that the locking member is inaccessible from an exterior of the lockable container and to a physical contact sufficient to slide the locking member between the locked and unlocked positions, whereby the locking member and the lockable container are operable to restrict tampering with the locking member from the exterior of the lockable container, and the locking member is permanently connected to the lockable container.

113. A key arrangement for at least one of locking and unlocking a container, the container having a receptacle, wherein the receptacle has an open configuration which allows access to an asset and a closed configuration which encloses the asset, and the container having a locking member that is configured to move between an unlocked position in which the receptacle is in the open configuration, wherein the entirety of the locking member is internal to the container in the unlocked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container, and the locking member is permanently connected to the lockable container, and a locked position which locks the receptacle in the closed configuration, wherein the locking member has at least one magnetically attractable portion, the key arrangement comprising:

a channel portion, wherein the channel portion is configured to receive the container; and at least one magnetic arrangement, wherein the at least one magnetic arrangement is configured to hold the at least one magnetically attractable portion of the locking member within a magnetic field created by the at least one magnetic arrangement while the container slides through the channel, thereby positioning the locking member in at least one of the locked and unlocked positions.

114. The key arrangement of claim 113, wherein the locking member has first and second magnetically attractable portions, the key arrangement further comprising: first and second magnetic arrangements, wherein the first magnetic arrangement is configured to hold the first magnetically attractable portion of the locking member within a magnetic field created by the first magnetic arrangement, and wherein the second magnetic arrangement is configured to hold the second magnetically attractable portion of the locking member within a magnetic field created by the second magnetic arrangement.

115. The key arrangement of claim 114, wherein the channel portion comprises a first wall portion and a second wall portion forming the channel therebetween, wherein the first magnetic arrangement is situated within the first wall portion, and wherein the second magnetic arrangement is situated within the second wall portion.

116. The key arrangement of claim 114, wherein the channel portion comprises a first wall portion and a second wall portion forming the channel therebetween, wherein the channel has a first end and a second end, wherein the first magnetic arrangement is situated within the first wall portion at the first end of the channel, and wherein the second magnetic arrangement is situated within the second wall portion at the second end of the channel.

117. A method for at least one of locking and unlocking a container, the container having a receptacle, wherein the receptacle has an open configuration which allows access to an asset and a closed configuration which encloses the asset, and the container having a locking member that is configured to move between an unlocked position in which the receptacle is in the open configuration, wherein the entirety of the locking member is internal to the container in the unlocked position such that the locking member is inaccessible from an exterior of the lockable container to a physical contact sufficient to slide the locking member between the locked and unlocked positions, whereby the locking member and the lockable container are operable to restrict tampering with the locking member from the exterior of the lockable container, and the locking member is permanently connected to the lockable container, and a locked position which locks the receptacle in the closed configuration, wherein the locking member has at least one magnetically attractable portion, the method comprising:

providing a key arrangement having a channel portion and at least one magnetic arrangement;

positioning the container within the channel portion;

holding the at least one magnetically attractable portion of the locking member within a magnetic field created by the at least one magnetic arrangement; and while holding the at least one magnetically attractable portion of the locking member within the magnetic field created by the at least one magnetic arrangement, sliding the container through the channel such that the locking member attains at least one of the locked and unlocked positions.

118. The method of claim 117, wherein the locking member has first and second magnetically attractable portions, wherein the key arrangement has first and second magnetic arrangements, and wherein the holding the at least one magnetically attractable portion of the locking member within a magnetic field created by the at least one magnetic arrangement further comprises:

holding the first magnetically attractable portion of the locking member within a magnetic field created by the first magnetic arrangement; and holding the second magnetically attractable portion of the locking member within a magnetic field created by the second magnetic arrangement.

119. The method of claim 118, wherein the channel portion comprises a first wall portion and a second wall portion forming the channel therebetween, wherein the first magnetic arrangement is situated within the first wall portion, and wherein the second magnetic arrangement is situated within the second wall portion.

120. The method of claim 118, wherein the channel portion comprises a first wall portion and a second wall portion forming the channel therebetween, wherein the channel has a first end and a second end, wherein the first magnetic arrangement is situated within the first wall portion at the first end of the channel, and wherein the second magnetic arrangement is situated within the second wall portion at the second end of the channel.

\* \* \* \* \*

UNITED STATES PATENT AND TRADEMARK OFFICE
CERTIFICATE OF CORRECTION

PATENT NO. : 7,610,782 B2
APPLICATION NO. : 10/723911
DATED : November 3, 2009
INVENTOR(S) : Lax et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this

Fourteenth Day of December, 2010

David J. Kappos
*Director of the United States Patent and Trademark Office*